United States Patent [19]

Eddy et al.

[11] 4,059,729

[45] Nov. 22, 1977

[54] METHOD AND SYSTEM FOR SELECTIVELY ACCESSING MULTIPLEXED DATA TRANSMISSION NETWORK FOR MONITORING AND TESTING OF THE NETWORK

[75] Inventors: Wesley L. Eddy, Howey-in-the-Hills; Daniel J. Mullen; Arthur R. Bonham, both of Orlando, all of Fla.

[73] Assignee: Martin Marietta Aerospace, Orlando, Fla.

[21] Appl. No.: 694,302

[22] Filed: June 9, 1976

[51] Int. Cl.² .............................................. H04J 3/14
[52] U.S. Cl. ............................................... 179/15 BF
[58] Field of Search ........... 179/15 BF, 15 BY, 15 A, 179/15 AD

[56] References Cited

U.S. PATENT DOCUMENTS

| 3,796,834 | 3/1974 | Kuhar, Jr. ......................... | 179/15 BF |
| 3,798,635 | 3/1974 | Candiani ......................... | 179/15 BF |
| 3,920,920 | 11/1975 | Lager et al. ..................... | 179/15 BF |

Primary Examiner—Thomas A. Robinson
Attorney, Agent, or Firm—Burns, Doane, Swecker & Mathis

[57] ABSTRACT

A method and system for accessing data in a time division multiplex communication network at the multiplexed level without disturbing the transmission of the data. A multiplexed data stream containing a predetermined pattern of framing signals and subscriber data from a plurality of subscriber channels is accessed directly by line accessing means located in the transmission path of the data stream. The line accessing means does not disturb the transmission of the multiplexed data stream, i.e., allows the multiplexed data stream to pass through the line accessing means, but provides a monitored data signal having the same data content as the multiplexed data stream, thereby essentially providing undisturbed direct access to the multiplexed data stream. A control signal designating one of the plurality of subscriber channels as the desired subscriber channel is generated, and framing signals in the multiplexed data stream are detected. The detected framing signals and the generated control signal are utilized to locate the designated one of the plurality of subscriber channels in the monitored multiplexed data stream for monitoring, testing or for use of the data contained in the located channel. Specifically, the located one of the plurality of subscriber channels is monitored so its data framing and content can be observed. For testing purposes, various codes such as a loopback code or a multipoint junction code may be inserted in the designated one of the plurality of subscriber channels in the multiplexed data stream without demultiplexing the data stream or otherwise disturbing the transmission of the stream. In this manner, loopbacks at various points in the system can be effected and test codes such as a pseudo-random code may be transmitted through the loopback and monitored for errors.

20 Claims, 53 Drawing Figures

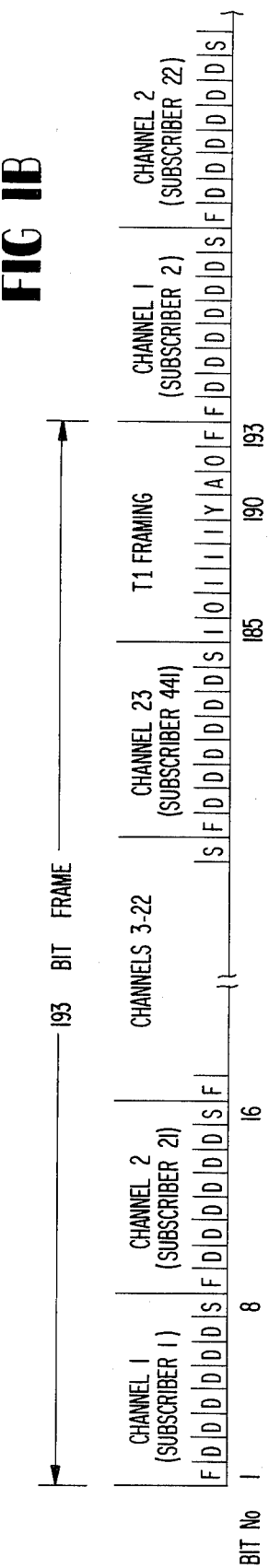
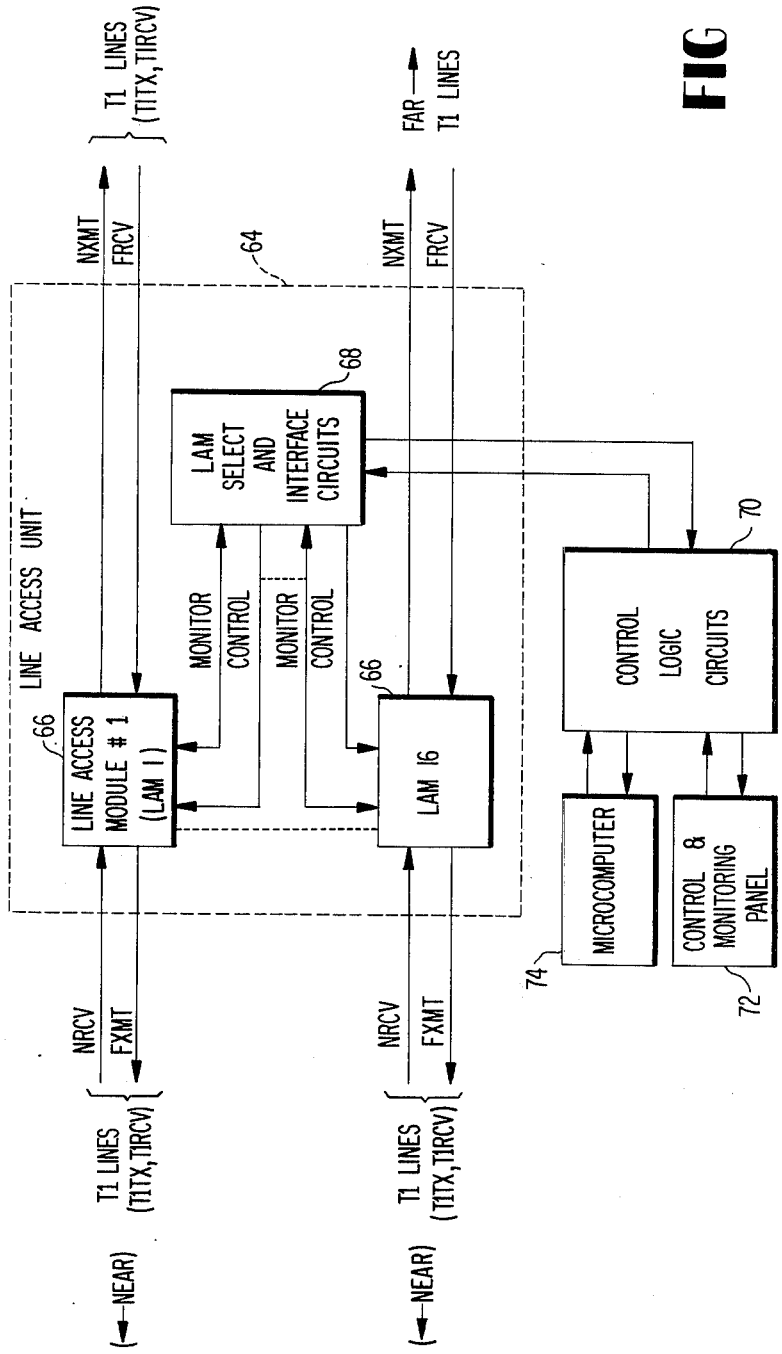
FIG 1B
FIG 2

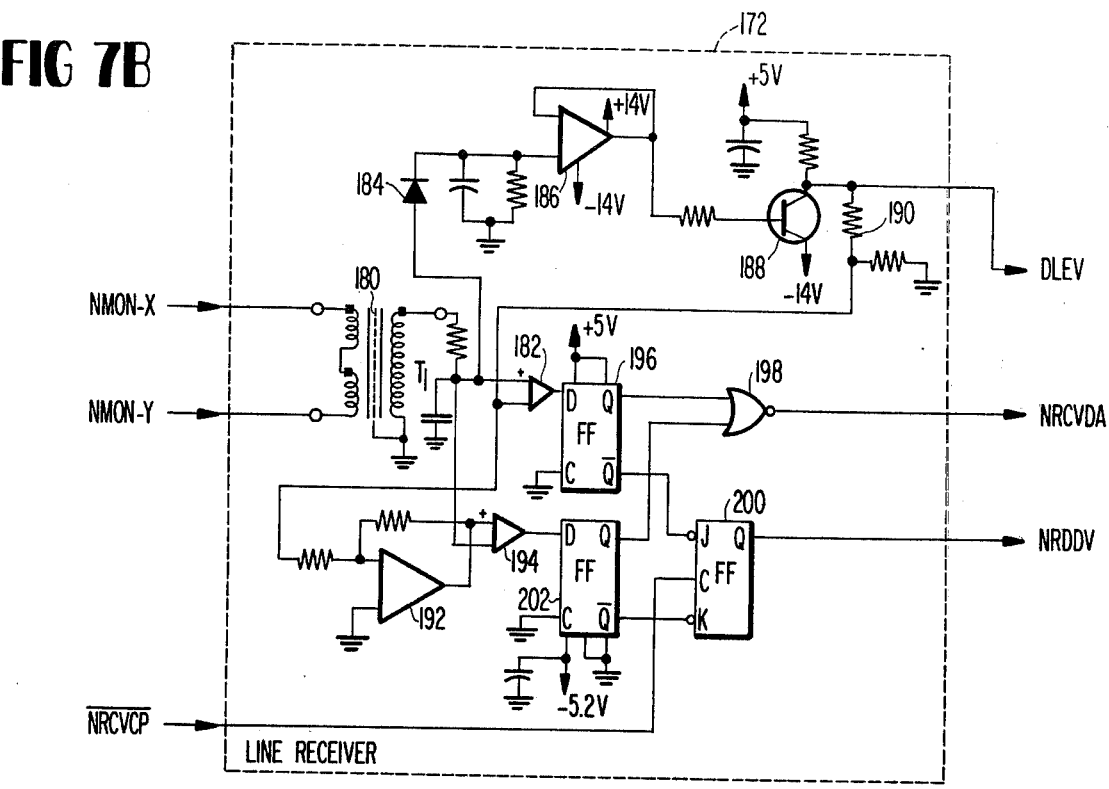

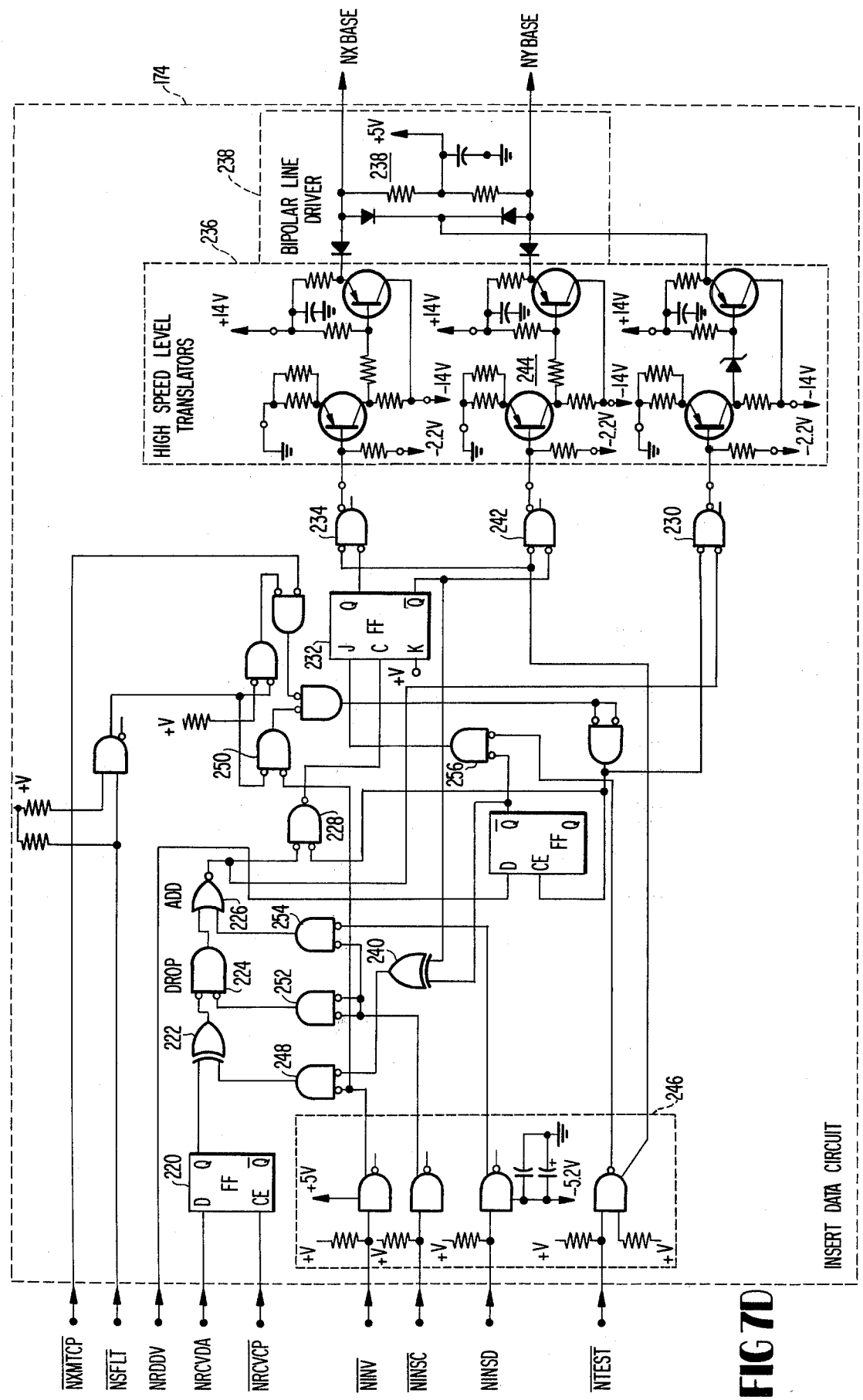

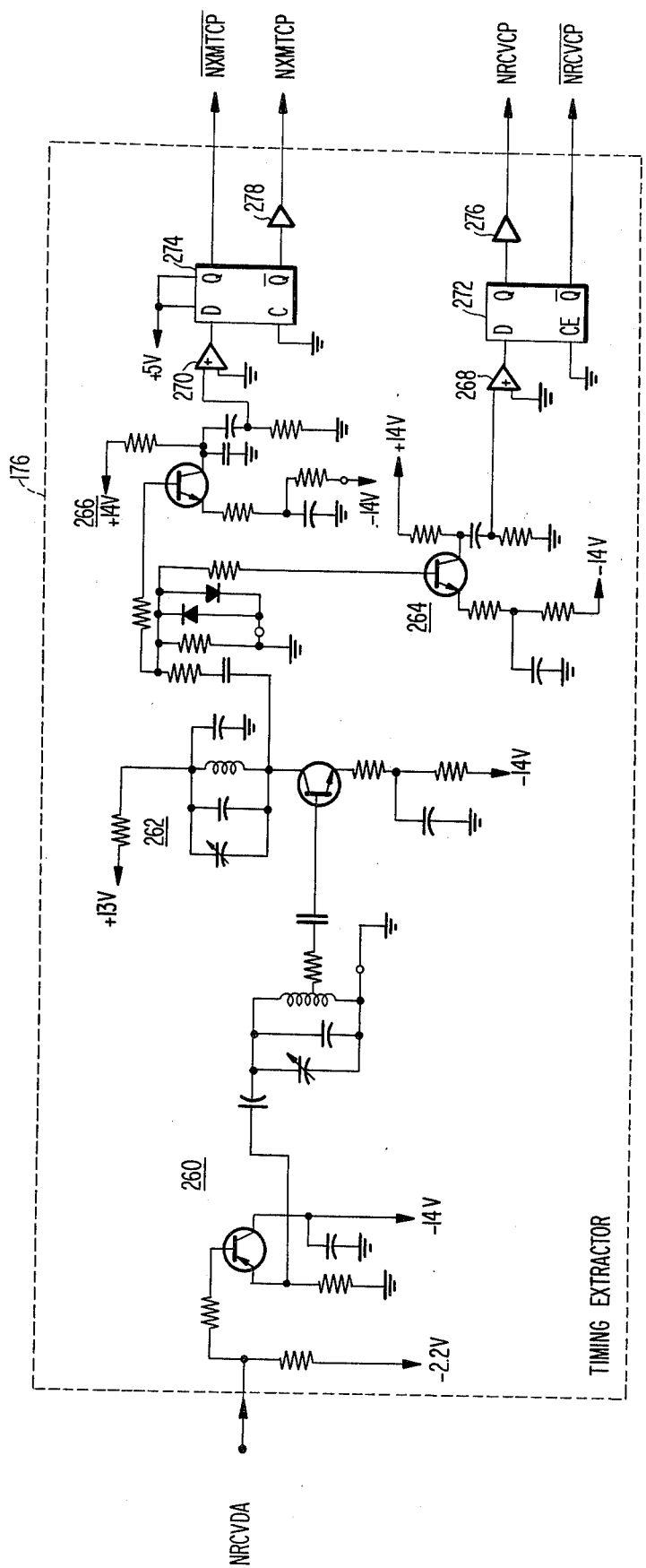

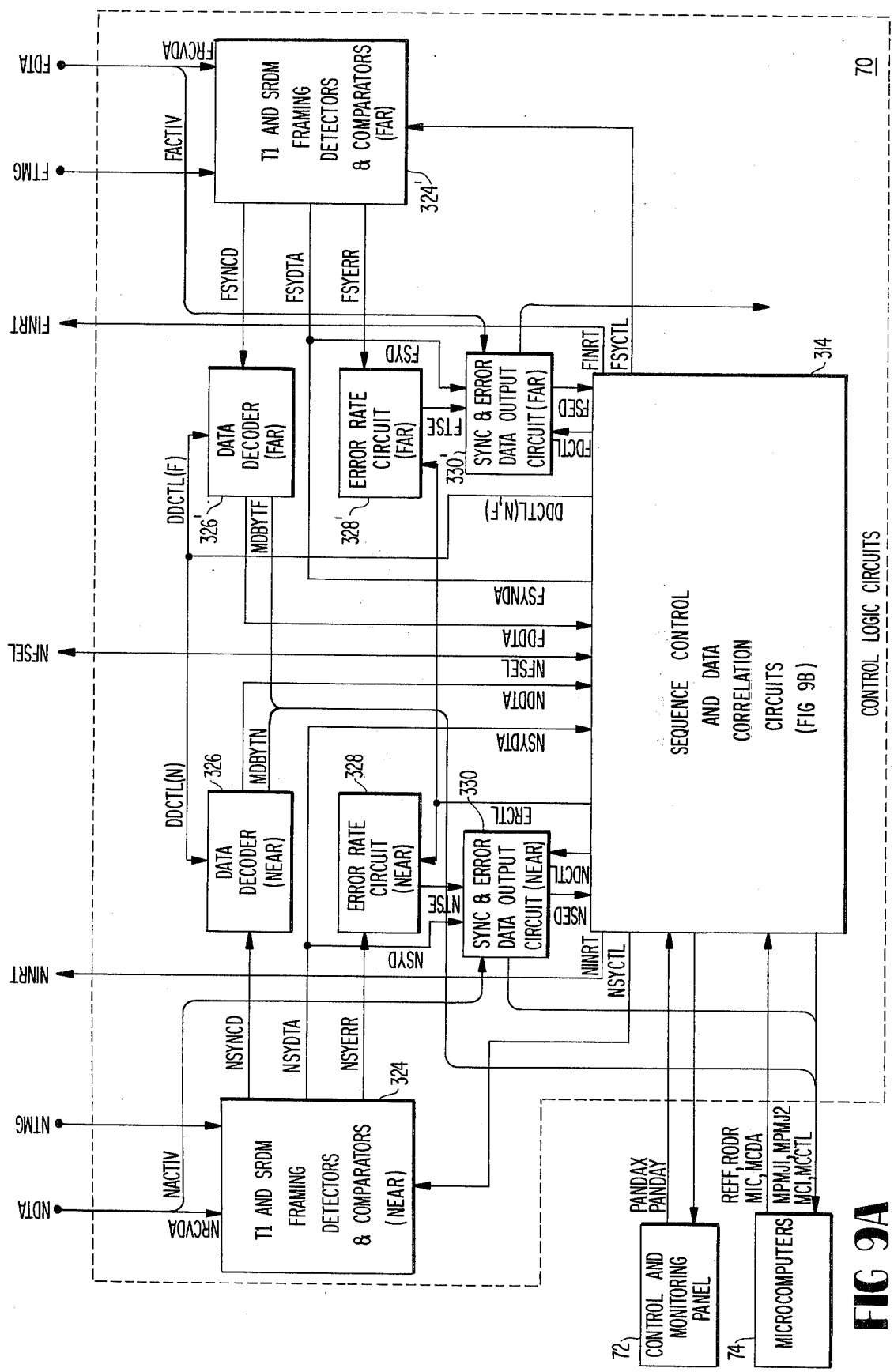

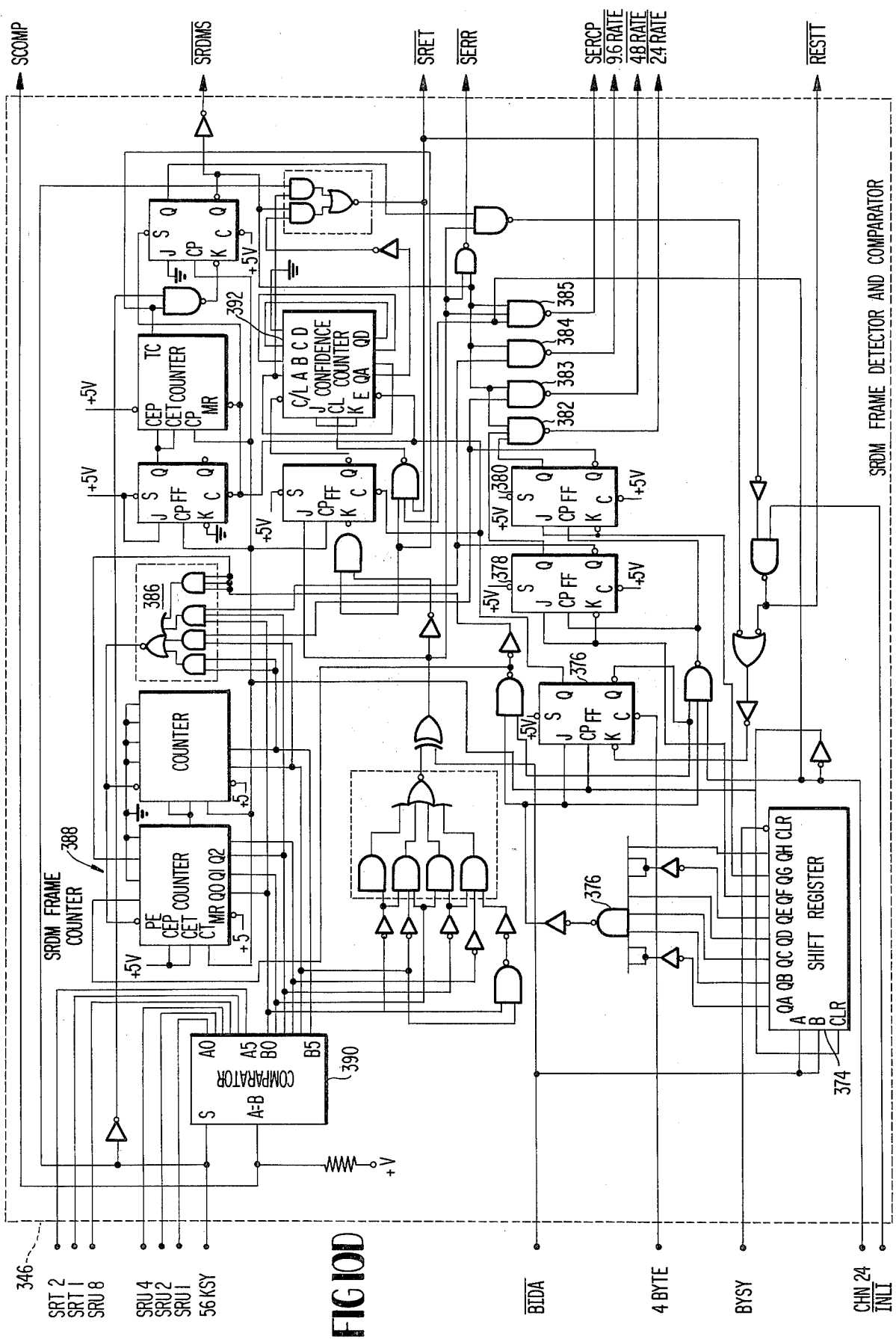

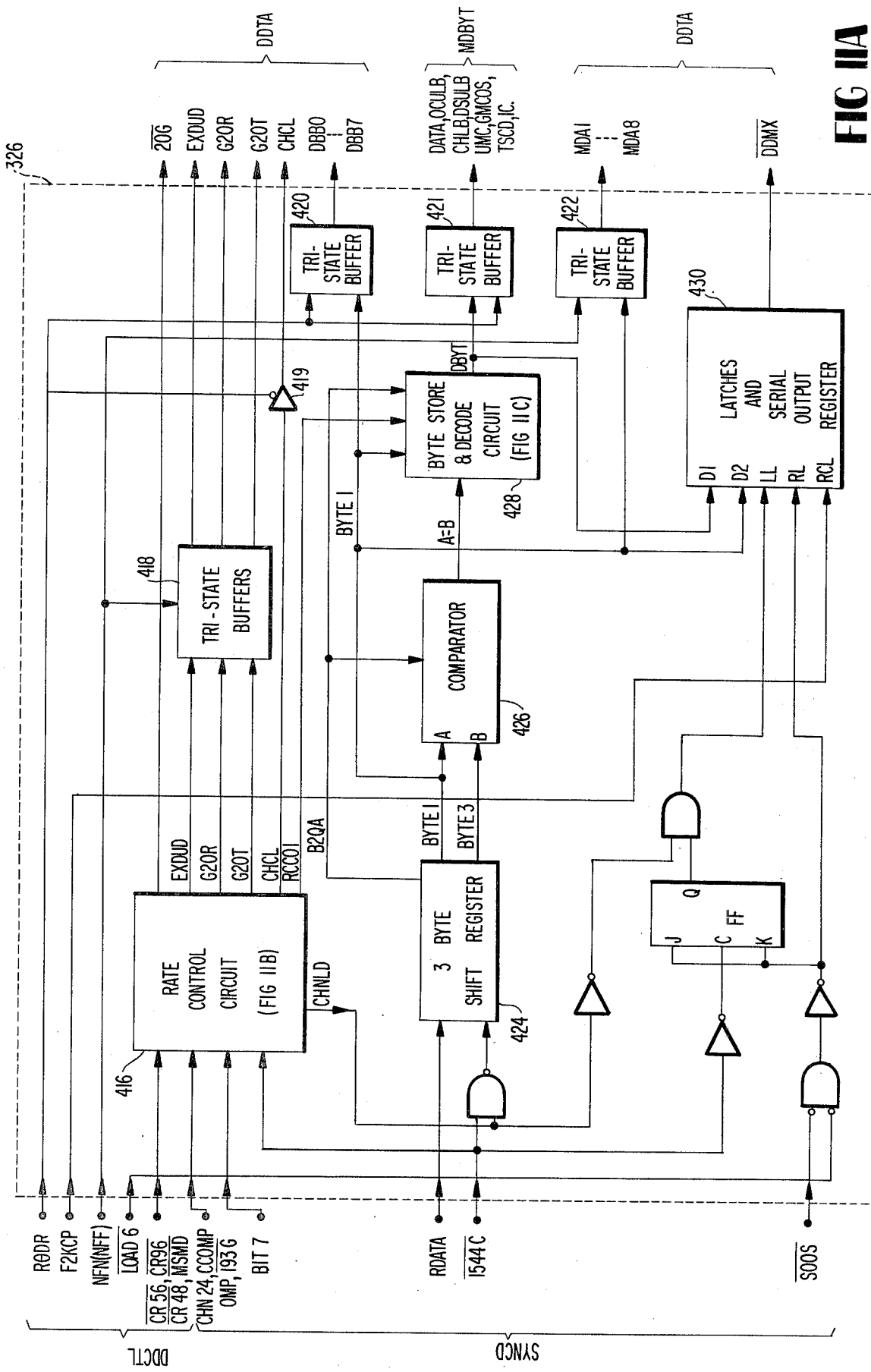
FIG IIA

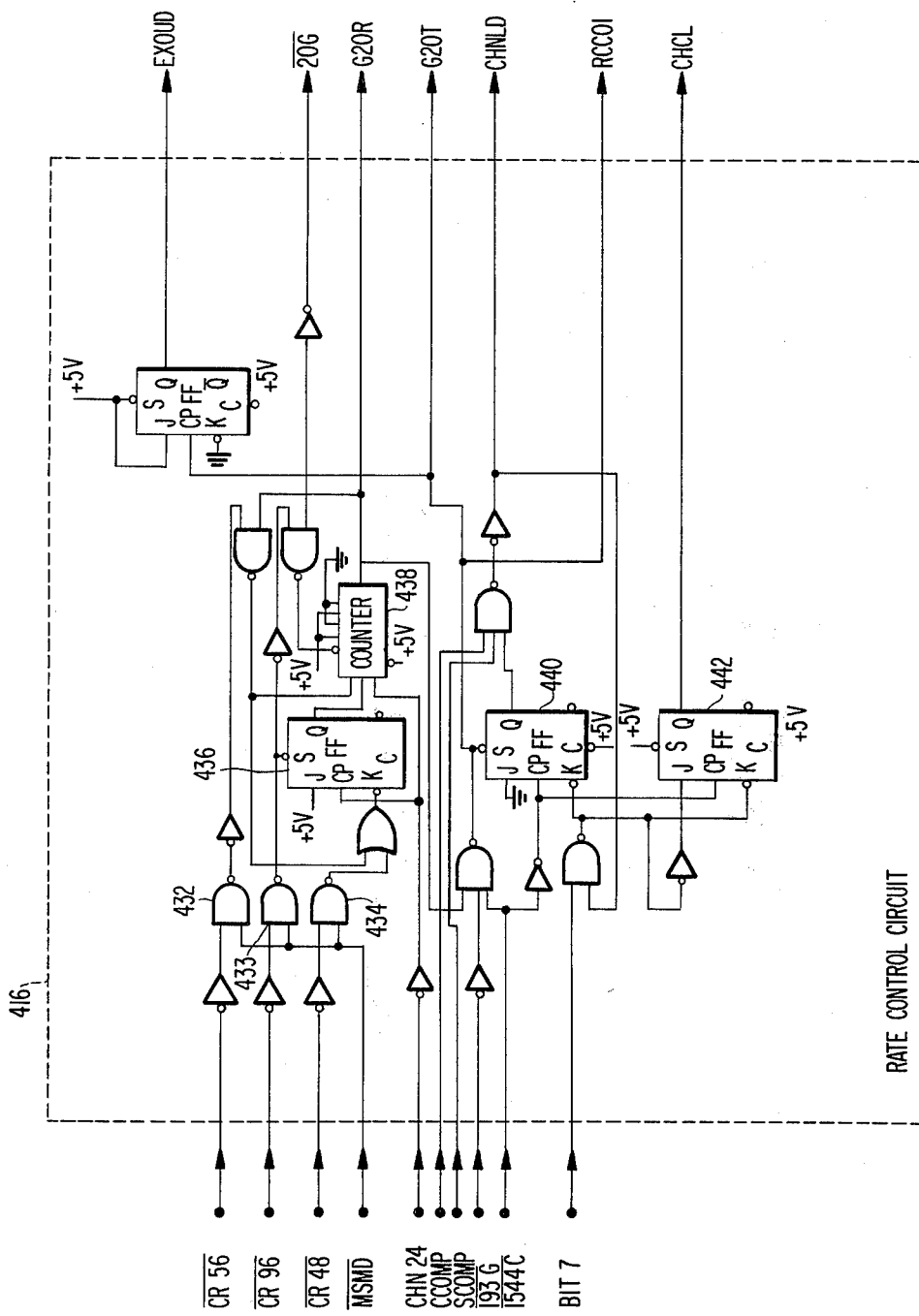
FIG 11B RATE CONTROL CIRCUIT

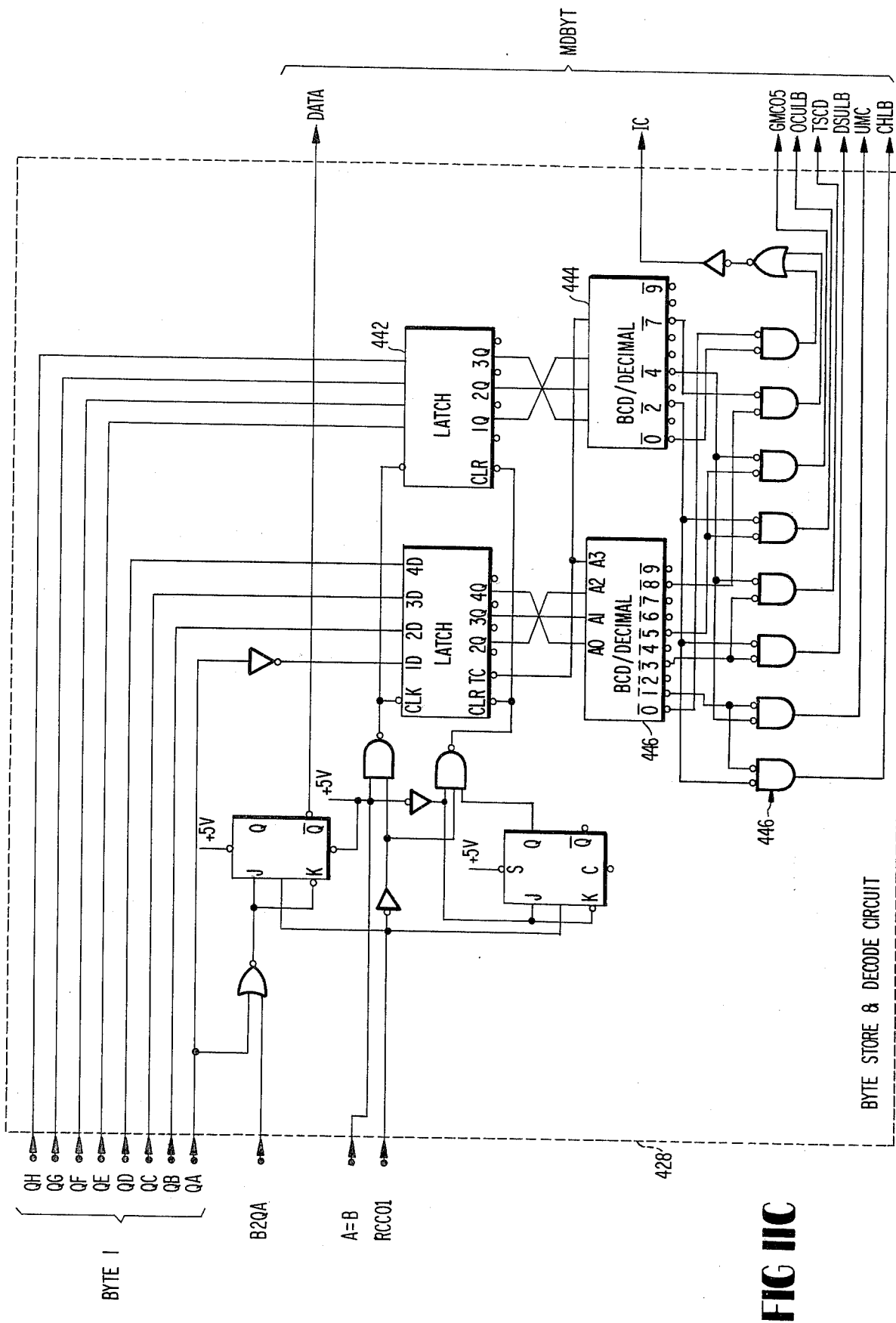

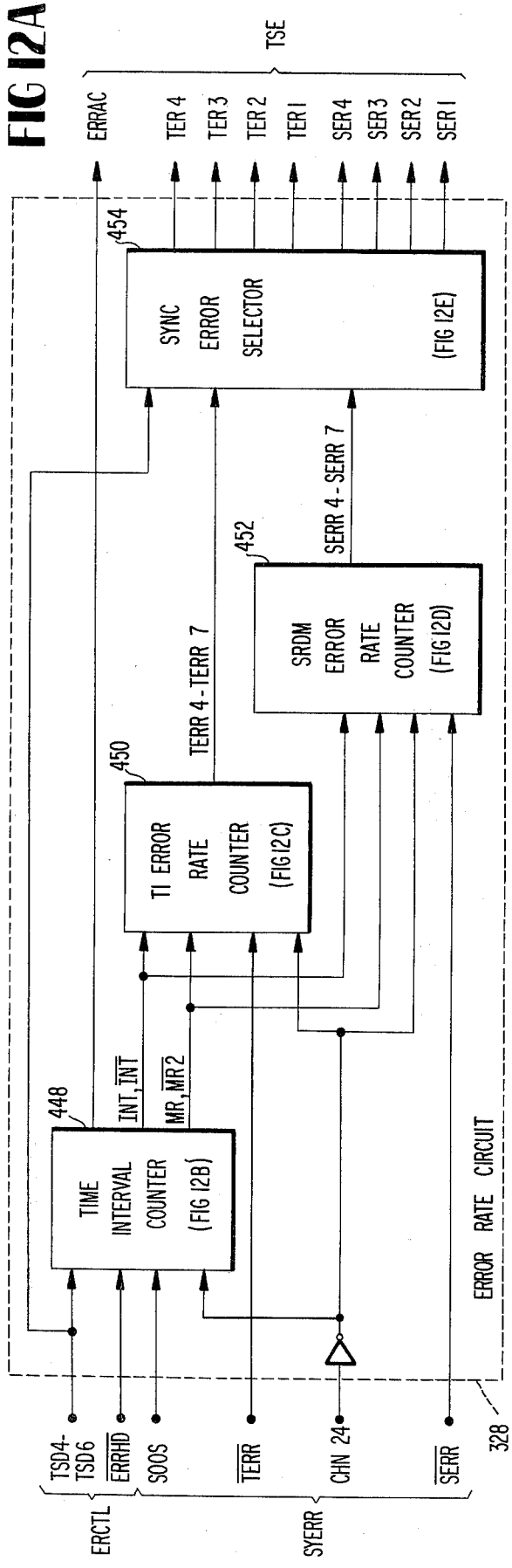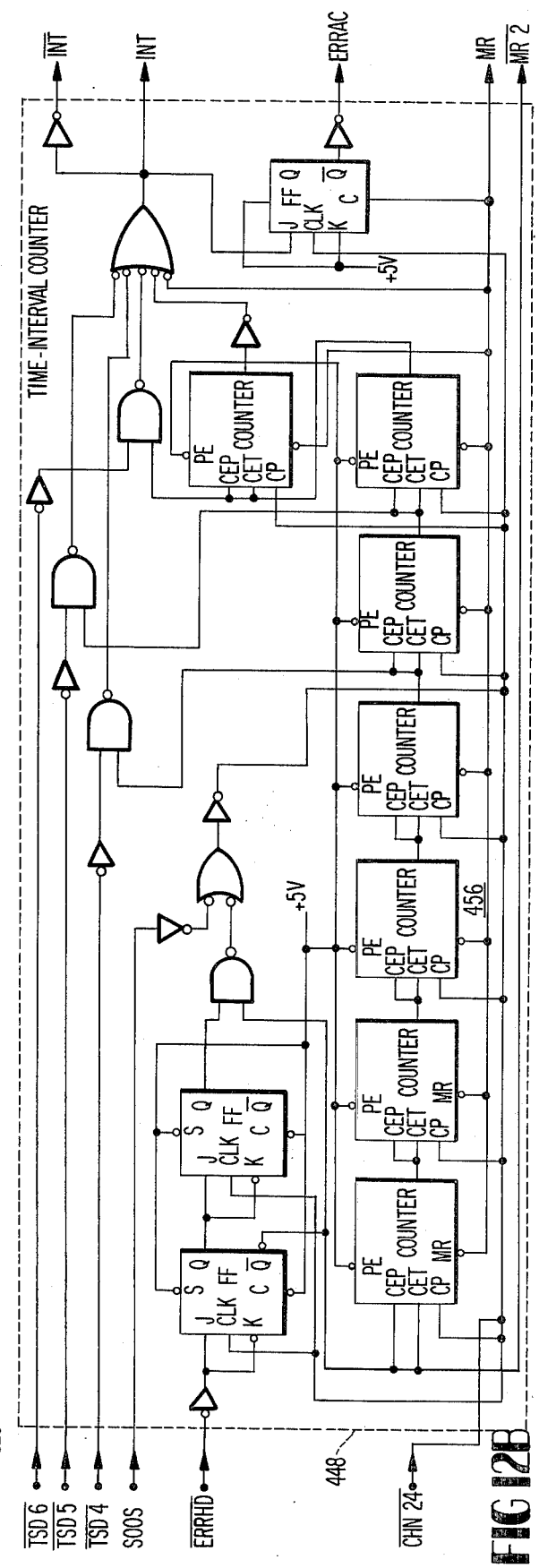

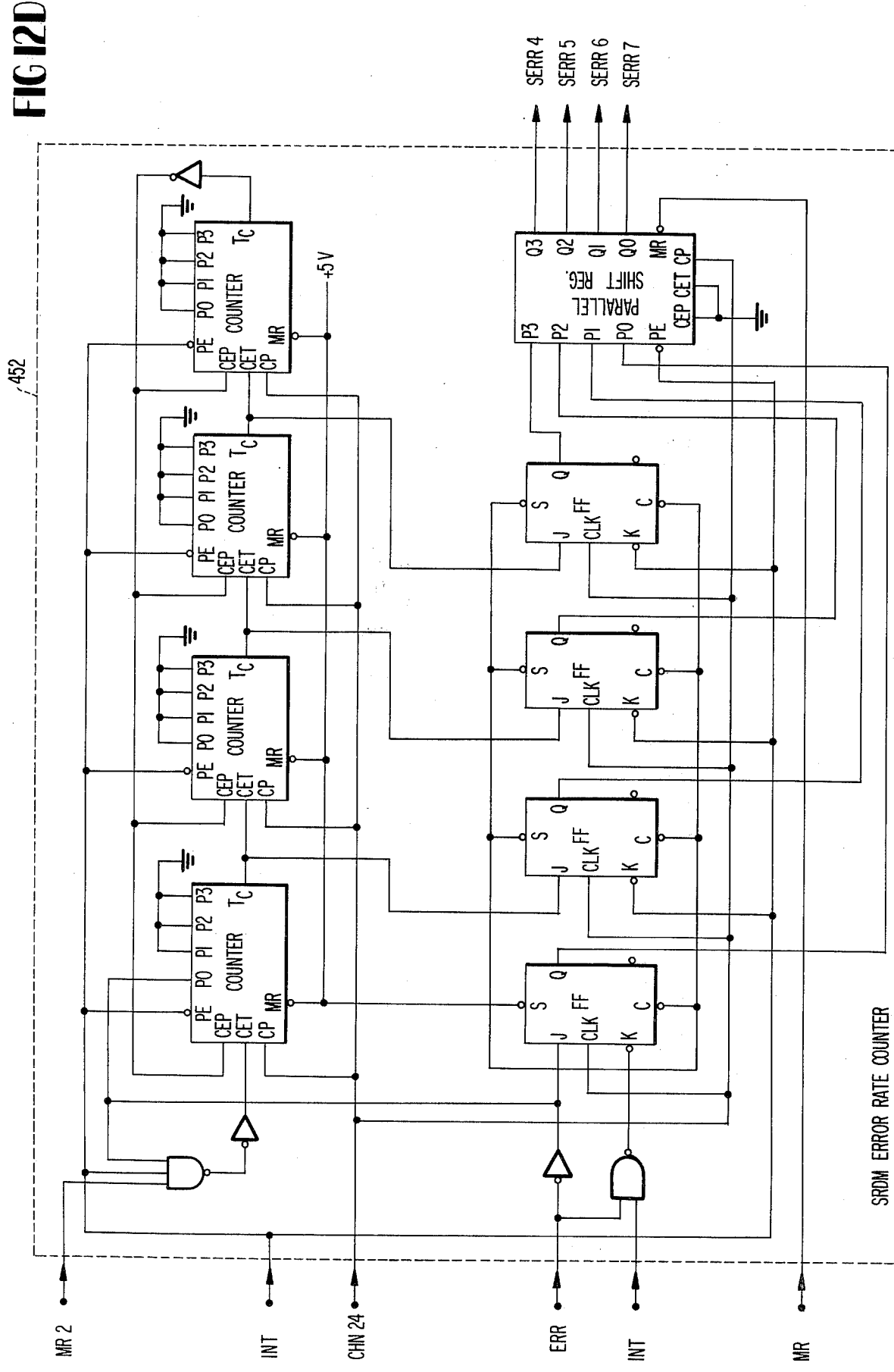

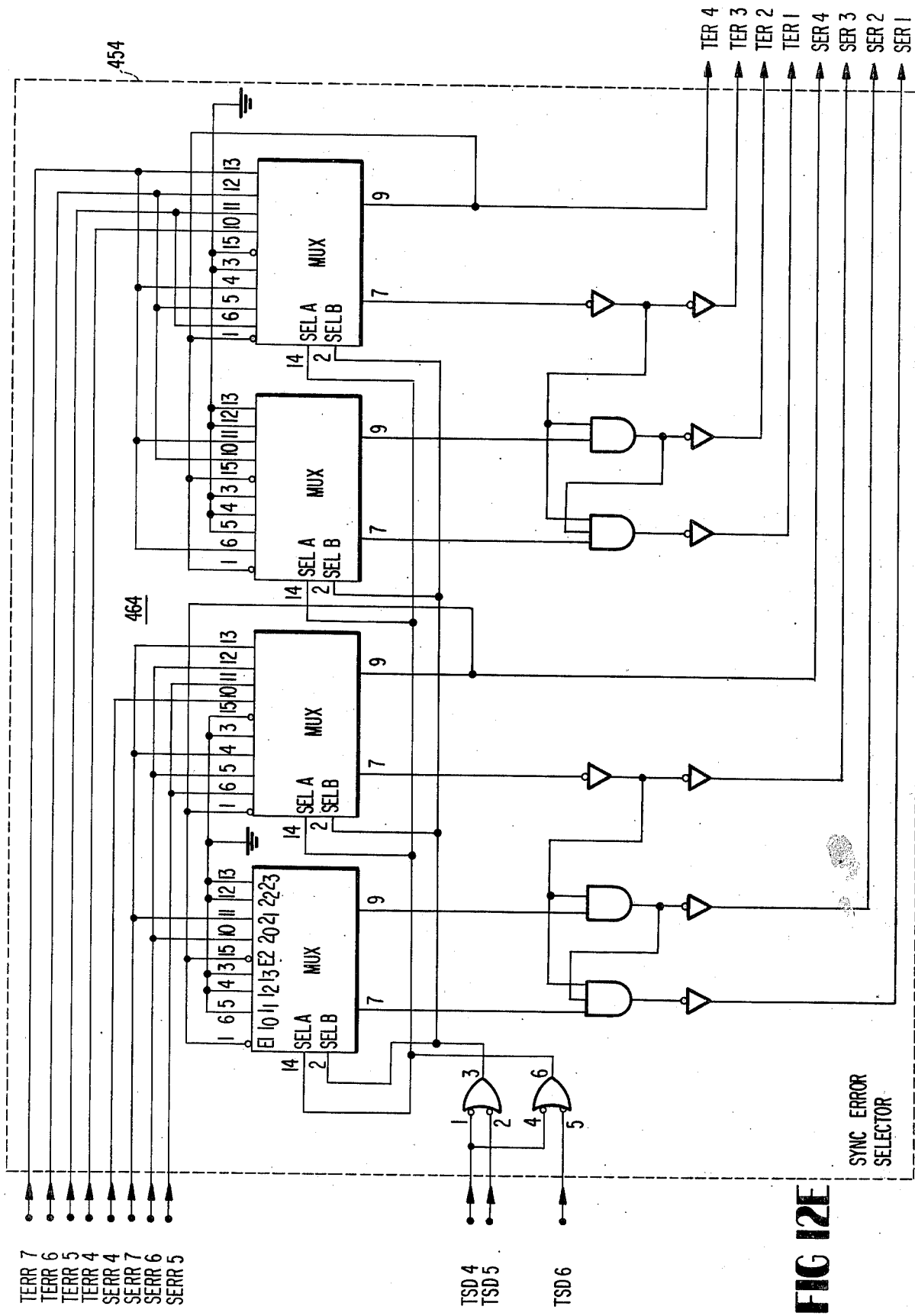
FIG. 12E SYNC ERROR SELECTOR

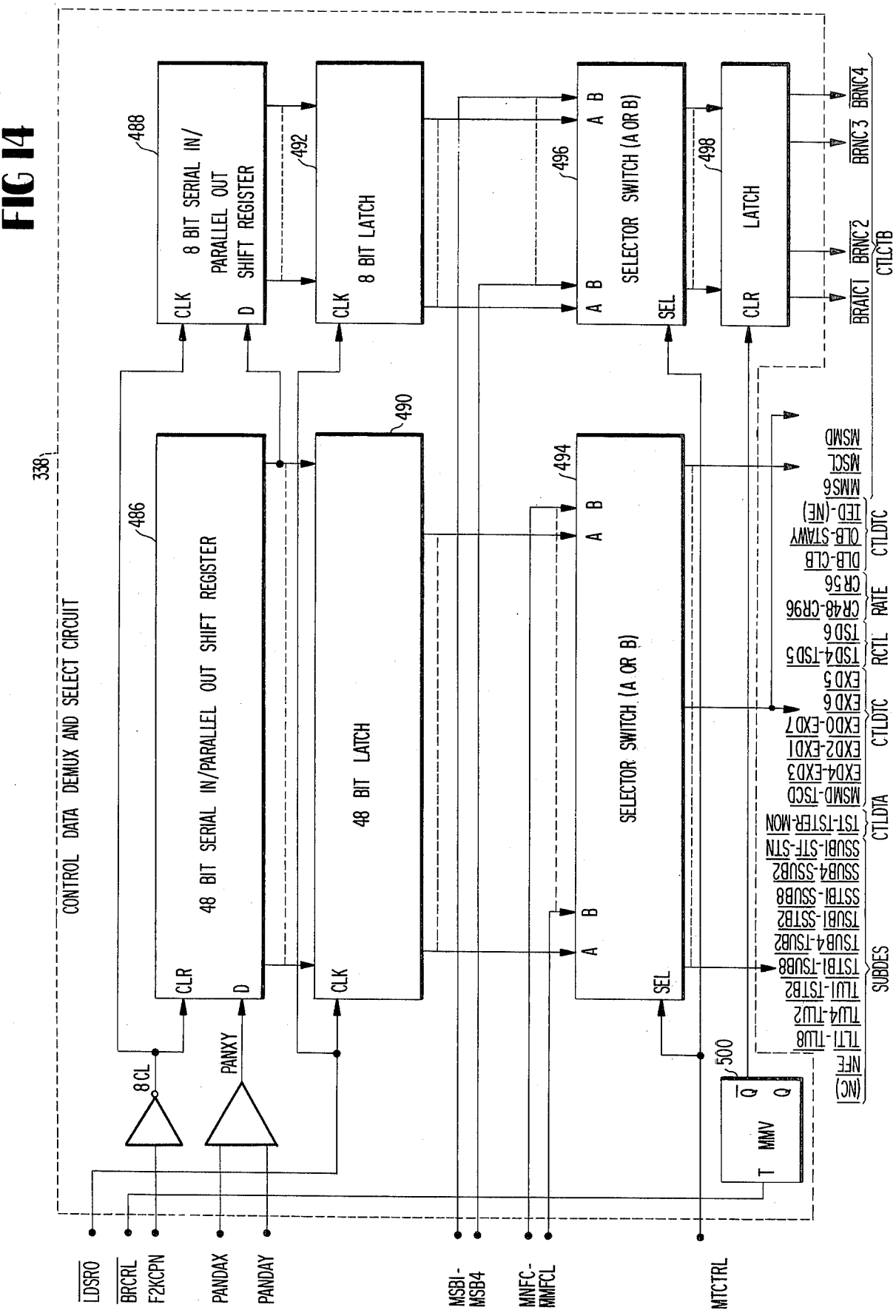

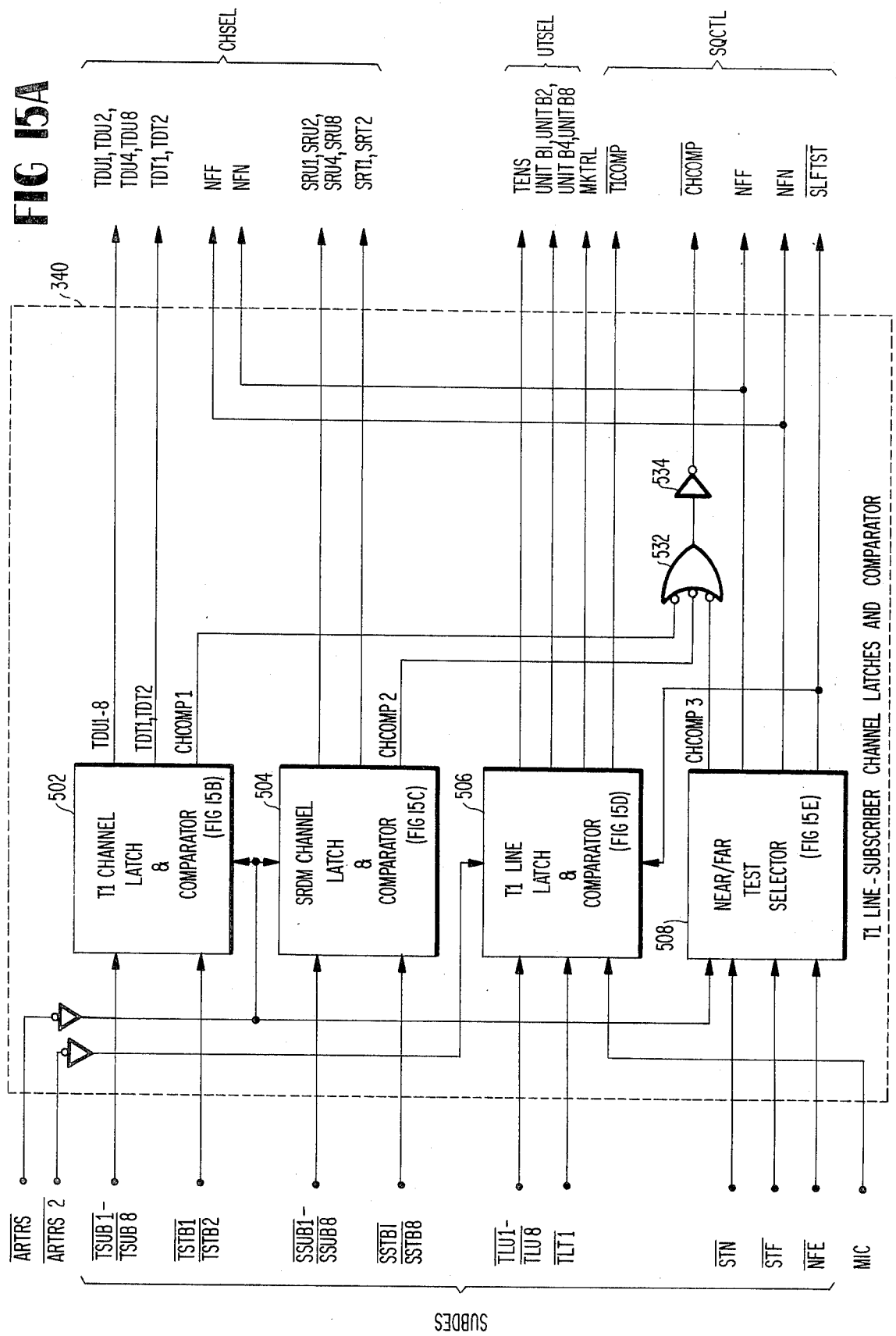

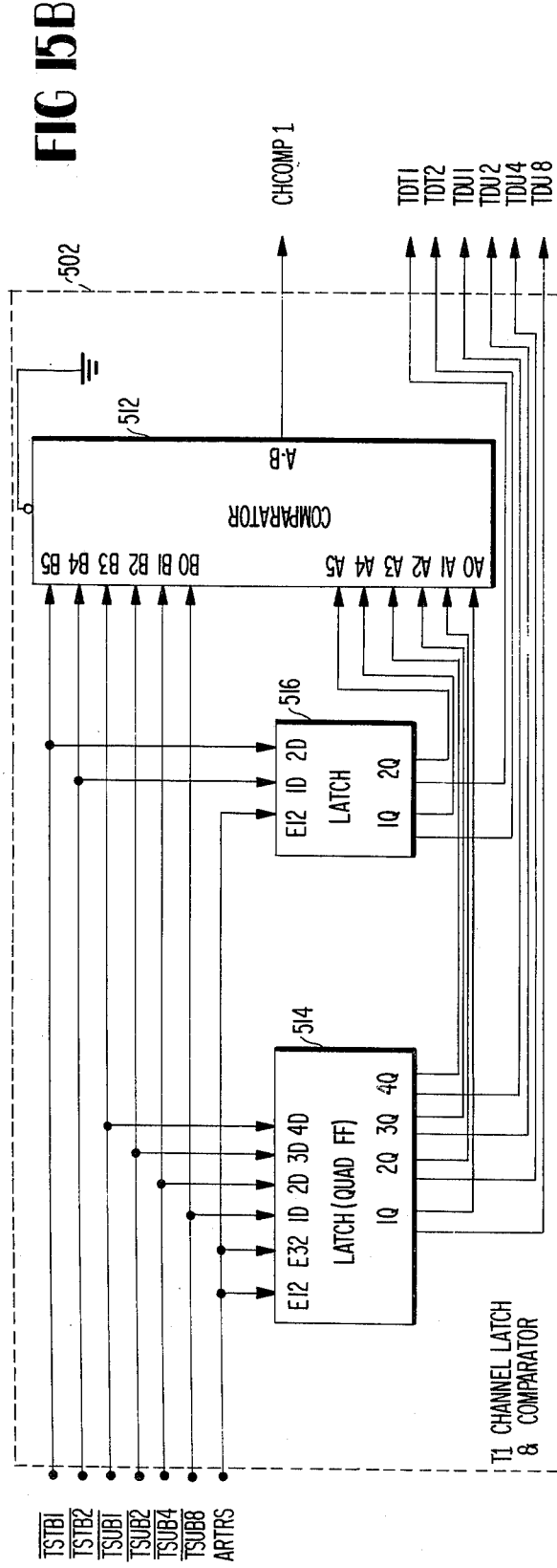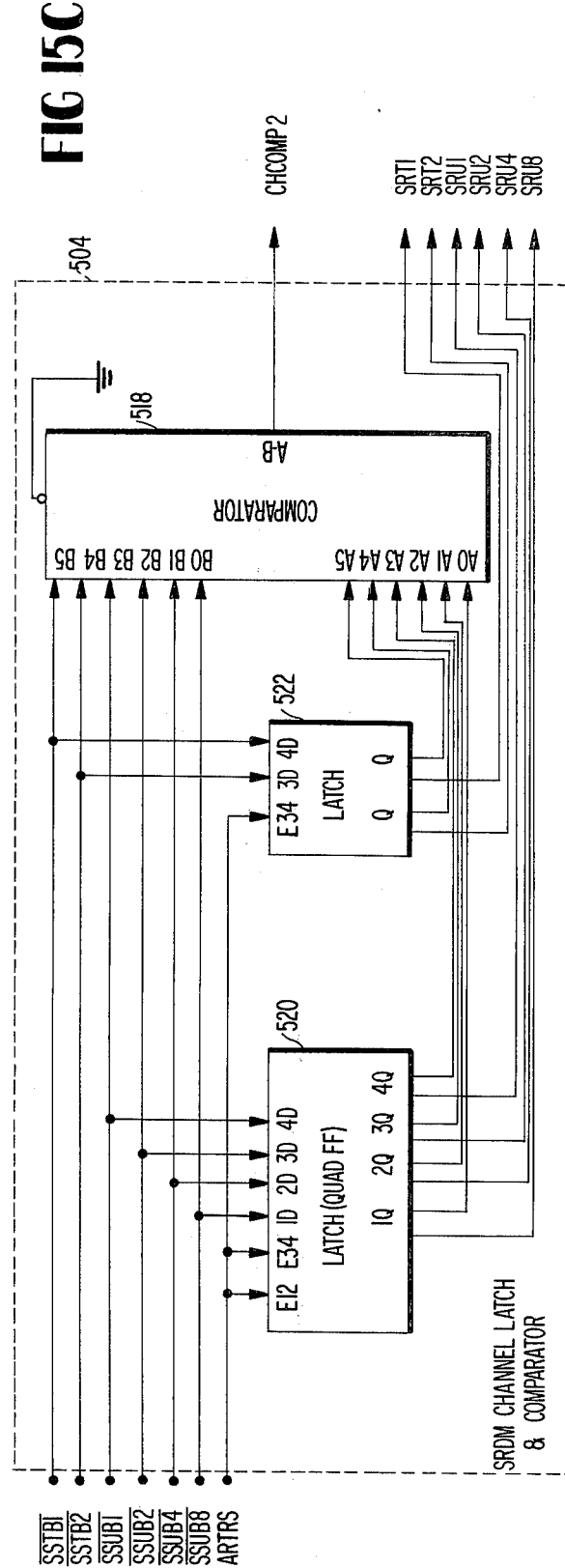

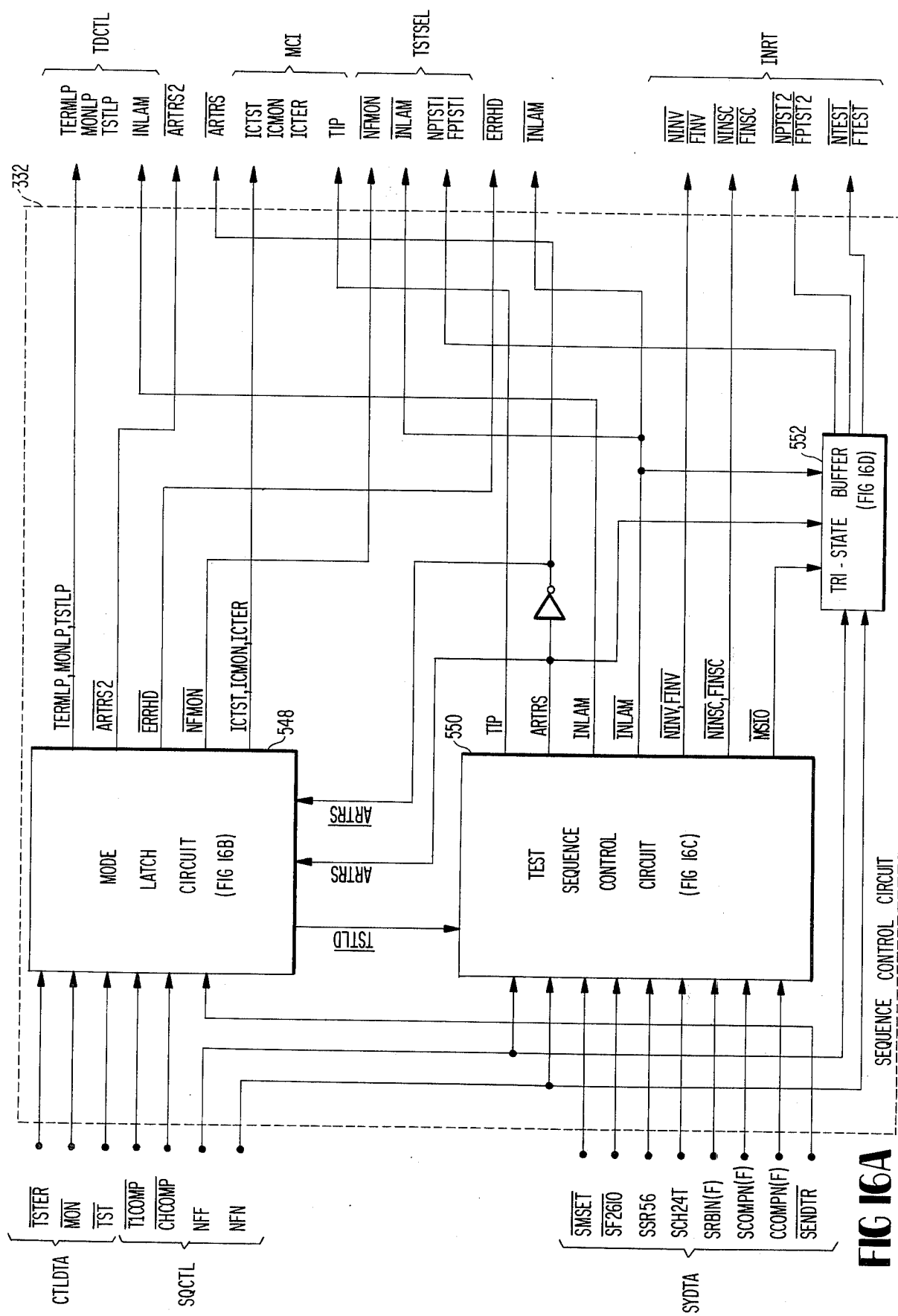

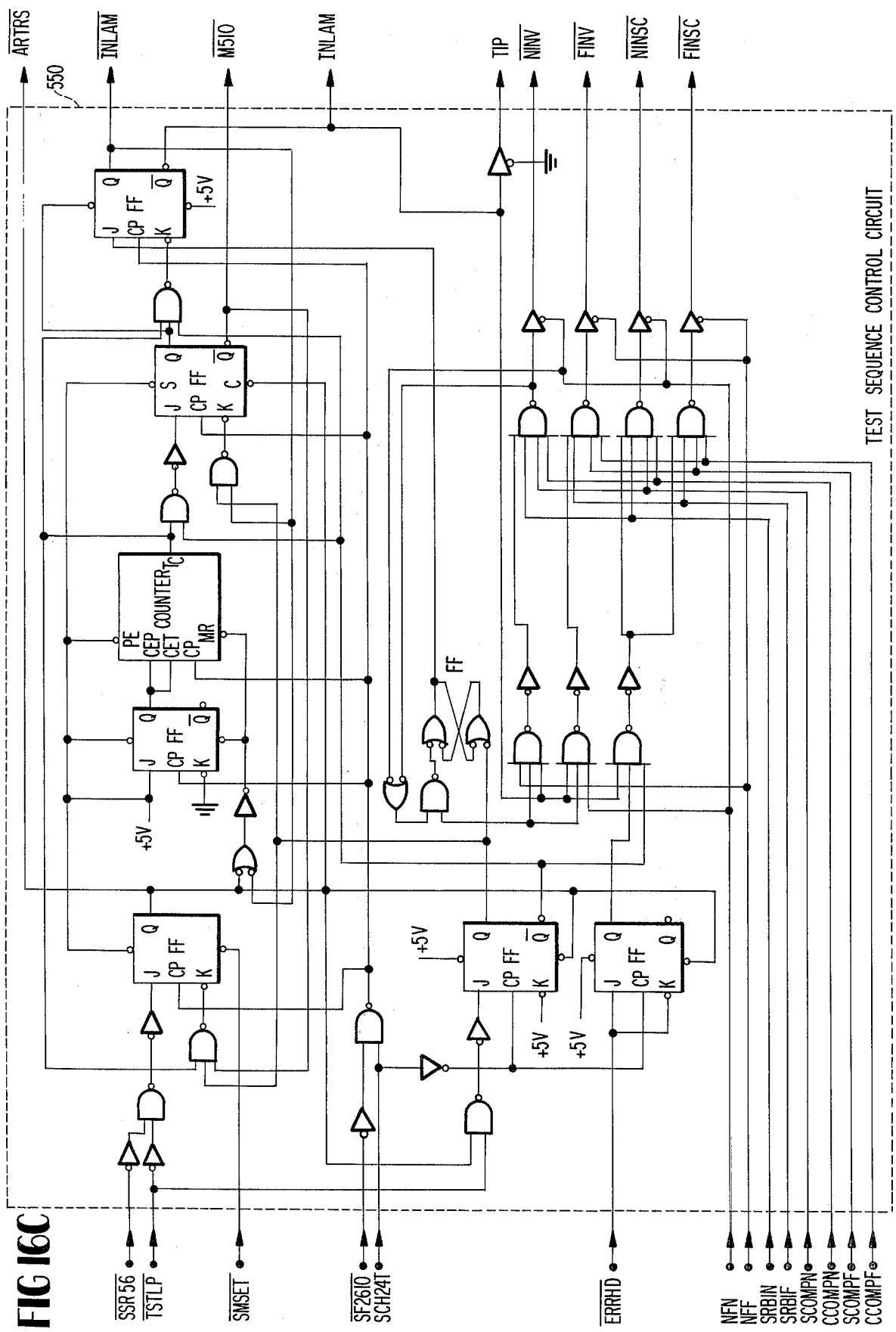

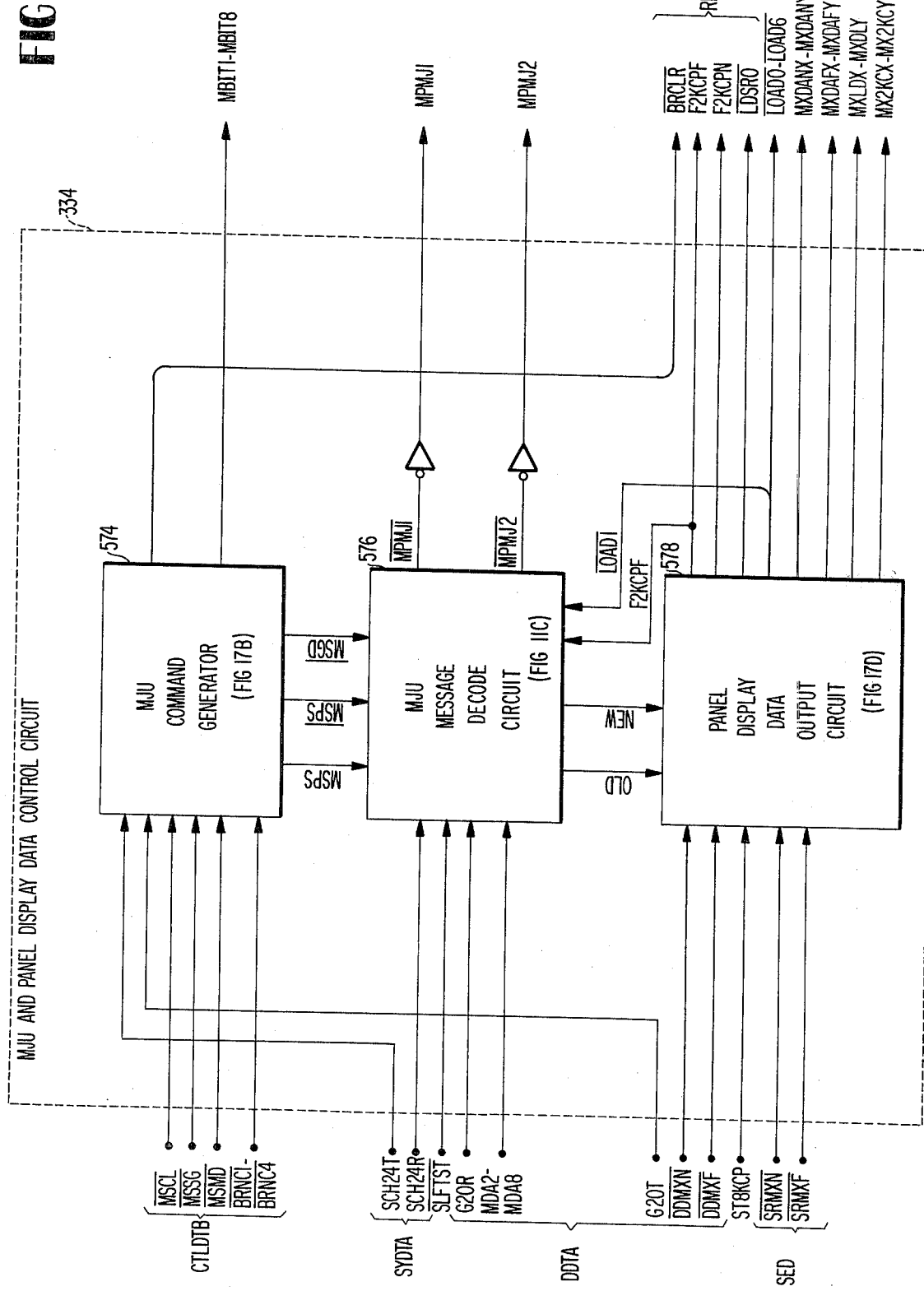

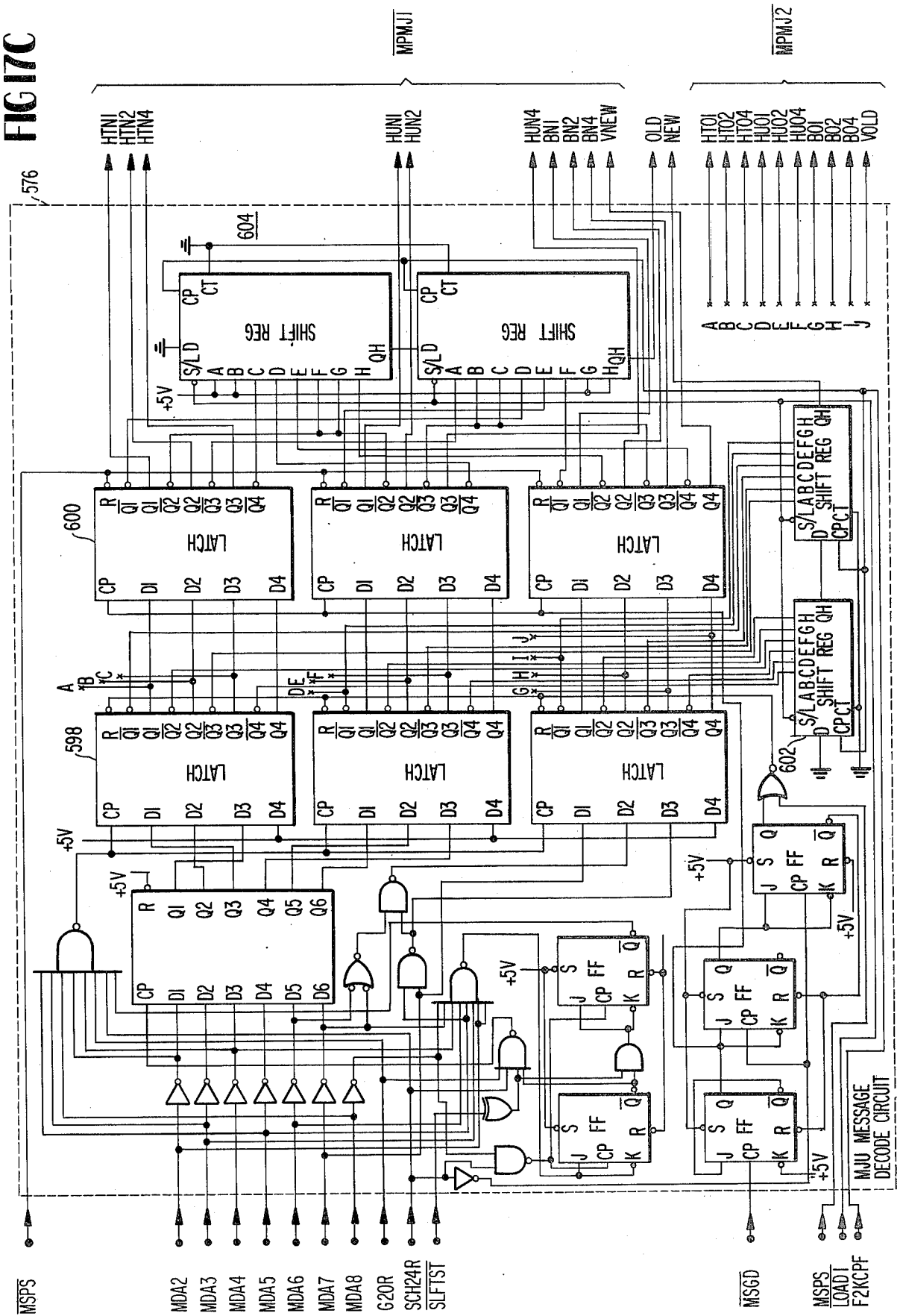

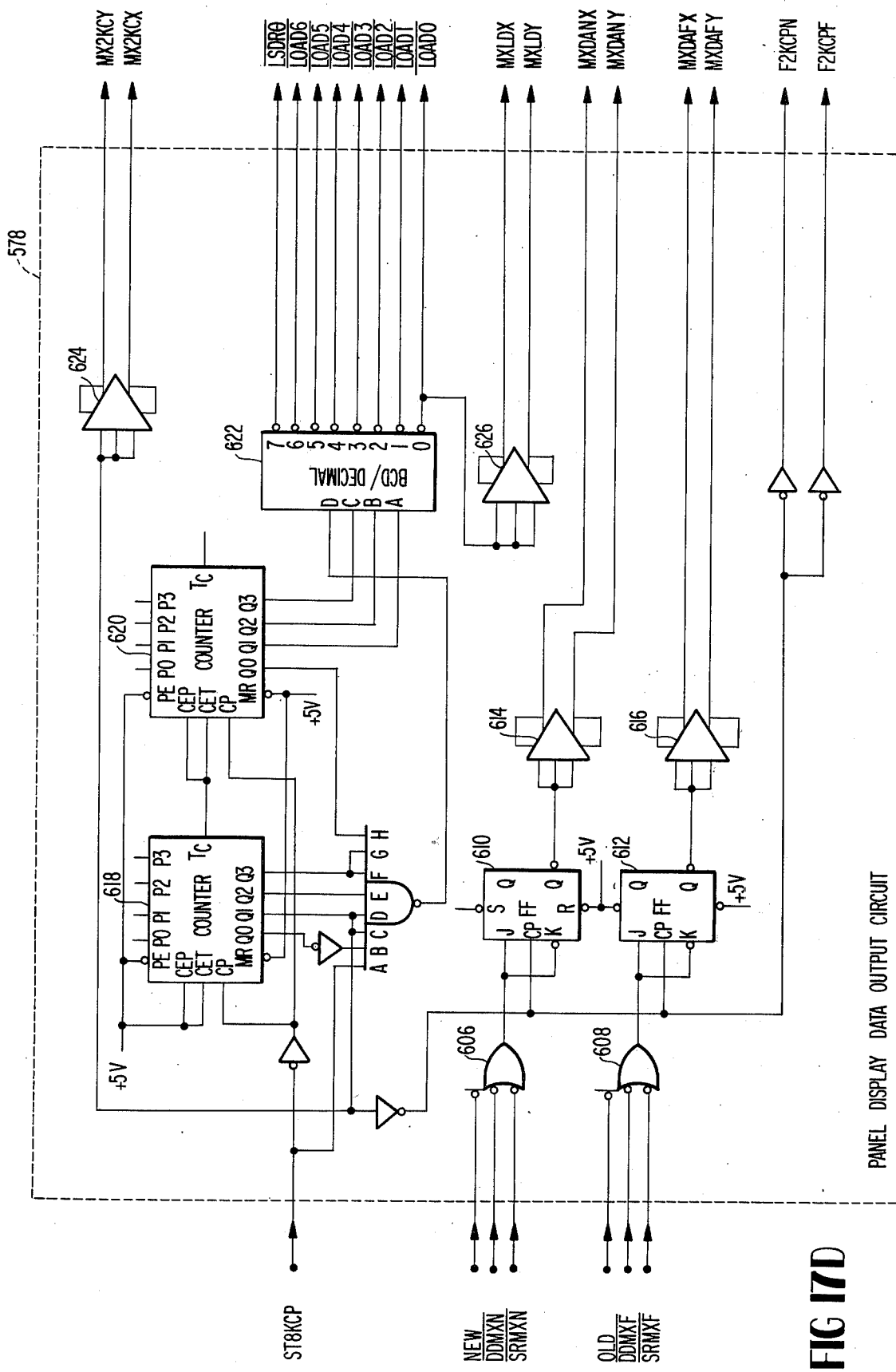
FIG 17D  PANEL DISPLAY DATA OUTPUT CIRCUIT

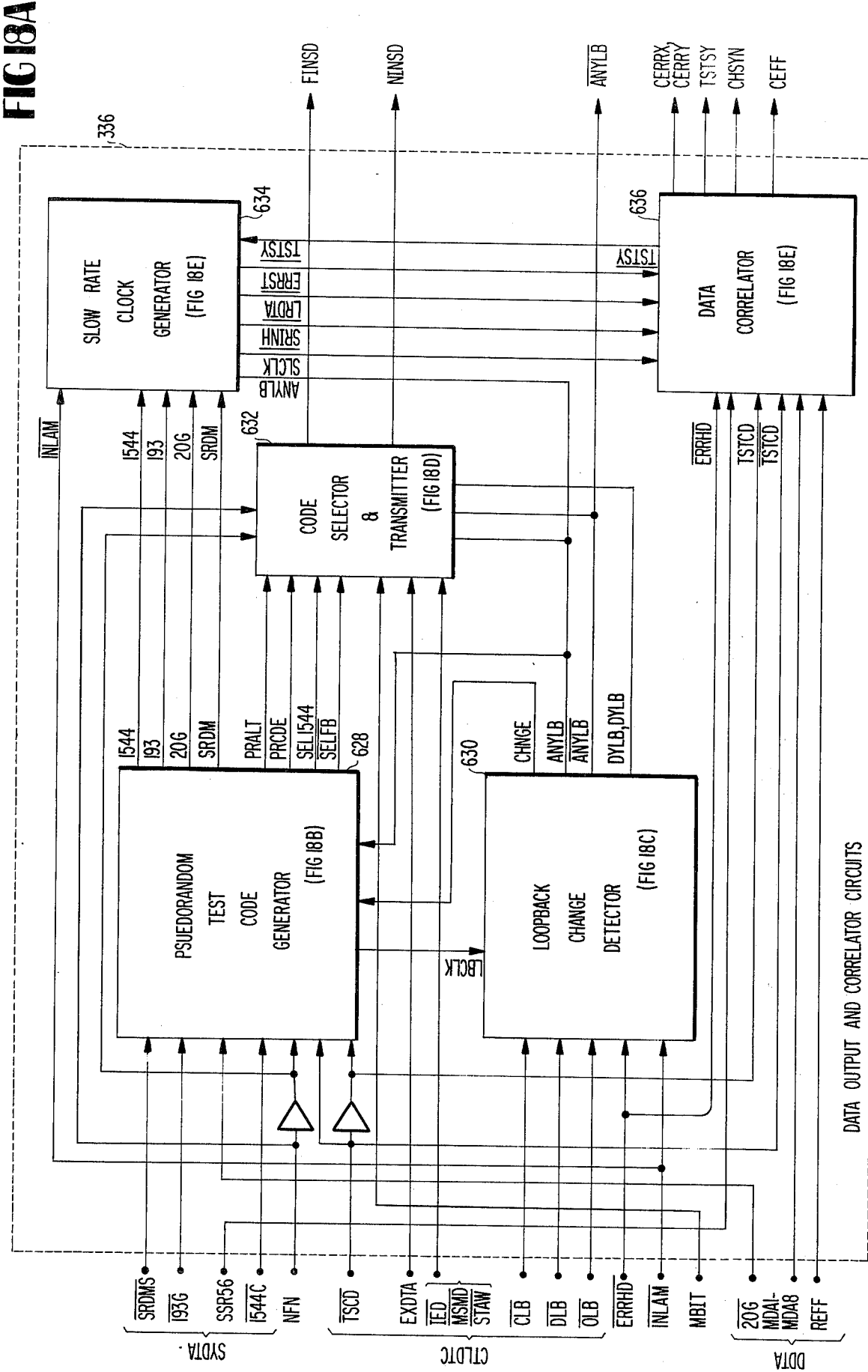

PSEUDORANDOM TEST CODE GENERATOR

METHOD AND SYSTEM FOR SELECTIVELY ACCESSING MULTIPLEXED DATA TRANSMISSION NETWORK FOR MONITORING AND TESTING OF THE NETWORK

BACKGROUND OF THE INVENTION

The present invention relates to monitoring and testing of multiplexed communication networks and, more particularly, to a method and system for selectively accessing desired information in a multiplexed data stream without interrupting the transmission of the data stream to thereby provide for non-disruptive monitoring and testing of transmission paths and equipment serving subscribers in a time division multiplexed data transmission system.

Various systems have been proposed and are presently in use for transmitting data produced by a large number of subscribers from one location to another distant location. These systems almost invariably employ time division multiplexing to combine the data into one multiplexed data stream. The multiplexed data stream is then typically transmitted over transmission networks which include telephone lines, telephone switching equipment and radio transmission (microwave) links.

One system presently in use is referred to as the Dataphone Digital Service (DDS). In such a system, a central office typically serves a large number of local data subscribers. Equipment at the subscribers' stations transmits and receives data over lines connecting the subscribers' stations to the central office. At the central office, the data received from the subscribers' stations is multiplexed and the multiplexed data stream is then transmitted from the central office to a distant central office or, in some situations, to a nearby location, where the data is eventually demultiplexed and transmitted to its ultimate destination.

In one typical common carrier system, the multiplexed data stream transmitted from the subscriber's central office is transmitted at a bit rate of 1.544 megabits per second and the data stream may contain data from up to 460 subscribers. The multiplexing is typically accomplished in two stages with a subrate data multiplexer (SRDM) accepting and multiplexing data from up to 20 subscribers and with a T1 rate data multiplexer (T1DM) accepting and multiplexing up to 23 SRDM channels.

As with data transmitted from the central office serving the local data subscribers, the data received by the central office from other central offices is received in a multiplexed format and is demultiplexed for local transmission to the local subscribers. In this manner, the numbers of very long transmission links between two central offices are minimized since as many as 460 subscribers may be served in a single multiplex of which many can be carried on a transmission link.

Present procedures for testing the data links or communication paths serving each individual subsciber are time consuming and require considerably equipment at each central office. The prevalent manner of testing data links requires access to the network at points preceding the multiplexing of the subscriber data and therefore requires test jacks for each individual subscriber and a pair of test units which can be moved from jack to jack to test the subscriber data links individually. Thus, in a central office serving thousands of subscribers, a test panel having thousands of jacks must be provided. The space consumed by the test jack panel alone can therefore be considerably in one of the larger central offices of a typical common carrier system. Moreover, since this prevalent testing technique requires an operator in insert the test unit connectors in the test jacks on an individual basis and operate the test sets, the testing of all of the subscriber lines may be an enormously time consuming task.

OBJECTS AND BRIEF SUMMARY OF THE INVENTION

It is therefore an object of the present invention to provide a novel method and system for monitoring and testing data networks which carry individual subscriber data and multiplexed data.

It is another object of the present invention to provide a novel method and system for selectively accessing a desired channel or time slot of information in a multiplexed data stream without disturbing the transmission of the data stream and without demultiplexing the data stream.

It is yet another object of the present invention to provide a novel method and system for monitoring and testing data networks serving a large number of subscribers through multiplexing of subscriber data wherein access to each individual subscriber data link is provided automatically and without the need for test jacks.

It is still another object of the present invention to provide a novel test set and method for accessing any subscriber data link in a multiplexed dat network for either monitoring or testing purposes at a point in the network carrying multiplexed data and therefore requiring access to only a single line.

It is a further object of the present invention to provide a novel method and system for monitoring and testing a multiplexed data transmission network at a single point in the system carrying multiplexed data through the monitoring and/or insertion of data in a selected subscriber's channel in the multiplexed data stream without disturbing any other data in the data stream.

In accordance with the present invention, data in the communication network is accessed at the multiplexed level. The multiplexed data stream containing a predetermined pattern of framing signals and subscriber data from a plurality of subscriber channels is accessed directly by line accessing means located in the transmission path of the data stream. The line accessing means does not disturb the transmission of the multiplexed data stream, i.e., allows the multiplexed data stream to pass through the line accessing means, but provides a monitored data signal having the same data content as the multiplexed data stream, thereby essentially providing undisturbed direct access to the multiplexed data stream. A control signal designating one of the plurality of subscriber channels as the desired subscriber channel is generated and framing signals in the multiplexed data stream are detected. The detected framing signals and the generated control signal are utilized to locate the designated one of the plurality of subscriber channels in the multiplexed data stream for monitoring, testing or for other purposes.

In accordance with one embodiment of the invention, the located one of the plurality of subscriber channels is monitored so its data framing and content can be observed. For testing purposes, various codes such as a loopback code or a multipoint junction code may be inserted in the designated one of the plurality of subscriber channels in the multiplexed data stream without demultiplexing the data stream of otherwise disturbing the transmission of the stream. In this manner, loopbacks at various points in the system can be effected and test codes such as a pseudo-random code may be transmitted through the loopback and monitored for errors. The multiplexed data transmission network may therefore be tested for transmission quality and faults at the multiplexed level without disturbing transmission of subscriber data through the network. An entire multiplexed data stream comprising data from a large number of subscribers can thereby be tested from a central location without the need for time consuming operator removal and insertion of test jacks.

These and other objects and advantages of the present invention will become apparent to one skilled in the art to which the invention pertains from the following detailed description when read in conjunction with the appended drawings.

BRIEF DESCRIPTION OF THE DRAWINGS

FIG. 1B is a graphical representation of the multiplexed data stream illustrating the data format of the network of FIG. 1A;

FIG. 2 is a block diagram functionally illustrating the present invention as utilized in connection with the system of FIG. 1;

FIG. 7B is a functional block diagram illustrating the line receiver of FIG. 7A in greater detail;

FIG. 7C is a functional block diagram illustrating the level control circuit of FIG. 7A in greater detail;

FIG. 7D is a functional block diagram illustrating the insert data circuit of FIG. 7A in greater detail;

FIG. 7E is a functional block diagram illustrating the timing extractor of FIG. 7A in greater detail;

FIGS. 9A and 9B are functional block diagrams illustrating the control logic circuits of FIG. 3 in greater detail;

FIG. 10D is a schematic circuit diagram illustrating the frame detector and comparator of FIG. 10A in greater detail;

FIG. 11A is a functional block diagram illustrating the data decoder of FIG. 9A in greater detail;

FIG. 11B is a schematic circuit diagram illustrating the rate control circuit of FIG. 11A in greater detail;

FIG. 11C is a schematic circuit diagram illustrating the byte store and decode circuit of FIG. 11A in greater detail;

FIG. 12A is a functional block diagram illustrating the error rate circuit of FIG. 9A in greater detail;

FIG. 12B is a schematic circuit diagram illustrating the time interval counter of FIG. 12A in greater detail;

FIG. 12D is a schematic circuit diagram illustrating the SRDM error rate counter of FIG. 12A in greater detail;

FIG. 12E is a schematic circuit diagram illustrating the sync error selector of FIg. 12A in greater detail;

FIG. 14 is a functional block diagram illustrating the control data demux and select circuit of FIG. 9B in greater detail;

FIG. 15A is a functional block diagram illustrating the T1 line subscriber channel latches and comparators of FIG. 9B in greater detail;

FIG. 15B is a schematic circuit diagram illustrating the T1 channel latch and comparator of FIG. 15A in greater detail;

FIG. 15C is a schematic circuit diagram illustrating the SRDM channel latch and comparator of FIG. 15A in greater detail;

FIG. 16A is a functional block diagram illustrating the sequence control circuit of FIG. 9B in greater detail;

FIG. 16C is a schematic circuit diagram illustrating the test sequence control circuit of FIG. 16B in greater detail;

FIg. 17A is a functional block diagram illustrating the MJU and panel display data control circuit of FIG. 9B in greater detail;

FIG. 17C is a schematic circuit diagram illustrating the MJU message decode circuit of FIG. 17A in greater detail;

FIG. 17D is a schematic circuit diagram illustrating the panel display data output circuit of FIG. 17A in greater detail;

FIG. 18A is a functional block diagram illustrating the data output and correlator circuits of FIG. 9B in greater detail;

FIG. 18D is a schematic circuit diagram illustrating the code selector and transmitter of FIG. 18A in greater detail;

DETAILED DESCRIPTION

The invention is described herein in connection with one embodiment, the description being organized in accordance with the following Table of Contents:

TABLE OF CONTENTS

I. General System Description (FIGS. 1 and 2)
II. Line Access Unit (FIG. 3)
   A, Line Access Module (FIG. 4)
   B. LAM Select Switch (FIG. 5)
   C. LAM select Switch Control Unit (FIG. 6A)
     1. Unit Select Circuit (FIG. 6B)
     2. Monitor/Test Select Circuit (FIG. 6C)
     3. LAM Switch/Terminate Circuit (FIG. 6D)
   D. Analog Interface Unit (FIG. 7A)
     1. Line Receiver (FIG. 7B)
     2. Level Control Circuit (FIG. 7C)
     3. Insert Data Circuit (FIG. 7D)
     4. Timing Extractor (FIG. 7E)
III. Control and Monitoring Panel (FIGS. 8A, 8B)
IV. Control Logic Circuits (FIGS. 9A, 9B)
   A. T1 and SRDM Framing Detectors and Comparators (FIGS. 10A - 10E)
   B. Data Decoder (FIGS. 11A - 11C)
   C. Error Rate Circuit (FIGS. 12A - 12E)
   D. Sync and Error Data Output Circuit (FIG. 13)
   E. Control Data Demux and Select Circuit (FIG. 14)
   F. T1 Line-Subscriber Channel Latches and Comparators (FIGS. 15A - 15E)
   G. Sequence control circuit (FIGS. 16A - 16D)
   H. MJU and Panel Display Data Control Circuit (FIGS. 17A - 17D)
   I. Data Output and Correlator Circuits (FIGS. 18A - 18F)

I. General System Description

Figure 1A:
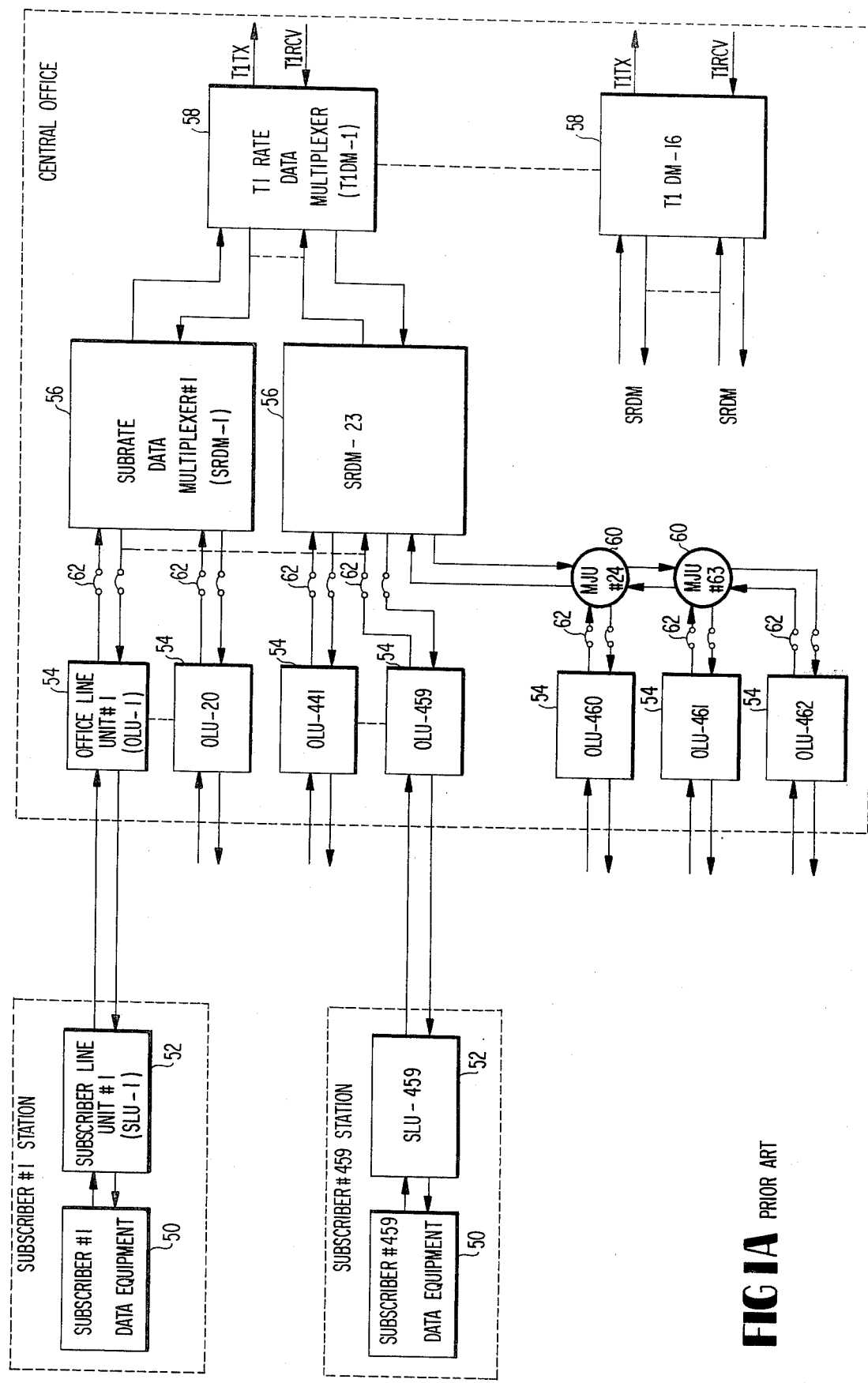
FIG. 1A is a functional block diagram of a prior art data transmission network of the type with which the present invention is utilized.

FIG. 1A illustrates a typical prior art multiplexed data transmission system service network of the type provided by the telephone companies and other common carriers. Referring now to FIG. 1A, a typical common carrier data transmission system includes subscriber data equipment 550 connected to a subscriber line unit (SLU) 52 located at the subscriber premises. The subscriber line unit 52 is typically connected over a four-wire loop circuit (usually in a multipair cable) to an office line unit 54 at a central telephone switching office. Each subscriber station is connected to the central office in this manner and there may be thousands of office line units at the central office, each receiving data from individual subscribers and supplying data to the individual subscribers over the four-wire loop circuit.

Each of the office line units 54 is connected to a data mulitplexer at the central office. To facilitate the description, it will be assumed that all of the subscribers transmit data to the office line units at compatible bit rates such as bit rates which are an even multiple of each other (e.g., 2.4 kilobits per second, 4.8 kilobits per second and 9.6 kilobits per second). In an actual operating system, other bit rates may also be employed and the successive multiplexing steps (illustrated by T1 hereinafter) actually employ various rates; therefore the multiplexing scheme may be slightly different from that illustrated. However, it should be understood that these different types of multiplexing schemes do not alter the basic operating principles of the present invention in any substantial manner.

With the system as described above, the office line units 54 may be connected to subrate data multiplexers (SRDM) 56 which may in turn be connected to higher T1 rate data multiplexers (T1DM) 58. It should be noted that some of the office line units 54 may be connected to the multiplexers 56 through multipoint junction units (MJU) 60 as illustrated. The multipoint junction units 60 are essentially code controllable or addressable switches which receive encoded signals from multiple office line units and selectively apply these signals to the data multiplexer 56.

In a prior art system such as that illustrated in FIG. 1A, test jacks 62 are provided in each of the four-wire loop circuits between the office line units 54 and the first multiplexer stage 56. The test jacks 62 are arranged so that a test unit can be plugged into the transmitting or receiving lines for test access to the individual subscriber lines. It should be noted that the test jacks 62 are located at points in the system at which data to or from a single subscriber is present. It will therefore be appreciated that testing of customer data channels is accomplished in the prior art systems on a customer by customer basis at the individual jacks 62.

The operation of the prior art system may be more fully appreciated with reference to the functional block diagram of FIG. 1A and to the data format diagram of FIG. 1B. Referring to FIGS. 1A and 1B, data from the subscriber data equipment 50 is transmitted through the subscriber line unit 52 to a corresponding office line unit 54 over the four-wire loop circuit connecting these units. The data is transmitted by a predetermined bit rate, e.g., 2.4 kilobits per second, and the office line units 54 presents the data in an appropriate form to the first multiplexing stage 56. For example, in one known system, the subrate data multiplexer 56 receives bytes of data over 20 different customer channels. The office line units 54 sequentially repeat each byte of data received over a 2.4 kilobit/second customer channel 20 times. Accordingly, a byte of customer data is presented 20 times at each of the input lines connected to the multiplexer 56, and the multiplexer 56 sequentially scans the input lines, taking one byte of data from each input line, adding an appropriate framing and/or status signal and transmitting a 20 byte frame of multiplexed data to the second stage multiplexer 58 at the SRDM rate.

The second or T1 rate multiplexer 58 is connected to as many as 23 substrate data multiplexers in the known system illustrated in FIG. 1A. The frames of multiplexed data received from the multiplexers 56 are conventionally multiplexed by the T1 rate data multiplexer 58 and a T1 multiplexed signal is transmitted by the T1 rate data multiplexer 58 to a distant central office. It will be appreciated by one skilled in the art that the receiving channel is essentially the same except that the received T1 information is demultiplexed to separate the 460 customer channels from the multiplexed T1 data signal.

Specifically with reference to FIG. 1B which illustrates a typical dta format for the known system of the type illustrated in FIG. 1A, the T1 rate data multiplexer 58 combines the multiplexed data from the 23 subrate multiplexers 56 to form sequential 193 bit frames of multiplexed data. The substrate multiplexers 56 organize the subscriber channels into eight bit bytes of data containing six subscriber data bits D, an SRDM frame bit F, and a status bit S. The T1DM scans the 23 SRDM's and takes one of these eight bit bytes from each of the 23 SRDM's and then adds eight houskeeping overhead bits and a T1 framing bit to form each 193 bit T1DM frame. A total of 20 of the T1DM frames together form one major data frame containing data from each of the 460 subscribers.

Of course, the above described example assumes that there are 460 subscribers in the system all operating at 2.4 kilobit per second data rate. For subscribers operating at a 4.8 kilobit per second rate, the data is similarly multiplexed but a single T1DM serves a maximum of 230 subscribers. At a data rate of 9.6 kilobits per second, the capacity of one T1DM is 115 subscribers. In addition, the higher bit rate subscribers can be combined with data from the lower bit rate subcribers but such higher bit rate subscribers will occupy more than one channel in a major data frame. For example, a 56 kilobit per second data rate subscriber will occupy one channel in each T1 frame, i.e., 20 channels in each major data frame, whereas a 2.4 kilobit per second data rate subscriber will only occupy one channel in each major data frame.

The prevalent method of testing the system illustrated in FIG. 1A is to manually plug a test set into the jacks 62 associated with a particular subscriber channel. The test set transmits special codes and various test signals over the four-wire loop circuits to prepare signal transmission quality testing and to isolate faults within the transmission system. Typically, the common carrier equipment such as the subscriber and office line units are provided with code operated switching devices for the purpose of loopback testing. A particular code transmitted from the test set will actuate the switching devices in the remote equipment (in the office line unit 54, for example) causing the remote equipment to form a closed loop ahead of and/or behind the unit. A test code may then be transmitted over this closed loop nd monitored for signal transmission quality. Other different codes may be transmitted by the test set to actuate code responsive switches in other remote equipment, e.g., in the subscriber line units. In this manner, each individual piece of common carrier supplied equipment as well as the lines connecting the equipment may be tested for faults and for signal transmission quality.

It can be seen from the foregoing that present test methods require physical access to each customer channel so that a large number of test jacks or access points are required. This may be very costly both in terms of equipment and space. Moreover, only one line at a time can be tested by this technique and a full time manual participation of at least one trained operator is required. It will also be appreciated that testing by the foregoing technique on a state or regional basis requires further operator intervention.

In contrast to test system described in connection with FIG. 1A, the present invention illustrated functionally in FIG. 2 provides automatic test access to any one of a large number of subscriber or customer channels and provides access for test over an entire city, state or region from one location. Referring now to FIG. 2, a line access unit 64 is connected in each of the four-wire loop circuits carrying T1 level multiplexed data between central offices. The T1 lines designated T1TX and T1RCV are connected to each of the T1 rate data multiplexers 58 (T1DM 1 to T1DM 16 corresponding to like mumbered LAM's) and enter the line access unit 64. These T1 lines are connected through associated line access modules (LAM) 66 described hereinafter in greater detail and exit the line access module to complete their normal paths as illustrated. To facilitate a description of the invention, the side of the line access unit 64 nearest the central office is designated the NEAR side and the other side is designated FAR. The multiplexed data received from the NEAR side is designated the NRCV data signal and this data is designated NXMT as it exits the line access unit. The multiplexed data received from the FAR side of the line access unit 64 is similarly designated the FRCV signal and this data is designated FXMT as it exits the line access unit.

Each of the line access modules 66 is connected to LAM select and interface circuits 68 which receive control signals from and supply data signals to control logic circuits 70 as is subsequentially described in greater detail. A control and monitoring panel 72 connected to the control logic circuit 70 provides operator control over the testing and monitoring of the subscriber channels, and a microcomputer 74 may be connected to the control logic circuit 70 for programmed testing and monitoring of the subscriber channels.

As will be appreciated from the description hereinafter, the line access module provides the testing and monitoring system with access to the multiplexed data stream on the transmit and receive T1 lines. The line access module 66 is in series with the multiplexed data stream and presents an impedance to the passage of the multiplexed data stream therethrough. An output signal having voltage levels corresponding to the data signal level in the multiplexed data stream is thereby developed at the transmit and receive data input sides of the line access module 66, and the developed signal is available for application to the LAM select and interface circuit 68 as a monitor signal for use as is described hereinafter.

The line access module 66 contains various switches described hereinafter in greater detail. These switches may be selectively actuated by control signals from the LAM select and interface circuits 68 to permit the system to perform various monitoring and testing functions. For example, in a monitor mode of operation, the multiplexed data stream passes through the line access module 66 unaltered insofar as data content is concerned. It should be understood that the multiplexed data stream may be attenuated or amplified depending upon whether or not the line access module 66 contains active amplification circuits. However, this does not affect the data content of the multiplexed data stream and therefore transmission of the multiplexed data stream is undisturbed.

In the monitor mode of operation, the data signals developed across the line access module 66 at the near and far ends are applied to the LAM select and interface circuits 68. The framing signals in the multiplexed data stream are detected so that the location of each subscriber channel in the multiplexed data stream can be ascertained. Either the microcomputer 74 of the control and monitoring panel 72 provides a signal designating one of the subscriber channels as the channel to be monitored. The control logic circuits 70 locate the designated one of the subscriber channels in the multiplexed data stream and the data contained in that channel is supplied to either the control and monitoring panel 72 or the microcomputer 74 for monitoring purposes. It should be noted that during this entire monitoring procedure the multiplexed data stream passes through the line access module 66 without disturbance of the data content.

In a test mode of operation, appropriate switches in any selected one of the line access modules 66 open the data path through the selected line access module 6 and reroute the multiplexed data stream through a gating circuit in the LAM select and interface circuit 68. For example, the T1TX line through the line access module 66 is opened and appropriately terminated by switches responding to the control signals from the LAM select and interface circuits 68. The multiplexed data stream NRCV entering the line access unit on the near T1TX line is routed to the gating circuit in the LAM select and interface circuits 68 and this multiplexed data stream is then returned as the NXMT signal to the far T1TX line by the gating circuit in the LAM select and interface circuits 68.

The control logic circuits 70 locate the desired subscriber channel in response to the framing signals and the channel designating signals as was previously mentioned. The multiplexed data stream passes through the gating circuit in the LAM select and interface circuits 68 without disturbance until a desired test is initiated. When, for example, a test requiring a loopback is initiated at the control and monitoring panel 72 or by the microcomputer 74, the gating circuit in the LAM select and interface circuit 68 blocks the passage of the byte of data in the designated subscriber channel of the multiplexed data stream. A loopback code or other desired test code is inserted in place of the subscriber data in the subscriber channel being tested. This insertion of a test code in the multiplexed data stream does not disturb the data stream except at the location of the designated subscriber channel in the data stream. In the next major frame of multiplexed data, another test code such as a pseudo-random code may be inserted in the same manner as the loopback code and in subsequent data frames the loopback and psuedo-random codes may be alternatively inserted at the location of the designated customer channel in the multiplexed data stream.

The insertion of the loopback code in the subscriber channel will cause a loopback at a desired location in the designated subscriber's transmission network. The transmitted psuedo-random test code will follow this loopback path and return to the line access unit 64. The test code, being in the multiplexed data stream at the location of the designated subscriber channel, can thus be monitored to determine if the transmission network is operating properly throughout the closed loop formed in the network.

Again, it can be seen that the multiplexed data stream is accessed and a designated subscriber channel is located without disturbing the transmission of the multiplexed data stream in the test mode of operation, as in the monitor mode of operation, even through the data stream is diverted through the LAM select and interface circuits 68. The data content of the multiplexed data stream also remains undisturbed except for the designated subscriber channel. As will be seen hereinafter, the system may provide for the monitoring of the status of a subscriber channel prior to initiating any testing procedure to insure that the tested subscriber channel is not carrying subscriber data when a test is initiated, thereby further insuring that subscriber data is not disturbed by the testing system.

II. Line Access Unit

As was previously mentioned, each of the line access modules 66 is connected in one of the T1 level data lines. Each set of T1 lines includes two wires for transmission in one direction and two wires for transmission in the opposite direction. To facilitate the description, the data received from the side of the transmission network designated NEAR is hereinafter referred to as the near received data NRCV-X, NRCV-Y. The near received data is designated the near the transmitted data NXMT-X and NXMT-Y as it exists the line access module. A similar convention has been followed in connection with the data received from the side of the transmission network designated FAR, i.e., the data received from the far end is designated FRCV-X, FRCV-Y, and the same data exiting the line access module is designated the far transmitted data FXMT-X, FXMT-Y. It will be appreciated that the prefixes N and F differentiate between the near and far data and the suffixes X and Y differentiate between the two wires of the transmission path. As was previously mentioned, this near and far data passes through the line access module without disturbance and without any diversion of monitoring unless the system is in either monitor or test mode.

Figure 3:
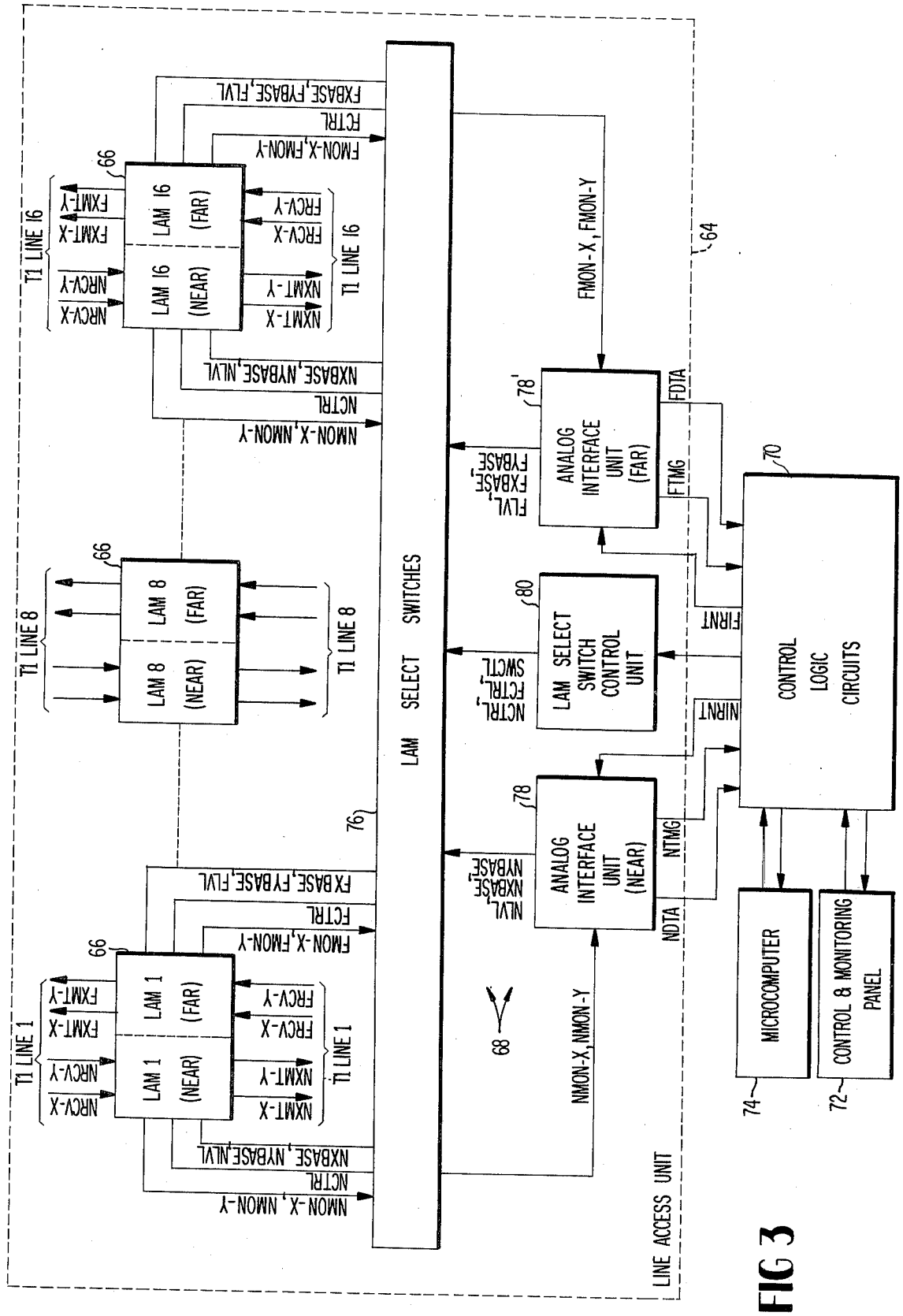
FIG. 3 is a functional block diagram illustrating the line access unit of FIg. 2 in greater detail.

Referring now to FIG. 3, with the system in either monitor or test mode, a LAM select switch 76 provides near and far control signals NCTRL and FCTRL to the particular line access module 66 selected for access by the LAM select switch 76. The LAM control signals effect the operation of appropriate switches in the line access module 66 and result in the application of the near and/or far multiplexed data to the LAM select switch 76 as the respective NMON-X, NMON-Y and FMON-X, FMON-Y signals. The near and far monitored data NMON-X, NMON-Y and FMON-X, FMON-Y is supplied to respective identical analog interface units 78 and 78' described hereinafter in greater detail. The near analog interface unit 78 supplies the near level or gain control signal NLVL and the near data signal NXBASE, NYBASE through the LAM select switch 76 to the selected line access module 66. The analog interface units 78 and 78' also supply respective near and far data signals NDTA and FDTA to the control logic circuits 70. Timing signals NTMG and FTMG extracted from the respective near and far data signals by the analog interface units are also supplied to the control logic circuits 70.

The control logic circuits 70 supply a near and far insert data signal NINRT and FINRT to the respective analog interface units 78 and 78'. A LAM select and control signal NFSEL is supplied from the control logic circuits 70 to a LAM select switch control unit 80 which in turn provides near control NCTL and far control FCTL signals to the selected line access module 66 through the LAM select switch 76. A LAM select switch control signal SWCTL which controls the selection of a desired one of the line access modules 66 is also supplied to the LAM select switch 76 from the LAM select switch control unit 80.

In operation, the system may be placed in either a monitor or test mode by manipulating appropriate control switches on the control and monitoring panel 72. The panel operator also designates a particular T1 line to be monitored or tested as well as both a T1 channel and an SRDM channel. Since the location of each customer channel in the multiplexed data of the transmission network is known to the control panel operator from a directory of subscriber channels, the panel operator can in this manner designate a particular subscriber channel to be monitored or tested.

The control panel operator then places the system in either monitor or test mode. Assuming that monitor mode is selected, the control logic circuits 70 generate appropriate selection and command signals NFSEL for application to the LAM select switch control unit 80. The LAM select switch control unit 80 generates a switching control signal SWCTL which operates switches in the LAM select switch unit 76 to connect the desired line access module to the analog interface units 78 and 78'. In the monitor mode, the LAM select switch control unit 80 selects a desired line access module for connection to the analog interface units but does not supply near and far control signals NCTRL and FCTRL to the line access modules 66 for diversion of the multiplexed data streams. Thus, the near and far monitored data from the selected LAM is supplied through the LAM select switch to the analog interface units 78 and 78' as the NMON-X, NMON-Y, and FMON-X, FMON-Y signals while the data streams on the T1 lines pass through the line access module 66 without interruption.

The monitored data is received by the analog interface units 78 and 78' and is supplied to the control logic circuits 70 as the near and far data signals NDTA and FDTA, respectively. In addition, timing signals NTMG and FTMG are extracted from the monitored data signals by the analog interface units 78 and 78'. The near and far data signals are received by the control logic circuits 70 together with the near and far timing signals, and the control logic circuits 70 detect the framing pattern in the multiplexed data stream. Errors in the framing pattern are detected by the control logic circuits 70 and a bit error rate or other framing pattern error indication is provided to the control and monitoring panel 72. In addition, the designated subscriber channel is located in the multiplexed data stream by a comparison of the designated T1 and SRDM channels with the framing patterns in the multiplexed data stream as will subsequently be described in greater detail. The data in the desired subscriber channel, once located, is supplied to the control and monitoring panel 72 for monitoring pupposes.

In test mode, the desired line access module 66 is selected by the LAM select switch in response to the signal SWCTL from the LAM select switch control unit 80 in the same manner as in the monitor mode. However, additional switch control signals are supplied to the selected line access module 66 to open the multiplexed data path through the line access module and appropriately terminate the T1 line. The multiplexed data stream is thereby diverted through the LAM select switch 76 to the analog interface unit 78.

In test mode, a selected one of the near or far received multiplexed data signals is diverted around the line access module at any instant. The diverted multiplexed data stream is received by the analog interface unit and is then returned through the LAM select switch 76 to the selected line access module 66 as the NXBASE, NYBASE or FXBASE, FYBASE signal. The near and far level or gain control signals NLVL and FLVL are applied to the appropriate LAM to control the amplification of the data stream returned to the LAM. The line access module 66 then retransmits the multiplexed data signal on the appropriate T1 lines as the NXMT-X, NXMT-Y or FXMT-X, FXMT-Y signal.

It can thus be seen that in test mode the selected data stream is diverted from the input side of the line access module through the LAM select switch 76 and through a gating circuit in the analog interface unit to the output side of the line access module 66 for transmission on the T1 data line. As the multiplexed data stream passes through the analog interface unit 78, the designated subscriber channel in the multiplexed data stream is located by the control logic circuit 70 and data can be inserted in a selected subscriber channel for loopback and other testing purposes as was previously mentioned. In addition, the data in the designated subscriber channel is supplied to the control and monitoring panel 72 so as to provide an indication of the test results.

A. Line Access Module

Figure 4:
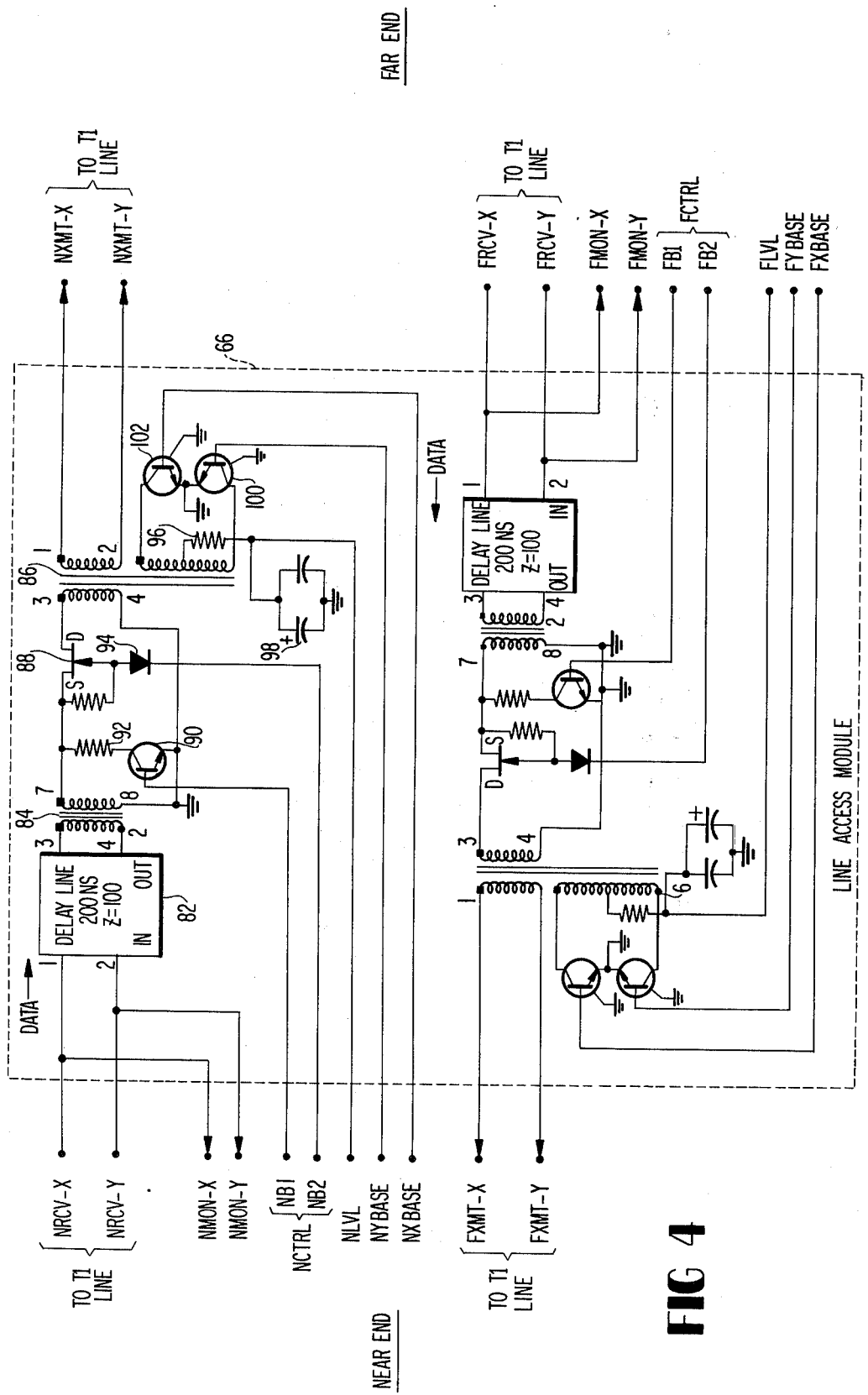
FIG. 4 is a schematic circuit diagram illustrating the line access module of FIG. 3 in greater detail.

To facilitate an understanding of the invention, the line access module 66 of FIG. 3 is illustrated in greater detail in FIG. 4. Referring now to FIG. 4, the T1 line pair carrying the near received data NRCV-X, NRCV-Y is connected to a suitable conventional delay line such as the illustrated 200 nanosecond, 100 ohm impedance delay line 82 in FIG. 4. The output signal from the delay line 82 is applied through a transformer 84 to a transformer 86 through a series connected field-effect transistor (FET) 88. The output signal from the transformer 86 is applied to the near T1 line pair as the NXMT-X, NXMT-Y signal.

The collector and emitter electrodes of a transistor 90 are connected through a line terminating across the output winding of the transformer 84. The near control signal NB1 is applied to the base electrode of the transistor 90 and the near control signal NB2 is applied to the gate electrode of the field effect transistor 88 through a diode 94. The near monitor signal NMON-X, NMON-Y is supplied as a output signal from the line access module through direct connection of their respective output lines to the near received line pair carrying the multiplexed NRCV-X, NRCV-Y data.

The gain or level control signal NLVL is applied through a resistor 96 to the center tap of a second input winding of the transformer 86 and through a parallel capacitor network to ground. The return or diverted multiplexed data signal NYBASE, NXBASE is supplied to the respective base electrodes of respective transistor amplifiers 100 and 102 connected to the input winding of the transformer 86 in a conventional push-pull configuration.

The line access module 66 of the illustrated embodiment of the invention comprises two identical circuits, one for the near data and one for the far data. The far multiplexed data signal FRCV-X, FRCV-Y receiver over the T1 line is applied to a circuit identical to that described in connection with the near data circuit as illustrated in FIG. 4. Since these circuits are identical, the circuit associated with the far multiplexed data will not be described herein in detail. Moreover, since the operation of the two halves of the line access module (the upper near half and the lower far half in FIG. 4) is identical, the operation of only the half associated with the near data will be described.

In operation, the delay line 82 and transformer 84 present an impedance to the near received data signal and the near monitor signal NMON-X, NMON-Y is developed at the input terminals of the delay line 82. The monitor signal is thus an exact replica of the near received data signal or stream insofar as data content is concerned. While the near multiplexed data signal is thus always available for monitoring, the near multiplexed data signal will normally pass through the delay line 82, the transformer 84, the field-effect transistor 88 and the transformer 86 undisturbed in data content.

As will be described hereinafter in greater detail, a particular line access module may be selected by the LAM select switches 76 of FIG. 3 and the near and far monitor data is available for monitoring at the instant the line access module is selected. If the system is placed in test mode, either the near control signals NCTRL or the far control signals FCTRL are supplied to the selected line access module and, assuming that the near control signals are supplied to test the near data network, the transistor 90 is gated into conduction to appropriately terminate the near T1 line while the field-effect transistor 88 is cut off to open the path for the multiplexed T1 data through the line access module. As was previously mentioned, the monitored near data is, in test mode, returned to the selected line access module 66 from the analog interface unit 78 as the NYBASE, NXBASE signal for transmission over the T1 line at the far end of the line access module 66. The NYBASE, NXBASE multiplexed data signal is supplied to the push-pull amplifier circuit containing the transistors 100 and 102 and is coupled through the transformer 86 to the T1 line as illustrated. The monitored multiplexed data stream is utilized to generate a gain control signal NLVL for gain control of the push-pull amplifier circuit as will subsequently be described in greater detail.

Accordingly, the line access module 66 provides access to the multiplexed data stream by providing the NMON-X, NMON-Y signal. In monitor mode, the NMON-X, NMON-Y signal is supplied to the analog interface circuit 78 for monitoring purposes without interrupting the path for multiplexed data transmission through the line acess module. In test mode, the path for the multiplexed data stream through the line access module 66 is opened and the T1 lines are appropriately terminated. The monitored data is then returned to the line access module through a gating circuit as will hereinafter be described for continued transmission on the T1 line. It will thus be appreciated that in test mode, the multiplexed data stream is essentially diverted around the line access module 66 for utilization in testing the transmission system. However, it will be appreciated from the subsequent description that the transmission of the multiplexed data stream is undisturbed while testing is accomplished.

A more detailed description of the line access module may be obtained in copending United States patent application Ser. No. 641,712 filed Dec. 17, 1975, assigned to the assignee of the present invention. The foregoing patent application is hereby incorporated herein by reference.

B. LAM Select Switch

Figure 5:
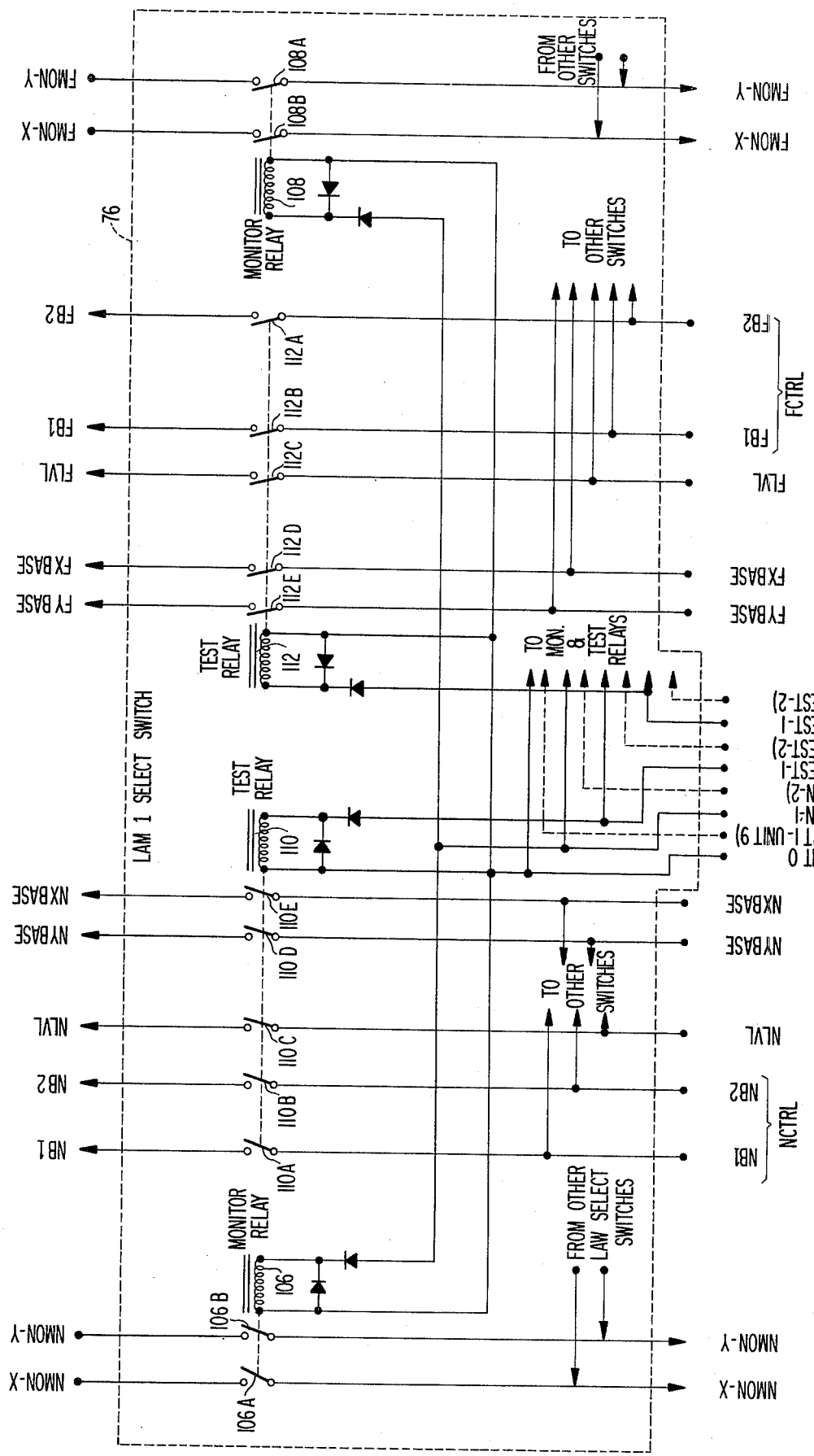
FIG. 5 is a schematic circuit diagram illustrating the LAM select switches of FIG. 3 in greater detail.

The signals supplied to and from the line access modules 66 are all routed through the LAM select switches 76 illustrated in detail in FIG. 5. It should be understood that each line access module 66 is associated with its own LAM select switch as illustrated in FIG. 5. Since each LAM select switch is identical and all signals supplied to and from the LAM select switches are identical with the exception of the LAM selection signals SWCTL as is hereinafter described, only one LAM select switch is illustrated and described in connection with FIG. 5.

Referring now to FIG. 5, the near and far monitored signals NMON-X, NMON-Y and FMON-X, FMON-Y are supplied from the line access module 66 to an associated one of the analog interface units 78 (FIG. 3) through relay contacts 106A, 106B and 108A, 108B of respective monitor relays having actuating coils 106 and 108. Similarly, the near LAM control signals NCTRL (NB1, NB2) and the far LAM control signals FCTRL (FB1, FB2) are supplied through respective relay contacts 110A, 110B and 112A, 112B associated with relay coils 110 and 112 of respective near and far test relays. The near gain control signal NLVL and the near return data signal NYBASE, NXBASE are supplied from the near analog interface unit 78 to the line access module 66 associated with the LAM select switch through relay contacts 110C, 110D and 110E, respectively, of the test relay 110. The far gain control signal FLVL and the far return data signal FXBASE, FYBASE are supplied from the far analog interface unit 78' to the line access module through the respective relay contacts 112C, 112D and 112E of the far test relay 112. All of the relay contacts in the line access module of the illustrated embodiment are normally open and are closed in response to energization of their associated relay coils.

Actuation of the relays 106, 108, 110 and 112 is controlled by the switch control signal SWCTL from the LAM select switch control unit 80 of FIG. 3. More particularly, one of ten available line access module selection signals UNIT0–UNIT9 is supplied to one side of each of each of the coils of the relays 106, 108, 110 and 112. In FIG. 5, for example, the UNIT-1 signal is supplied to each of the relay coils in the select switch for LAM 1. The UNIT-1 signal may be supplied to the LAM select switch for LAM 2 and likewise the third, fourth, fifth, etc., UNIT signals may be supplied to respective third, fourth, fifth, etc., LAM select switches. The UNIT1–UNIT9 signals may each be supplied to as many as two LAM select switches and these signals, when at an appropriate signal level, enable the energization of the relay coils to which they are applied. It should be noted that only one of the UNIT signals can be at an enabling signal level at any instant and therefore the relay coils in only as many as two of the LAM select switches are enabled at any instant. A second pair of signals, one associated with each of the first ten LAM's and the other associated with the next ten, is thus required to select and actuate the relay coils in a desired one of the LAM select switches in conjunction with UNIT signals.

In this connection, the monitor mode signals MON-1 and MON-2 are provided to the LAM select switches to actuate the monitor relays in the desired LAM select switch. Similarly, the near and far test signals NTEST-1, NTEST-2, FTEST-1 and FTEST-2 are supplied to the LAM select switches to actuate a desired one of the enabled test relay coils. Specifically, the MON-1 signal is applied to the other side of each of the monitor relays 106 and 108 in each of the first 10 LAM select switches enabled by the UNIT0–UNIT9 signals. If more than ten LAM select switches are utilized in the system, the UNIT0–UNIT9 signals are applied to the eleventh through the twentieth LAM select switches as the enabling signal and the MON-2 signal is supplied to the other side of the monitor relay coils in each of these LAM select switches.

A similar LAM selection arrangement is utilized to actuate the test relays 110 and 112 in each of the LAM select switches. Specifically, the UNIT signals are utilized in the same manner as described in connection with the monitor relays to enable the test relay coils of the first ten and then the next ten LAM select switches. The NTEST-1 signal is supplied to the other side of the near test relay 110 in each of the first ten LAM select switches and the NTEST-2 signal is supplied to the other side of the near test relay 110 in the next ten LAM select switches. This same arrangement is utilized with the far test signals FTEST-1 and FTEST-2 for selectively energizing the far test relay 112 in each of the LAM select switches.

The near and far monitor signals are available at the LAM select switch 76 at all times. When the system is placed in monitor mode and a particular T1 line is designated for monitoring, e.g., the T1 line accessed by the line access module No. 1 (LAM 1), the selection signal UNIT-0 assumes an enabling signal level (a binary ZERO in the illustrated embodiment) and the monitor and test relay coils are all enabled. The monitor selection signal MON-1 assumes an actuating signal level (a binary ONE signal level in the illustrated embodiment) and the monitor relay coils 106 and 108 are actuated to close the associated relay contacts 106A, 106B, 108A and 108B. The near and far data streams from the selected line access modules are thereafter supplied through the LAM select switch 76 to the respective near and far analog interface units 78 for monitoring purposes.

When the system is placed into test mode, and a test is designated with respect to the near multiplexed data passing through the line access module NO. 1, the UNIT0 and MON-1 signals stay at their respective enabling and actuating levels and the NTEST-1 signal assumes an actuating level (a binary ONE signal level in the illustrated embodiment). The near test relay coil 110 is thus actuated permitting the passage of the near control signals NB1 and NB2, the near gain control signal NLVL and the near return data signals NYBASE and NXBASE through the LAM select switch 76 to the designated line access unit 66.

Similarly, when a test of the network carrying the far data is indicated, the FTEST-1 signal assumes an actuating level and the test relay coil 112 is energized to permit passage of the far control signals FB1 and FB2, the gain control signal FLVL and the far return data signals FYBASE and FXBASE through the LAM select switch 76 to the designated line access module 66. It will therefore be appreciated that none of the signals applied to the LAM select switches 76 passes through the switches 76 until the system is placed into either test or monitor mode. In monitor mode, a particular line access module is designated and selected by the switches 76 and only the monitored data is passed through the LAM select switch 76 to the analog interface units. In test mode, the monitored data from the selected line access module continues to be passed by the LAM select switches and, in addition, either the near or far test relay is energized to permit passage of control signals and data from either the near or far analog interface unit to the selected line access module.

C. LAM Select Switch Control Unit

Figure 6B:
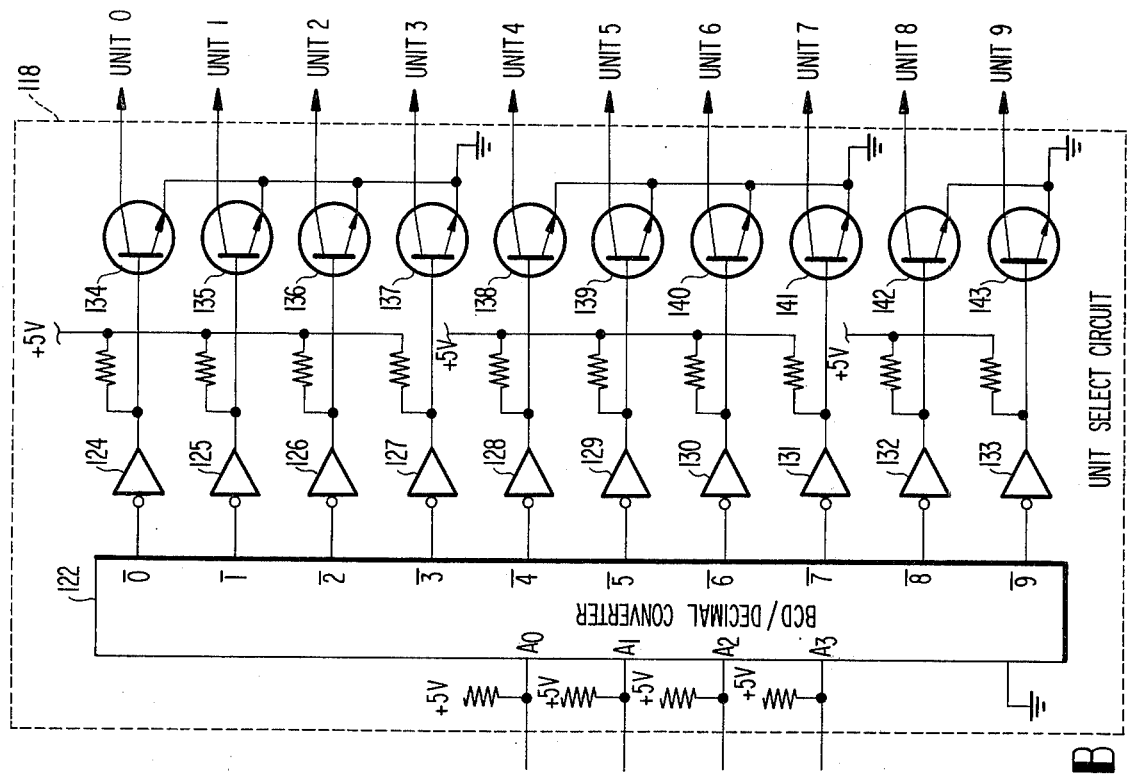
FIG. 6B is a functional block diagram illustrating the unit select circuit of FIG. 6A in greater detail.
Figure 6A:
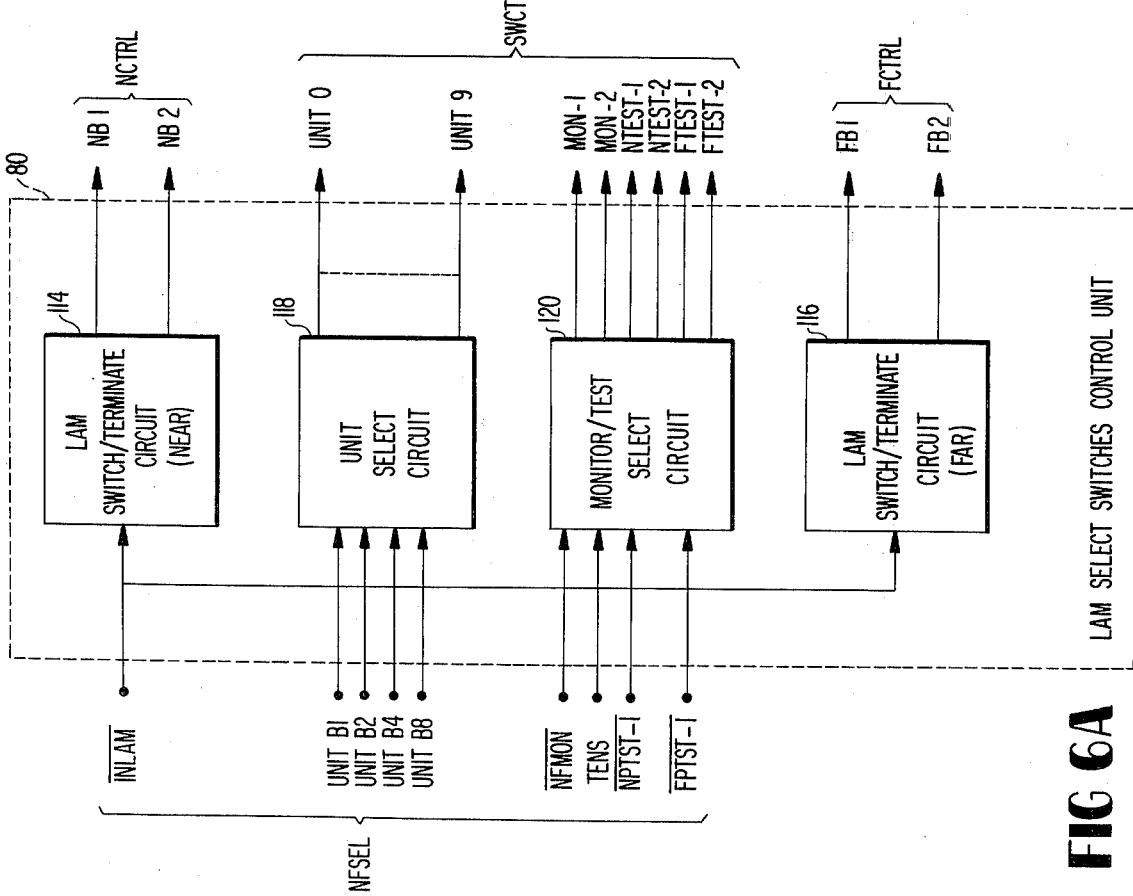
FIG. 6A is a functional block diagram illustrating the LAM select switch control unit of FIG. 3 in greater detail.

The LAM select switch control unit 80 of FIG. 3 is illustrated in greater detail in FIGS. 6A–6D to facilitate an understanding of the invention. Referring to FIG. 6A, the near/far select signal NFSEL from the control logic circuits 70 of FIG. 3 includes an INLAM signal which is supplied to the near LAM switch/terminate circuit 114 and to a far LAM switch/terminate circuit 116 in the LAM select switch control unit 80. The LAM switch/terminate circuits 114 and 116 produce the respective near and far control signals NB1, NB2, FB1 and FB2 for application to the line access modules through the LAM select switches 76 as was previously described in connection with FIGS. 3 through 5.

The near/far select signal NFSEL from the control logic cicuit 70 also includes UNITB1, UNITB2, UNITB4 and UNITB8 signals which identify or address (in conjunction with the MON and TEST signals) a line access module which has been designated for access. The UNITB1–UNITB8 signals are in a binary or binary coded decimal (BCD) form and a unit select circuit 118 places the signals in a decimal form. Specifically, the unit select circuit 118 provides the decimal signals UNIT0–UNIT9 for application to the LAM select switches 76 of FIG. 3 and FIG. 5 as was previously described.

The near/far select signals NFSEL from the control logic circuit 70 also include a near/far monitor signal NFMON indicating selection of the monitor mode, a TENS signal indicating which group of ten LAM's has been designated for access, and near and far test mode designating signals NPTST-1, NPTST-2, FPTST-1 and FPTST-2. The foregoing monitor, TENS and test mode signals are supplied to a monitor/test select circuit 120 which produces the MON-1, MON-2, NTEST-1, NTEST-2, FTEST-1 and FTEST-2 signals for application to the LAM select switches 76 to perform the selection functions previously described.

1. Unit Select Circuit

The unit select circuit 118 of FIG. 6A is essentially a binary coded decimal (BCD) to decimal converter of any conventional design. The particular circuit utilized in the embodiment illustrated herein is shown schematically in FIG. 6B.

Referring now to FIG. 6B, the UNITB1, UNITB2, UNITB4 and UNITB8 signals are supplied to the A0, A1, A2 and A3 input terminals, respectively, of a suitable conventional BCD/decimal converter 122. Each of the decimal output signals from the converter 122 is supplied through one of a plurality of associated inverters 124–133 to the base electrode of an associated one of a plurality of NPN transistors 134–143. The UNIT- 0-UNIT9 signals are provided from the collector electrodes of the respective transistors 134-143.

In operation, the four bit UNITB1-UNITB8 signal is supplied to the BCD/decimal converter 122 and is decoded to energize one of the output terminals 0-9 of the converter 122. The energized one of the lines of the converter 122 (a binary ZERO in its energized state) is inverted by as associated one of the inverters 124-133 to provide a binary ONE signal level to the associated one of the transistors 134-143. It will thus be appreciated that the assumption of a low or binary ZERO signal level by one of the output lines of the converter 122 results in the application of a low or binary ZERO energizing signal (one of the UNIT0-UNIT9 signals) to the LAM select switch 76 of FIG. 3 as was previously discussed. "Pull-up" resistors connected to a source of +5 volts may be provided on the UNITB1-UNITB8 input lines to insure against false output signals in the event of an open input line.

2. Monitor/Test Select Circuit

Figure 6C:
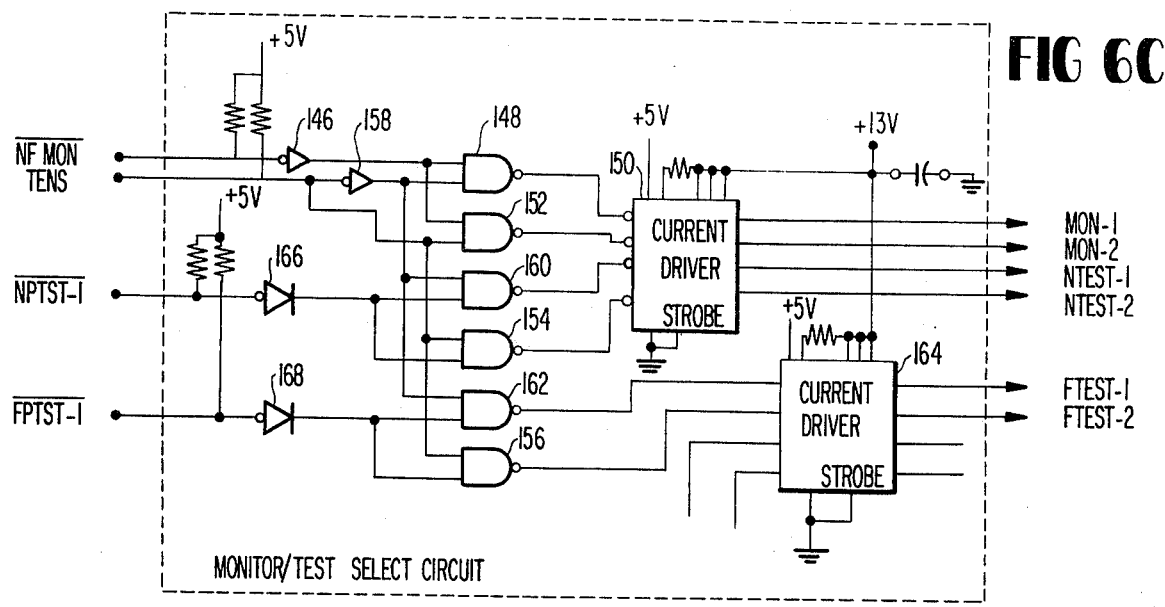
FIG. 6C is a functional block diagram illustrating the monitor/test select circuit of FIG. 6A is greater detail.

The monitor/test select circuit 120 of FIG. 6A is illustrated in greater detail in FIG. 6C to facilitate an understanding of the illustrated embodiment of the invention. Referring now to FIG. 6C, the near/far monitor signal $\overline{\text{NFMON}}$ is supplied through an inverter 146 to one input terminal of a two input terminate NAND gate 148. The output signal from the NAND gate 148 is applied to one input terminal of a conventional current driver 150. The output signal from the inverter 146 is also supplied to one input terminal of a two input terminal NAND gate 152, the output signal from which is applied to another input terminal of the current driver 150.

The TENS signal is supplied to a second input terminal of the NAND gate 152, to one input terminal of a two input terminal NAND gate 154 and to one input terminal of a two input terminal NAND gate 156. The TENS signals is also inverted by an inverter 158 and is supplied to the second input terminal of the NAND gate 148, to one input terminal of a two input terminal NAND gate 160 and to one input terminal of a two input terminal NAND gate 162. The output signal from the NAND gate 160 is applied to a third input terminal of the current driver 150 and the output signal from the NAND gate 154 is applied to a fourth input terminal of the current driver 150. The output signal from the NAND gate 162 is applied to one input terminal of a second current driver 164 and the output signals of the NAND gate 156 is applied to a second input terminal of the current driver 164.

The $\overline{\text{NPTST-1}}$ signal is supplied through an inverter 166 to one input terminal of each of the NAND gates 154 and 160. The $\overline{\text{FPTST-1}}$ signal is supplied through an inverter 168 to one input terminal of each of the NAND gates 156 and 162.

The MON-1, MON-2, NTEST-1 and NTEST-2 signals are supplied to the LAM select switches 76 of FIG. 3 from the respective first, second, third and fourth output terminals of the current driver 150. The FTEST-1 and FTEST-2 signals supplied to the LAM select switches 76 of FIG. 3 are supplied from the respective first and second output terminals of the current driver 164.

In operation, the near/far monitor signal $\overline{\text{NFMON}}$ enables the NAND gates 148 and 152 when the system is placed in monitor mode. If one of the first ten LAM's is to be selected for monitoring, the TENS signal is gated through the NAND gate 148 and is amplified by the current driver 150 for application to the LAM select switches 76 as the MON-1 signal. If application to the LAM select switches 76 as the MON-1 signals. If one of the second TENS line access modules is to be accessed in the monitor mode, the TENS signal is gated through the NAND gate 152 to the current driver 150 and the MON-2 output signal is provided to the LAM select switches 76.

The TENS signal is similarly gated through one of the NAND gates 160, 154, 162 or 156 depending upon the signal levels of the near and far test signals NPTST-1 and FPTST-1. If the system is in test mode and if a test of the near data on one of the first ten line access modules is designated, the TENS signal is gated through the NAND gate 160 and amplified by the current driver 150 as the NTEST-1 signal. If the testing of a near and of one of the second ten line access modules is designated, the TENS signal is gated through the NAND gate 154 for output as the NTEST-2 signal. The testing of the far end of a line access module in either the first or second group of ten line access modules results in a similar output of either the FTEST-1 or FTEST-2 signals through the current driver 164 in response to the gating of the TENS signal through either the NAND gate 162 or the NAND gate 156.

3. LAM Switch/Terminate Circuit

Figure 6D:
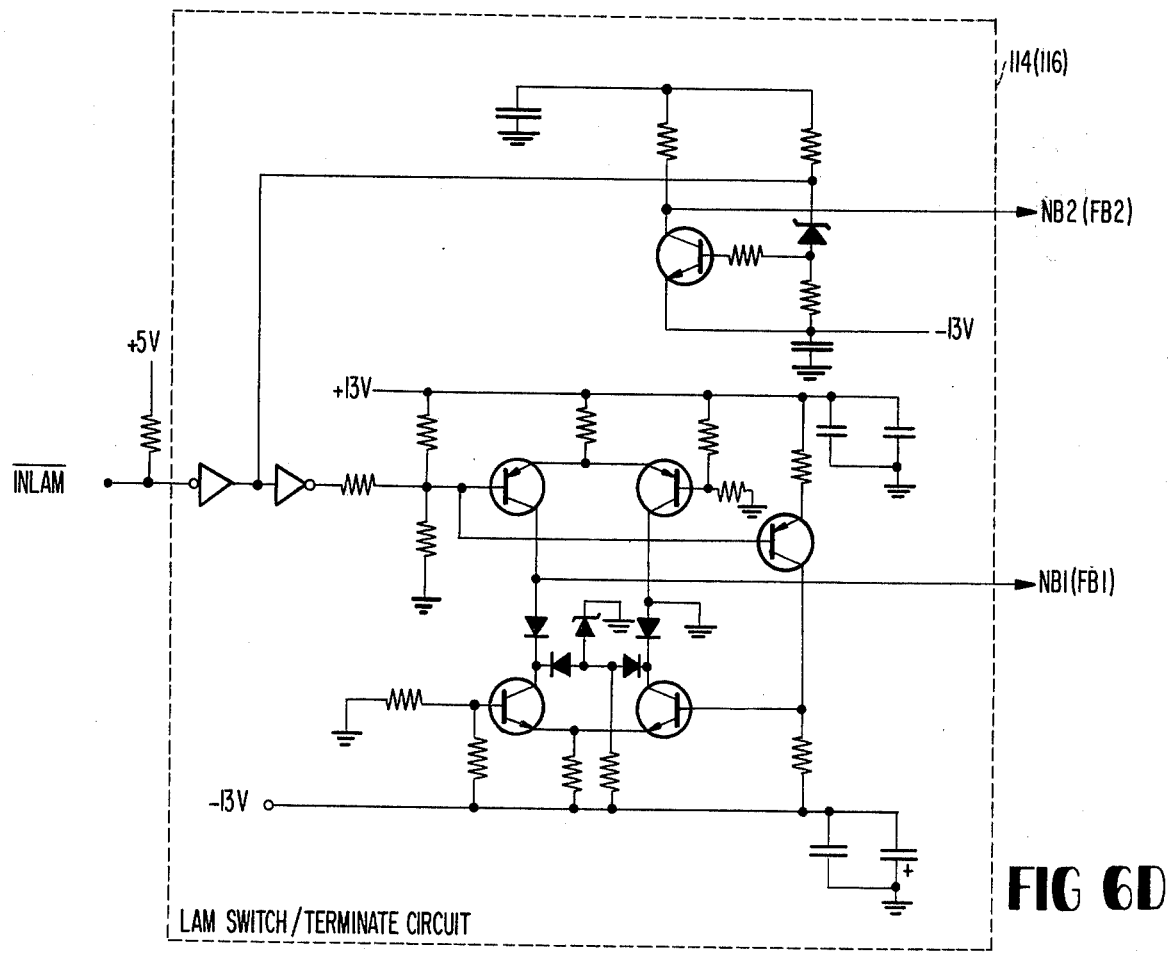
FIG. 6D is a functional block diagram illustrating the LAM switch/terminate circuit of FIG. 6A in greater detail.

The LAM switch/terminate circuit 114 of FIG. 6A is illustrated in greater detail in FIG. 6D. Since the near and far LAM switch/terminate circuits 114 and 116 are identical, the near circuit 114 is illustrated and described in connecton with FIG. 6D whereas the far circuit 116 is not.

The LAM switch/terminate circuit 114 of FIG. 6D in essence receives the $\overline{\text{INLAM}}$ signal and converts this signal to voltage levels other than the two state voltage levels represented by a binary ONE and binary ZERO signal in the system logic. In this manner, the resultant LAM switch control signals NB1 and NB2 (FB1 and FB2 for the far circuit) are of an appropriate signal level to accomplish the switching functions in the line access module previously described in connection therewith. The circuit 114 to accomplish this function is essentially a conventional level converter and will therefore not be described in detail herein. It will, however, be appreciated that the $\overline{\text{INLAM}}$ signal assumes a binary ZERO signal level when the system is placed in test mode. As a result, the NB1 signal assumes a positive signal level resulting in the triggering of a transistor into conduction and the appropriate terminating of the T1 line in the line access module as was previously described. The assumption of a low or binary ZERO signal level by the $\overline{\text{INLAM}}$ signal also results in the NB2 signal assuming a negative signal level which cuts off the field-effect transistor in the line access module and opens the path through the line access module as was previously described.

D. Analog Interface Unit

Figure 7A:
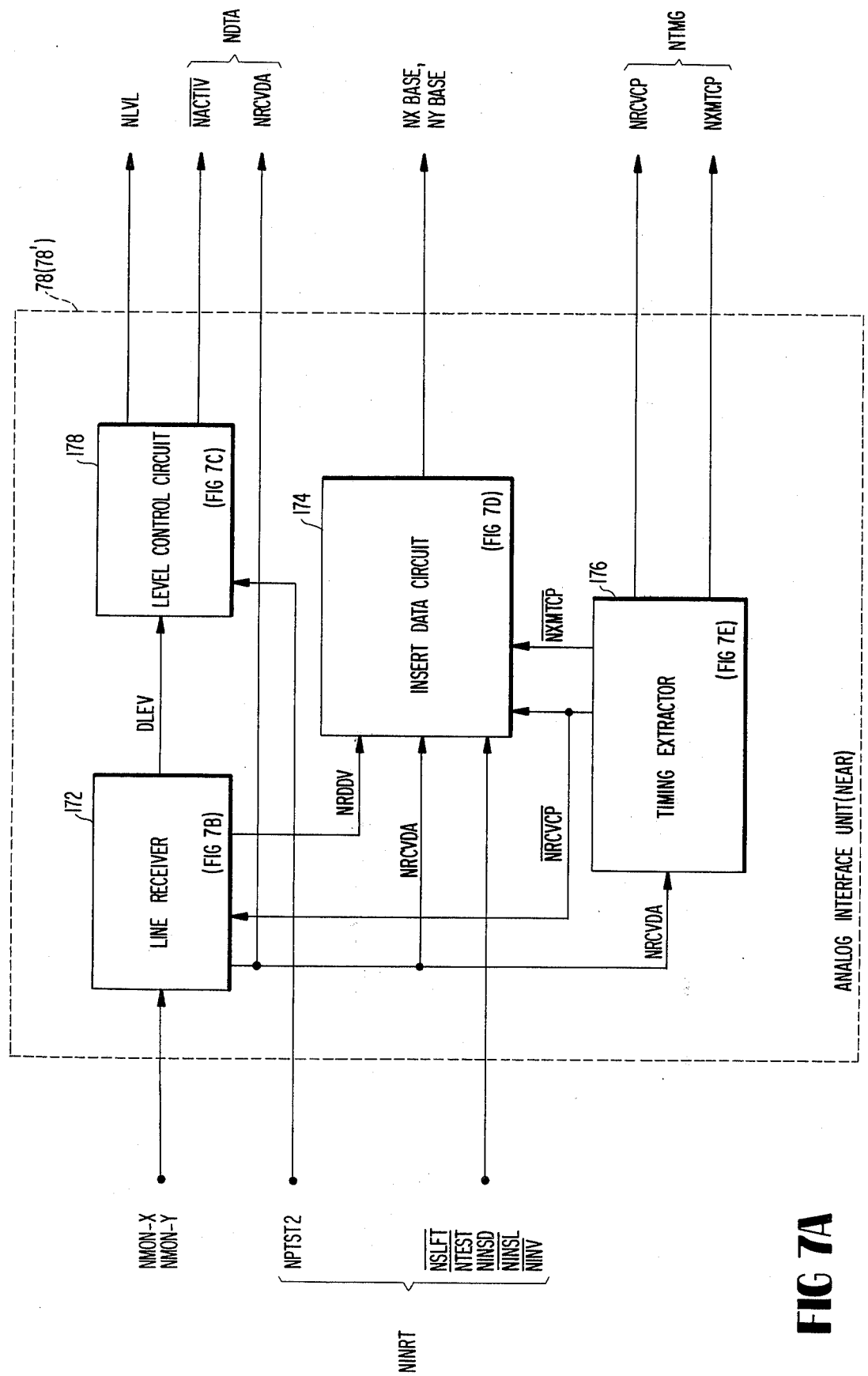
FIG. 7A is a functional block diagram illustrating the analog interface unit of FIG. 3 in greater detail.

The analog interface units 78, 78' of FIG. 3 are preferably identical units and therefore only the near analog interface unit 78 is described hereinafter in connection with FIGS. 7A-7E. Referring now to FIG. 7A, the near monitor signal NMON-X, NMON-Y from the LAM select switches 76 of FIG. 3 is applied to a line receiver 172 in the analog interface unit 78. The line receiver 172 is essentially a high impedance level translator which receives the monitor signals and provides output signals compatible with the logic circuits in the system. In this connection, the line receiver 172 supplies the received data signal NRCVDA containing all of the multiplexed data in the monitored signal to the control logic circuits 70 of FIG. 3. The NRCVDA signal is also applied to an insert data circuit 174 and to a timing extractor 176. The line receiver also supplies a divided near received data signal NRDDV to the insert data circuit 174 and a data level signal DLEV to a level control circuit 178.

A near test signal NPTST2 from the control logic circuit 70 of FIG. 3 is supplied to the level control circuit 178. The level control circuit 178 provides the gain control signal NLVL to the LAM select switches 76 as was previously mentioned and also supplies a signal $\overline{\text{NACTIV}}$ to the control logic circuits 70 of FIG. 3.

The test and insert signals $\overline{\text{NSLFT}}$, $\overline{\text{NTEST}}$, NINSD, $\overline{\text{NINSC}}$ and $\overline{\text{NINV}}$ are supplied from the control logic circuits 70 of FIG. 3 to the insert data circuit 174. The timing extractor 176 supplies near received data and near transmitted data timing signals $\overline{\text{NRCVCP}}$ and $\overline{\text{NXMTCP}}$ to the insert data circuit 174 and also supplies the $\overline{\text{NRCVCP}}$ signal to the line receiver 172. The insert data circuit 174 supplies the return data signal NXBASE, NYBASE to the LAM select switches 76 of FIG. 3 and the timing extractor supplies the near timing signals NRCVCP and NXMTCP to the control logic circuits 70 of FIG. 3.

As was previously mentioned, the line access unit contains two analog interface units 78 and 78', respectively, for the monitoring and testing of the near and far multiplex data lines. The two analog interface units are identical with respect to all signal conditioning, timing and data generation circuits.

During monitoring of near and far and data, the associated analog interface unit receives the monitor signals from the respective near and far and line access modules and, after appropriate signal conditioning by the line receiver 172, provides the near and far received data signals NRCVDA and FRCVDA to the control logic circuits. The timing extractor 176 extracts the timing signals NRCVCP, NXMTCP from the received data and provides the near timing signals to the control logic circuits.

In the test mode of operation, the monitored multiplexed data stream is again supplied to the analog interface unit for signal conditioning and timing extraction. In addition, a portion of the received multiplexed data stream is supplied to the level control circuit 178 for generation of the NLVL signal. The NLVL signal is a threshold level which regulates the amplitude of inserted data in accordance with the amplitude of the normal data on the selected T1 line. Moreover, the multiplexed data is diverted around the line access module and through the insert data circuit 174 when the system is in test mode. The data to be inserted in a located subscriber channel (NINSD) as well as the timing signals to effect the insertion at the appropriate time slot in the multiplexed data stream are received from the control logic circuit and appropriately activate high speed logic circuits in the insert data circuit 174 as will subsequently be described. The multiplexed data stream with the inserted data in the designated subscriber channel is then returned to the line access module as the NXBASE, NYBASE signal.

1. Line Receiver

The line receiver 172 of FIG. 7A is illustrated schematically in FIG. 7B to facilitate an understanding of the operation of the present invention.

Referring now to FIG. 7B, the monitored data NMON-X, NMON-Y is applied through a transformer 180 to one input terminal of an amplifier 182 and through a diode 184 to one input terminal of an amplifier 186. The output signal from the amplifier 184 is applied to the base electrode of a TNP transistor 188 and an output signal from the emitter electrode of the transistor 188 is supplied as the data level signal DLEV from the line receiver 172. The DLEV signal is also supplied through a resistor 190 to a second input terminal of the amplifier 182 and to an amplifier 192. The output signal from the amplifier 192 is applied to one input terminal of an amplifier 194 and the output signal from the output winding of the transformer 180 is applied to the second input terminal of the amplifier 194.

The output signal from the amplifier 182 is applied to the D input terminal of a conventional DC flip-flop 196 and the output signal from the true or Q output terminal of the flip-flop 196 is applied to one output terminal of a two input terminal NOR gate 198. The output signal from the false or $\overline{Q}$ output terminal of the flip-flop 196 is applied to the J input terminal of a conventional JK flip-flop 200. The output signal from the amplifier 194 is applied to the D input terminal of a conventional DC flip-flop 202 and the output signal from the true Q output terminal of the flip-flop 202 is applied to the second input terminal of the NOR gate 198, the output signal from which is supplied as the NRCVDA signal to the insert data circuit 174 and the timing extractor 176 of FIG. 7A. The output signal from the flase or $\overline{Q}$ output terminal of the flip-flop 202 is applied to the K input terminal of the flip-flop 200 and the output signal from the Q output terminal of the flip-flop 200 is supplied as the NRDDV signal to the insert data circuit 174 of FIG. 7A. The clock signal $\overline{\text{NRCVCP}}$ from the timing extractor 176 of FIG. 7A is supplied as the clock signal to the clock input terminal C of the flip-flop 200.

In operation, the line receiver 172 of FIG. 7B receives the monitored multiplexed data signal from the line access module and applies this signal to the flip-flops 196 and 202 to extract the data signal NRCVDA therefrom. The multiplexed data stream is also supplied to the amplifying circuit 186 and the transistor 188 to derive a predetermined portion of the multiplexed data signal amplitude. The resultant DLEV signal is supplied to the level control circuit 178 of FIG. 7A to derive a threshold voltage level for use in regulating the amplitude of inserted data in accordance with the amplitude of the normal data on the selected T1 line. The flip-flop 200 also develops a signal related to the received monitored data signal for use by the insert data circuit of FIG. 7D as will be described hereinafter in greater detail.

2. Level Control Circuit

The level control circuit 178 of FIG. 7A derives a threshold level from the monitored multiplexed data to regulate the amplitude of the data inserted in the multiplexed data stream in accordance with the amplitude of the data normally passing through the line access module on the selected T1 line. As is shown in FIG. 7C, the DLEV signal from the line receiver 172 is supplied through an amplifier 204 to the base electrode of a NPN transistor 206 and to the collector electrode of a NPN transistor 208. The transistor 208 bridges a resistor 210 through which the signal from the amplifier 204 passes for application to the base electrode of a PNP transistor 212. The collector electrode of the transistor 212 is connected to a negative 14 volt source as illustrated and the emitter electrode is connected through a current limiting resistor 214 to an NPN output transistor 216. The NLVL signal supplied to the line access module in test mode as was previously described is developed at the emitter electrode of the transistor 216 as illustrated. The transistor 206 develops the $\overline{\text{NACTIV}}$ signal for application to the control logic circuit 70 of FIG. 3 and control of the transistor 208 is effected by the NPTST2 signal from the control logic circuits 70.

3. Insert Data Circuit

The insert data circuit 174 of FIG. 7A processes the received data and drops and adds data in test mode as was previously described. As is illustrated in FIG. 7D, the multiplexed data signal in the form of the NRCVDA signal from the line receiver 172 of FIG. 7A is supplied to the D input terminal of a conventional DC flip-flop 220. The clock signal $\overline{\text{NRCVCP}}$ from the timing extractor 176 of FIG. 7A is supplied to the enable input terminal CE of the flip-flop 220 and the output signal from the true or Q output terminal of the flip-flop 220 is applied to one input terminal of a two input EXCLUSIVE-OR gate 222. The output signal from the EXCLUSIVE-OR gate 222 is applied to one input terminal of a two input terminal NAND gate 224 (same as positive logic NOR gate) and the output signal from the NAND gate 224 is applied to one input terminal of a NOR gate 226. The output signal from the NOR gate 226 is applied to one input terminal of a two input terminal negative logic AND gate 228 and to one input terminal of a negative logic AND gate 230.

The output signal from the negative logic AND gate 228 is applied to the clock input terminal C of a JK flip-flop 232 and the output signal from the true or Q output terminal of the flip-flop 232 is applied to one input terminal of a negative logic AND gate 234. The output signal from the negative logic AND gate 234 is applied through a high speed level translator generally indicated at 236 and the output signal from the translator 236 is applied to one side of a bipolar line driver 238. The output signal from the false output terminal $\overline{Q}$ of the flip-flop 232 is applied to one input terminal of an EXCLUSIVE-OR gate 240 and to one input terminal of a negative logic AND gate 242. The output signal from the negative logic AND gate 242 is applied to a high speed level translator 244 and the output signal from the high speed level translator 244 is applied to the other side of the bipolar line driver 238. The bipolar line driver 238 supplies the NXBASE and NYBASE signals to the line access module in test mode as was previously described.

The insert control signals $\overline{\text{NINV}}$, $\overline{\text{NINSC}}$, NISD and $\overline{\text{NTEST}}$ are supplied to conventional level translator circuits 246 for conversion to the appropriate signal levels for the high speed logic circuits utilized in the insert data circuit 174. The translated $\overline{\text{NINV}}$ signal is applied to one input terminal of a two input terminal NAND gate 248 and to one input terminal of a two input terminal NAND 250. The output signal from the NAND gate 248 is applied to the second input terminal of the exclusive OR gate 222. The translated $\overline{\text{NINSC}}$ signal is applied to both input terminals of a two input terminal NAND gate 252 which acts as an inverter and has its output terminal connected to the second input terminal of the NAND gate 224. The $\overline{\text{NINSC}}$ signal is also applied to one input terminal of a two input terminal NAND gate 254, the other input terminal of which receives the NINSD signal from the translators 246. The output signal from the NAND gate 254 is applied to the second input terminal of the NOR gate 226. The NTEST signal from the translator 246 is applied to one input terminal of a two input terminal NAND gate 256 and the $\overline{\text{NTEST}}$ signal is applied to one input terminal of each of the AND gates 234 and 242.

4. Timing Extractor

The timing extractor is preferably a conventional circuit for extracting timing information from the monitored multiplexed data stream. One form of such a circuit is illustrated in FIG. 7E.

Referring to FIG. 7E, the NRCVDA signal (the multiplexed data stream conditioned by the line receiver 172 of FIG. 7B) is applied to an emitter follower circuit 260. The output signal from the emitter follower 260 is applied to tuned circuit 262 to control the frequency of its output signal. The signal from the tuned circuit 262 is applied to a first and second output drivers 264 and 266 and through associated amplifiers 268 and 270 to the D input terminals of respective flip-flops 272 and 274.

A receive clock signal NRCVCP is supplied from the true output terminal Q of the flip-flop 272 and through an amplifier 276 for use by the control logic circuits. The $\overline{\text{NRCVCP}}$ signal from the false output terminal $\overline{Q}$ of the flip-flop 272 is supplied to the insert data circuit 174.

A delayed timing signal NXMTCP is synchronous with the signal NRCVCP from the false output terminal $\overline{Q}$ of the flip-flop 274 through an amplifier 278. The $\overline{\text{NXMTCP}}$ is supplied to the insert data circuit 174 from the true output terminal Q of the flip-flop 274.

III. Control and Monitoring Panel

The control and monitoring panel 72 of FIG. 3 controls the operation of the system of the present invention and receives and displays data independently of the microcomputer 74. Accordingly, unless the microcomputer 74 takes control of the system for monitoring and testing purposes, the control and monitoring panel 72 can control the system to perform tests and monitor data as was previously described and as is described hereinafter in greater detail.

Figure 8A:
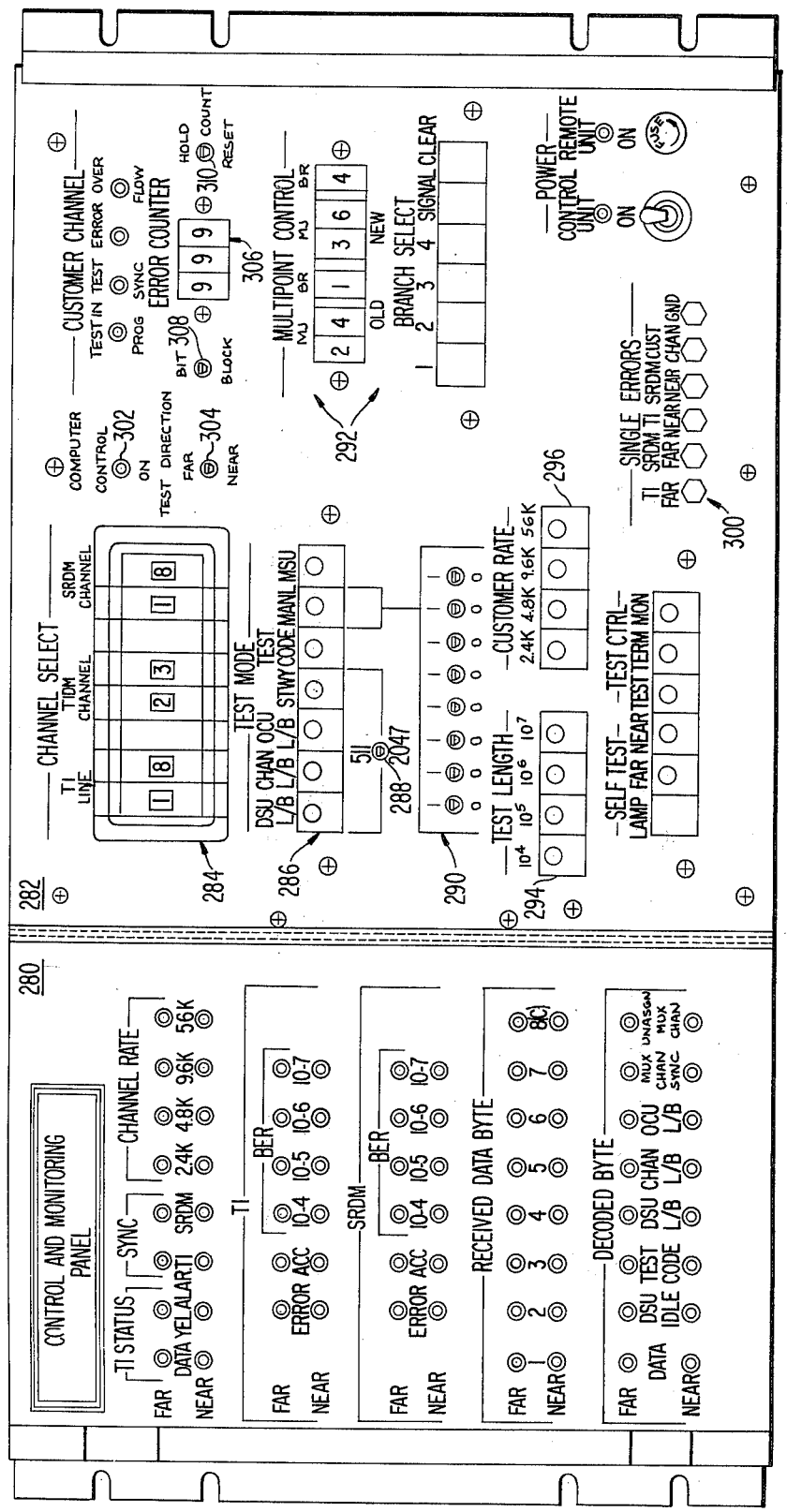
FIG. 8A is a pictorial representation of the control and monitoring panel of FIG. 3.

Referring to FIG. 8A wherein the front panel of the control and monitoring panel 72 is pictorial illustrated, the front panel can be generally divided into a monitor area 280 and a control area 282. The monitor area 280 contains two identical sets of indicators, one for the near data and one for the far data. The following list of the indicators and their functions may aid in a more thorough understanding of the illustrated embodiment of the invention:

1. T1 status - data: When lit, this indicator shows that there are bipolar signals (e.g., binary ONES) on the selected T1 line.

2. T1 status - yellow alarm: When lit, this indicator shows that the yellow alarm bit (bit 190 in a T1 frame) has been recognized as a binary ZERO in the T1 frame.

3. T1 sync: When illuminated, this indicator shows that the T1 synchronization circuitry in the control logic circuit 70 has located and is synchronized with the T1 framing pattern in the multiplexed data signal.

4. SRDM sync: When illuminated, this indicator shows that the control logic circuits have recognized the presence of an SRDM framing pattern on the designated T1 channel and has attained synchronization with that SRDM framing pattern. 5. Channel rate: If an SRDM framing pattern has been found on the selected T1 channel, then one of the three indicators labeled 2.4, 4.8 or 9.6 will light, indicating the basic operating rate of the multiplexer within the selected T1 channel. If an SRDM framing pattern is not found, then the 56K light will light.

6. T1 error: This indicator will flash each time an error is detected in the T1 framing pattern.

7. T1 ACC: This indicator will light when the initial accumulation period of the bit error rate counter has been reached.

8. T1 BER: One of these four indicators may light after the T1 accumulate indicator is illuminated. These indicators show that an error rate threshold denoted by 10 to the minus fourth, fifth, sixth or seventh power has been exceeded during the accumulating period. These indicators will be continuously updated after each accumulation period.

9. SRDM error: This indicator will flash each time an error is detected in the SRDM framing pattern.

10. SRDM ACC: This indicator will light at the end of the initial bit error rate counter accumulation period.

11. SRDM BER: These four indicators provide data similar to that provided by the T1 BER indicators described above.

12. Received data byte: These eight indicators show the logic level in each of the eight bit positions of the selected subscriber data byte. A lighted indicator shows that a binary ONE has been detected in that bit position. These indicators normally flicker except when a constant code is present in the channel.

13. Decoded byte: These eight indicators show the results of decoding the information contained within the byte of data in the designated subscriber channel. The DATA indicator will light when a binary ONE is found in the eighth bit position. One of the remaining seven indicators will light if the specific control code is found in the designated subscriber byte position.

The control section 282 of the control and monitoring panel 72 contains control switches and displays used during the testing of the designated subscriber channels or during the set up of multipoint bridges in the multipoint junction units. The channel select section of the control area 282 comprises six thumb wheel switches generally indicated at 284. The thumb wheel switches 284 designate the T1 line which is to be accessed and designate the subscriber channel to be accessed on the designate T1 line by providing for the selection of a T1 DM channel and an SRDM channel on the designated T1 line. The thumb wheel switches 284 may be any conventional arrangement of switches having a decimal readout as illustrated and providing binary coded decimal or other suitably encoded output signals which designate the desired T1 line and desired subscriber channel on that T1 line to the control logic circuits 70. For example, each pair of the thumb wheel switches 284 may generate a binary coded decimal TENS and unit signal for application to the control logic circuits 70 as will hereinafter be described in greater detail.

A test mode portion of the control area 282 may include a plurality of interlocking switches generally indicated at 286. The switches 286 include a subscriber line unit loopback switch (referred to in FIG. 8A as the DSUL/B switch), a channel loopback switch (CHANL/B), an office line or channel unit OCU L/B and a "straightaway" test mode switch. Each of these signals generates a control signal which results in the transmission of one of two codes denoted 511 and 2047 in FIG. 8A as selected by a code select switch 288. In the "straightaway" mode, the selected code is continuously transmitted in the designated subscriber channel or time slot. In the loopback modes, the selected code is transmitted in the designated subscriber channel alternately with the selected loopback code.

The test mode switches 286 further include a test code switch, a manual switch (MANL) and a multipoint signaling unit (MSU) test switch. Depression of the test code switch allows the test code (a simulated four kilohertz audible tune) to be transmitted on the designated subscriber channel. Depression of the manual switch MANL causes an external test byte determined by the positions of the eight switches 290 to be inserted on the designated subscriber channel. When the eight bit byte is inserted into an SRDM channel, the leftmost bit is ignored and the proper SRDM framing bit is inserted at that bit position. The MSU switch enables the multipoint control section 292 of the control and monitoring panel 72 when depressed.

The test length switches 294 include four interlocking switches which determine the accumulation period of the bit error rate counters in the control logic circuits 70 as will subsequently be described in greater detail. For example, depressing the $10^4$ allows the counters to accumulate errors over a 10,000 bit time period.

The customer rate section includes four interlocking switches 296 which permit the selection of the test rate for an individual customer. For example, an SRDM channel rate for a particular customer may be 9.6 kilobits per second. Selecting the 2.4 kilobit customer rate will test that channel only at 2.4 kilobits per second. On the other hand, if the channel rate indicators on the monitor area 280 show a 2.4 kilobit SRDM channel rate, then the system will automatically prevent testing at 9.6 kilobits per second or any rate higher than the customer channel rate.

The control area 282 of the control and monitoring panel 72 further includes self test and test control switches 298. The self test LAMP switch illuminates all indicators on the control and monitoring panel with the exception of the indicators on the interlocking and self locking switches. These latter indicators illustrated by a circle on the face of the switch only light when their respective switches are pushed to indicate that mode of operation. The numerical displays will each contain the numerals 888 during a LAMP test. The self test near and far switches cause the system to go into a near and far self test mode described hereinafter in greater detail. The test control switches TEST, TERM and MON place the system in the respective test mode, terminate mode or monitor mode. Depression of the test mode switch causes the selected subscriber channel data to be dropped and replaced by test data if all other conditions for test have been satisfied. Depression of the terminate switch allows customer testing to be discontinued if the prior mode of operation was test mode. Depressing this switch when the prior mode of operation was monitor will cause the data from the line access modules to be blocked by the LAM select switches 76 of FIG. 3 (i.e., all testing and/or monitoring of the T1 lines will be discontinued). Depression of the monitor switch allows the particular T1 line designated by the thumb wheel switches 284 to be monitored in both the near and far directions.

The "single error" section of the control area 282 includes a plurality of test jacks 300 for monitoring the various indicated data with external counters or other suitable monitoring devices. The power section includes an on off switch for energizing and deenergizing the system and a remote unit on indicator which shows that power is being applied to the control logic circuits 70 of FIG. 3.

The customer channel section of the control panel 282 includes a test in progress indicator, a test sync indicator, an error indicator and an overflow indicator. The test in progress indicator is illuminated whenever multiplexed data is being diverted around a line access module through the analog interface unit 78 of FIG. 3 as was previously described. The test sync indicator lights when the pseudo-random correlator in the control logic circuits 70 has attained synchronization with the pseudo-random code being transmitted in place of the data on the designated subscriber channel. The error LAMP will flash whenever an error is detected in the correlation pattern of the pseudo-random correlator. The overflow LAMP will light whenever the number of errors read into the error counter has exceeded 999. The error counter will start a new count from zero after the overflow LAMP lights.

The customer channel section also includes a computer control on indicator 302, a test direction far/near switch 304, an error counter 306, and error counter control switches 308 and 310. The computer control on indicator 302 will light whenever the microcomputer is in control of the system. The test direction switch 304 determines whether the test is being run on the near or far end of the T1 line. The error counter displays the number of errors counted in a particular period of time selected for accumulation of errors. The bit/block control switch 308 causes the error counter to count either bit errors or one second blocks containing at least one error. The hold/count/reset switch stops the counting of errors in the error counter in the hold position. In the count position, the switch 310 allows errors or error blocks to be continuously counted in the counter. When the switch is moved to the reset position, the error counter is cleared allowing a new count to be started.

The multipoint control section 292 of the control area 282 allows a branch signal to be set up for transmission to a multipoint junction unit and provides a display of the most recent and the immediately previous multipoint junction unit and branch signals selected by the operator. The SIGNAL switch causes the transmission of the new or most recent multipoint junction unit and branch signals and the CLEAR switch controls the clearing or breaking down of the multipoint junction bridge.

Figure 8B:
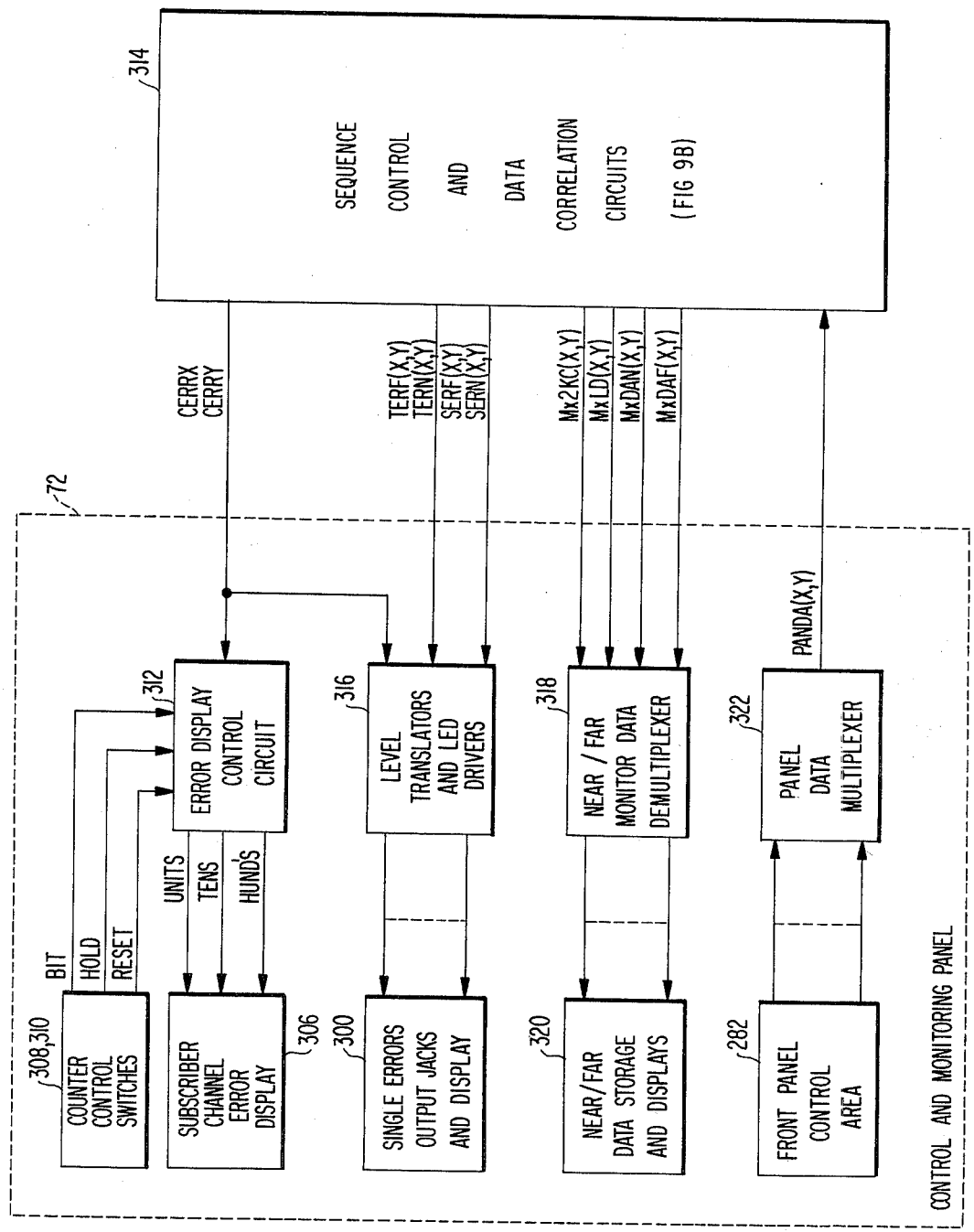
FIG. 8B is a functional block diagram illustrating the control and monitoring panel of FIG. 3 in greater detail.

FIG. 8B functionally illustrates the control and monitoring panel 72 of FIG. 8A to facilitate an understanding of the invention. Referring now to FIG. 8B, the counter control switches 308 and 310 provide a BIT, HOLD and RESET signal to an error display control circuit 312. The error display control circuit 312 receives an error data signal CERRX, CERRY (the X and Y indicating that the data is received over a twisted pair cable). The CERRX, CERRY signal is provided from sequence control and data correlation circuits 314 in the control logic circuits 70 of FIG. 3 as described hereinafter in greater detail. The error display control circuit 312 provides a count of the error data supplied from the sequence and data correlation circuits 314 preferably in the form of a binary coded decimal signal having units, tens, hundreds, decades. These binary coded decimal signals are supplied to the subscriber channel error display (the error counter 306 of FIG. 8A, for example).

The CERRX, CERRY signal is also supplied to conventional level translators and LED drivers 316 together with T1 and SRDM error signals TERF (X, Y), TERN (X, Y) and SERF (X, Y), SERN (X, Y). The level translators and LED drivers 316 condition the received data and supply the data to the single errors output jacks 300 and to the customer channel error indicator.

The monitored data for display by the monitor area 280 of the control and monitoring panel 72 is supplied from the sequence control and data correlation circuits 314 in multiplexed form over twisted pair lines. This monitor data includes the near data MXDAN (X, Y) and the far data MXDAF (X, Y). Because the control and monitoring panel may be as many as several hundred feed from the sequence control and data correlation circuits 314, the monitored data is transmitted in a serial or multiplexed form and is received by a near/far monitored data demultiplexer 318 in the control and monitoring panel 72. The near/far monitored data demultiplexer 318 also receives data clock and mode signals MX2KC (X, Y) and MXLD (X, Y) from the sequence control and data correlation circuits 314 to synchronize the operation of the near/far monitored data demultiplexer 318. The near/far monitored data demultiplexer 318 operates in a conventional manner to demultiplex the monitored data and to supply this data to conventional storage registers which in turn supply the data to the appropriate displays (e.g., the light emitting diode displays on the monitor section 280 of the control and monitoring panel) as is generally indicated at 320 in FIG. 8B.

The front panel control area 282 supplies a large number of control signals to the sequence control and data correlation circuits 314. Because of the possible distance between the control and monitoring panel 72 and the circuits 314, the control data from the front panel control area 282 is supplied to a conventional multiplexer designated the panel data multiplexer 322 in FIG. 8B. The panel data multiplexer 322 multiplexes the panel control data and provides this data as the PANDA (X, Y) signal over a twisted pair of conductors to the sequence control and data correlation circuits 314 for control purposes as is described hereinafter.

IV. Control Logic Circuits

The control logic circuits 70 of FIGS. 3 and 9 include the circuits which control the selection of a particular line access module and a particular customer channel on a selected T1 line. Moreover, the control logic circuits control the operational sequence of the system, control all transfer of data and control the insertion of data into a subscriber channel under test.

Figure 9B:
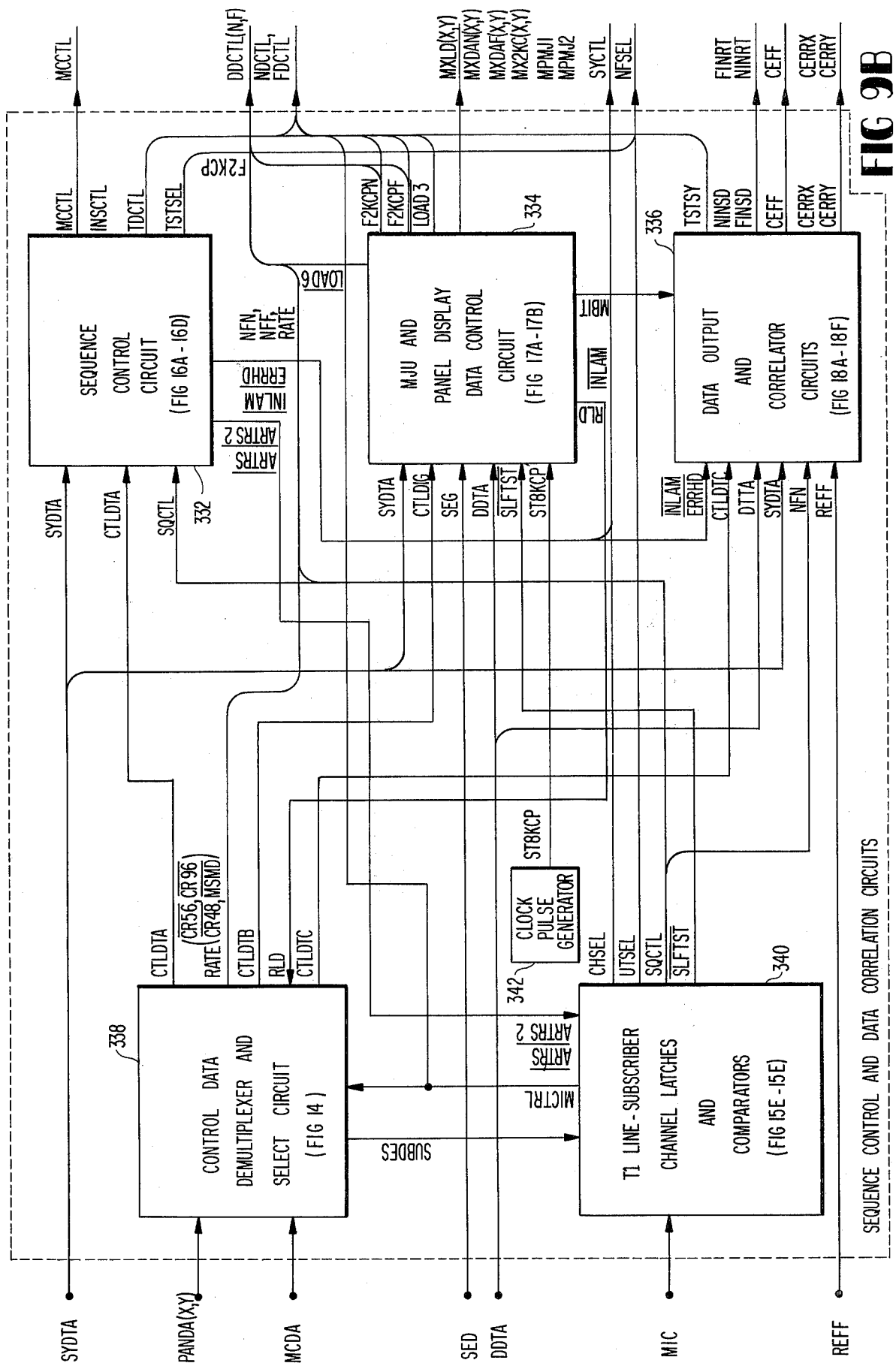

As is illustrated in FIG. 9A, the control logic circuits include the sequence control and data correlation circuits 314 which are common to both the near and far ends of a selected line access unit. The control logic circuits also include identical T1 and SRDM framing detectors and comparators 324 and 324', data decoders 326 and 32640, error rate circuits 328 and 328', and sync error data output circuits 330 and 330' which serve as the respective near and far and control and monitoring circuits. To facilitate the description hereinafter, the letters N and F used as either a prefix or a suffix to a signal name designate that signal as either a near or far signal, respectively. Moreover, many of the signal lines shown in FIGS. 9A and 9B as well as functional block diagrams hereinafter represent multiple signals supplied from one logic circuit to another. These multiple signal lines are, however, shown individually in schematic form to aid in an understanding of the invention by one skilled in the art to which the invention pertains.

With continued reference to FIG. 9A, the sequence control and data correlation circuits 314 transmit and receive monitor and control signals to and from either the microcomputer 74 or the control and monitoring panel 72. As will be seen hereinafter, the sequence control and data correlation circuits 314 select between the two courses of control data on the basis of a "micro in control" signal MIC from the microcomputer 74. When the MIC signal assumes a high signal level, for example, the microcomputer 74 controls the operation of the system and receives the monitor and test data. When the MIC signal assumes the opposite signal level, the control and monitoring panel 72 assumes control of the system.

The T1 and SRDM framing detectors and comparators 324 are supplied with the received data signal RCVDA from the analog interface unit 78 of FIGS. 3 and 7. The timing signal TMG including the RCVCP and XMTCP clock signals is also supplied from the analog interface unit 78 to the T1 and SRDM framing detectors and comparators 324. The framing detectors and comparators 324 supply the sync data signal SYNCD to the data decoder 326 and supply additional sync data signals SYO and SYDTA to the respective sync and error data output circuits 330 and the sequence control and data correlation circuits 314. A sync error signal SYERR is supplied from the framing detectors and comparators 324 to the error rate circuit 328 which supplies a T1 and SRDM error data signal TSE to the sync and error data output circuit 330.

A decoded data signal DDTA is applied from the data decoder 326 to the sequence control and data correlation circuits 314 and the sync and error data output circuit 330 supplies a sync error data output signal SED to the sequence control and data correlation circuits 314.

The sequence control and data correlation circuits 314 provide various control signals to the control logic circuit and to the line access unit. A sync control signal SYCTL is supplied from the circuits 314 to the framing detectors and comparators 324 and a data output control signal DCTL is supplied to the sync and error data output circuit 330 from the sequence control and data correlation circuits 314. An error control signal ERCTL is supplied to the error rate circuit 328 from the sequence control and data correlation circuits 314 and a data decode control signal DDCTL is supplied to the data decoder 326 from the sequence control and data correlation circuits 314. It should be noted that DDCTL (N) and DDCTL (F) signals differ in a number of respects as will subsequently be described.

The sequence control and data correlation circuits 314 also supply the insert data signal INRT and the near/far select signals NFSEL to the respective analog interface unit 78 and the LAM select switch control unit 80 in the line access unit 64 of FIG. 3. It should be noted that since there is only one LAM select switch control unit 80 in the line access unit 64, the sequence control and data correlation circuits 314 supply only one selection signal to the line access unit 64.

FIG. 9B illustrates the sequence control and data correlation circuits 314 of FIG. 9A in greater detail. Referring now to FIG. 9B, the SYDTA signal from the T1 and SRDM framing detectors and comparators 324 of FIG. 9A are supplied to a sequence control circuit 332, to an MJU and panel display data control circuit 334 and to a data output and correlator circuit 336. Control data from the control and monitoring panel 72 is supplied as the PANDA (X, Y) signal to a control data demultiplexer and selector circuit 338 and the microcomputer 74 supplies the microcomputer data signal MCDA to the circuit 338. The sync error data SED from the sync and error data output circuit 330 of FIG. 9A is supplied to the MJU and panel display data control circuit 334 together with the DDTA signal from the data decoder 326 of FIG. 9A. The DDTA signal is also supplied to the data output and correlator circuits 336.

A microprocessor in control signal MIC is supplied to a T1 line-subscriber channel latch and comparator circuit 340 and a reset signal REFF is supplied to the data output and correlator circuits 336 also from the microprocessor. The T1 line-subscriber channel latches and comparators 340 provide a microprocessor control signal MICTRL to the control data demux and select circuit 338 and to an output terminal of the sequence control and data correlator circuits as one of the near and far sync and error data output circuit control signal NDCTL, FDCTL. The T1 line-subscriber channel latches and comparators 30 supply a channel select signal CHSEL and a unit select signal UTSEL as portions of the respective sync control signal SYCTL and LAM select signal NFSEL. A sequence control signal SQCTL is applied to the sequence control circuit 332 from the latches and comparators 340 and a self test signal $\overline{\text{SLFTST}}$ is supplied from the latches and comparators 340 to the MJU and panel display data control circuit 334. The NFN and NFF signals which form part of the SQTL signal are also supplied as part of the data decoder control signals DDCTL (N, F).

The control data demux and select circuit 338 supplies a subscriber designate signal SUBDES to the T1 line-subscriber channel latches and comparators 340 and supplies control data signals CTLDTA, CTLDTB and CTLDTC to the respective circuits 332, 334 and 336. A RATE signal including the $\overline{\text{CR56}}$, $\overline{\text{CR96}}$, $\overline{\text{CR48}}$ and $\overline{\text{MSMD}}$ signals is supplied from the control data demux and select circuit 338 as part of the data decoder control output signal DDCTL (N, F).

A conventional clock pulse generator 342 provides an eight kilohertz clock pulse ST8KCP to the MJU and panel display data control circuit 334. As will be seen hereinafter, the eight kilohertz clock pulse signal is utilized by the MJU and panel display data control circuit 334 to transmit monitored data to the control and monitoring panel 72 of FIG. 9A.

A sequence control circuit 332 provides microprocessor control signals MCCTL to the microcomputer 74 of FIG. 9A. An insert control signal INSCTL is supplied as a part of the near and far insert data NINRT, FINRT for use by the analog interface unit. The sequence control circuit 332 also supplies a mode status control signal TDCTL to the sync and error output circuit 330 of FIG. 9A as part of the NDCTL, FDCTL signal. It should be noted that the NDCTL and FDCTL signals differ significantly as will be seen from the subsequent detailed description of the sync and error data output circuit 330. For ease of description, however, these signals are shown as being comprised of the same groups of signals in FIG. 9B. The sequence control circuit 332 also supplies an $\overline{\text{ARTRS}}$ and $\overline{\text{ARTRS2}}$ signal to the T1 line-subscriber channel latches and comparators 340. The $\overline{\text{INLAM}}$ and $\overline{\text{ERRHD}}$ signals from the sequence control circuit 332 are supplied to the data output and correlator circuits. 336 and the $\overline{\text{INLAM}}$ signal is also supplied as part of the SYCTL signal to the T1 and SRDM framing detectors and comparators 324 of FIG. 9B.

The MJU and panel display data control circuit 334 supplies clock and load signals F2KCPN, F2KCFP, $\overline{\text{LOAD3}}$ to the sync and error data output circuits 330 as part of the NDCTL, FDCTL signals. The F2KCPN and F2KCPF signals are also provided from the MJU and panel display data control circuit 334 as part of the DDCTL signal to the data decoder 326 of FIG. 9A. The control circuit 334 supplies a register load signal RLD to the control data demux and select circuit 338 and provides monitor bit signals MBIT to the data output and correlator circuits 336. A register load signal $\overline{\text{LOAD6}}$ is supplied from the control circuit 334 as part of the DDCTL signal to the data decoder 326 of FIG. 9A and the monitored data is transmitted to the control and monitoring panel from the control circuit 334 as the MXDAN (X, Y) and MXDAF (X, Y) signals. The load and clock signals MXLD (X, Y) and MX2KC (X, Y) are also supplied to the control and monitoring panel 72 as was previously described in connection with FIG. 8B to control the demultiplexing of the monitored data signals.

The data output correlator circuits 336 supply a test sync signal TSTSY as part of the NDCTL, FDCTL signals to the sync and error data output circuits 330. The near and far insert data signals NINSD, FINSD are supplied as part of the insert data signals NINRT and FINRT applied to the analog interface units 78 and 78′, respectively. The CEFF signal is supplied from the data output and correlator circuits 336 to the microcomputer 74 of FIG. 9A and the CERRX, CERRY signal is supplied to the control and monitoring panel as illustrated in FIG. 8B.

The operation of the control logic circuits 70 may be more fully appreciated with reference to FIGS. 9A and 9B. Referring now to FIG. 9A, it will appreciated from the subsequent description and the accompanying drawings that the T1 and SRDM framing detectors and comparators 324 receive subscriber channel designating signals from the control and monitoring panel 72 by way of the sequence control and data correlation circuits 314. These subscriber channel designation signals (designating the T1 and SRDM channels of the desired subscriber) are utilized by the T1 and SRDM framing detectors and comparators in conjunction with the T1 and SRDM framing signals detected in the received data signal to locate the designated subscriber channel in the multiplexed data signal.

The selected byte of subscriber data, together with the synchronizing data, is provided to the data decoder 326 to generate transmit and receive gates for control of data insertion in the multiplexed data signal. The data decoder also establishes the presence of repetitive codes by comparing alternate bytes of data and the decoder also decodes the fixed received codes and supplies this decoded data to the control and monitoring panel through the sequence control and data correlation circuits 314 to light certain of the indicators is the decoded byte area of the front panel monitor area. The data decoder 326 also supplies data through buffering circuits to the microprocessor 74 under the control of the RODR signal from the microprocessor.

The error rate circuit 328 receives the sync error signal SYERR from the T1 and SRDM framing detectors and comparators 324 and counts the errors in the T1 and SRDM framing patterns during a selected time interval. The counting time interval is selected in accordance with control signals received from the control and monitoring panel. The counted error signals are supplied to the sync and error data output circuit 330 for multiplexing and selective transmission to the control and monitoring panel 72 for display be the error counter or for transmission to the microcomputer 74 as the MCDAIN, MCDAIF signals.

With reference now to FIG. 9B, the MJU and panel display data control circuit 334 allows the system of the present invention to function as a multipoint signaling unit (MSU). As will hereinafter be described in greater detail in connection with FIGS. 17A - 17D, the data control circuit 334 receives the multijunction data MDA2 - MDA8 together with multijunction control data and formulates the required multijunction unit (MJ) command bytes for appropriate insertion into the T1 multiplexed data stream. In this connection, MBIT signal (MBIT1 - MBIT8) is supplied to the data output and correlator circuits 336 to form the appropriate insert data INSD for insertion into the data stream. The messages returned from the multipoint junction units are decoded by the MJU and panel display data control circuit 334. The old and new multipoint junction data is multiplexed with the decoded data DDMX and the sync data SRMX supplied to the MJU and panel display data control circuit 334 as the respective DDTA and SED signals from the respective data decoder 326 and T1 SRDM framing detectors and comparators 324 of FIG. 9A. The multiplexed data is transmitted to the control and monitoring panel as the MXDAN (X, Y) and MXDAF (X, Y) signals. These signals are accompanied by appropriate clock and load signals MX2KC (X, Y) and MXLD (X, Y), respectively. In addition, the control circuit 334 provides the MPMJ1 and MPMJ2 signals to the microprocessor.

The MJU and panel display data control circuit also generates various register load signals LOAD0--LOAD6 as well as clock signals F2KCPN and F2KCPF.

The control data demux and select circuit 338 receives the multiplexed data PANDA (X, Y) from the control and monitoring panel as well as data MCDA from the microprocessor. The control data demux and select circuit 338 demultiplexes the panel data and, in response to a microprocessor in control signal MICTRL from the T1 line - subscriber channel latches and comparators 340, selects one of the two received data signals for application to the circuits 332, 334, 336 and 340 as the respective control data signals CTLDTA, CTLDTB, CTLDTC and SUBDES. The data transmitted to the sequence control circuit 332 is utilized to generate microprocessor control signals MCCTL, insert control signals INSCTL, data control signals TDCTL and test select signals TSTSEL. In addition, the sequence control circuit controls the operation of the line access module and the error counting circuitry.

The T1 line - subscriber channel latches and comparator 340 receive the line and channel designation signals from the control and monitoring panel by way of the demultiplexer in the control data demux and select circuit 338. These line and subscriber channel designating signals are stored in latch circuits and are continuously compared with the line and subscriber channel data being transmitted from the control and monitoring panel. If a change in the T1 line and subscriber channel designating data is detected, control signals are generated and supplied to the sequence control circuit 332 for appropriate action in dealing with the change.

A. T1 and SRDM Framing Detectors and Comparators

Figure 10A:
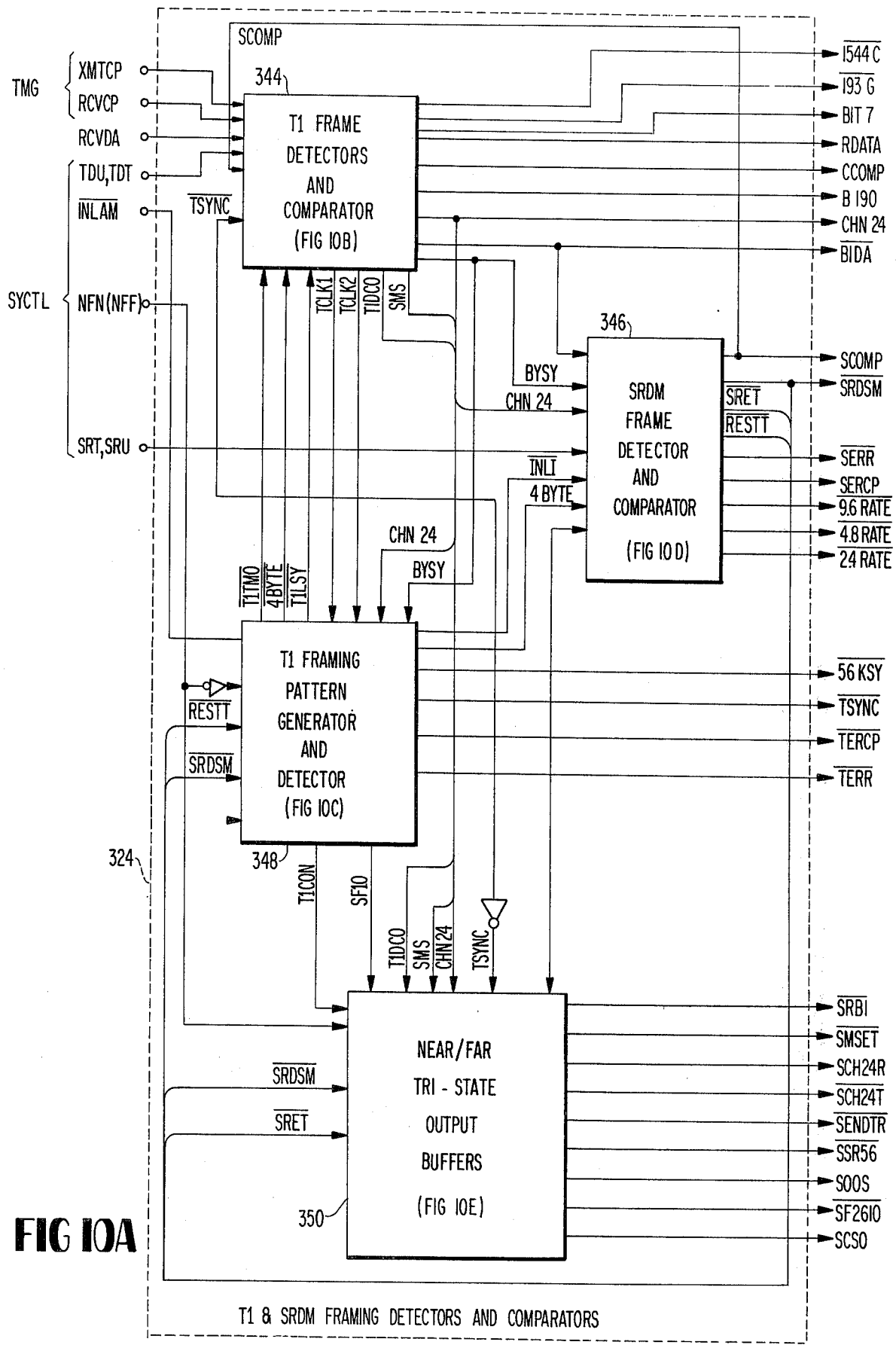
FIG. 10A is a functional block diagram illustrating the T1 and SRDM framing detectors and comparators of FIG. 9A in greater detail.
Figure 10B:
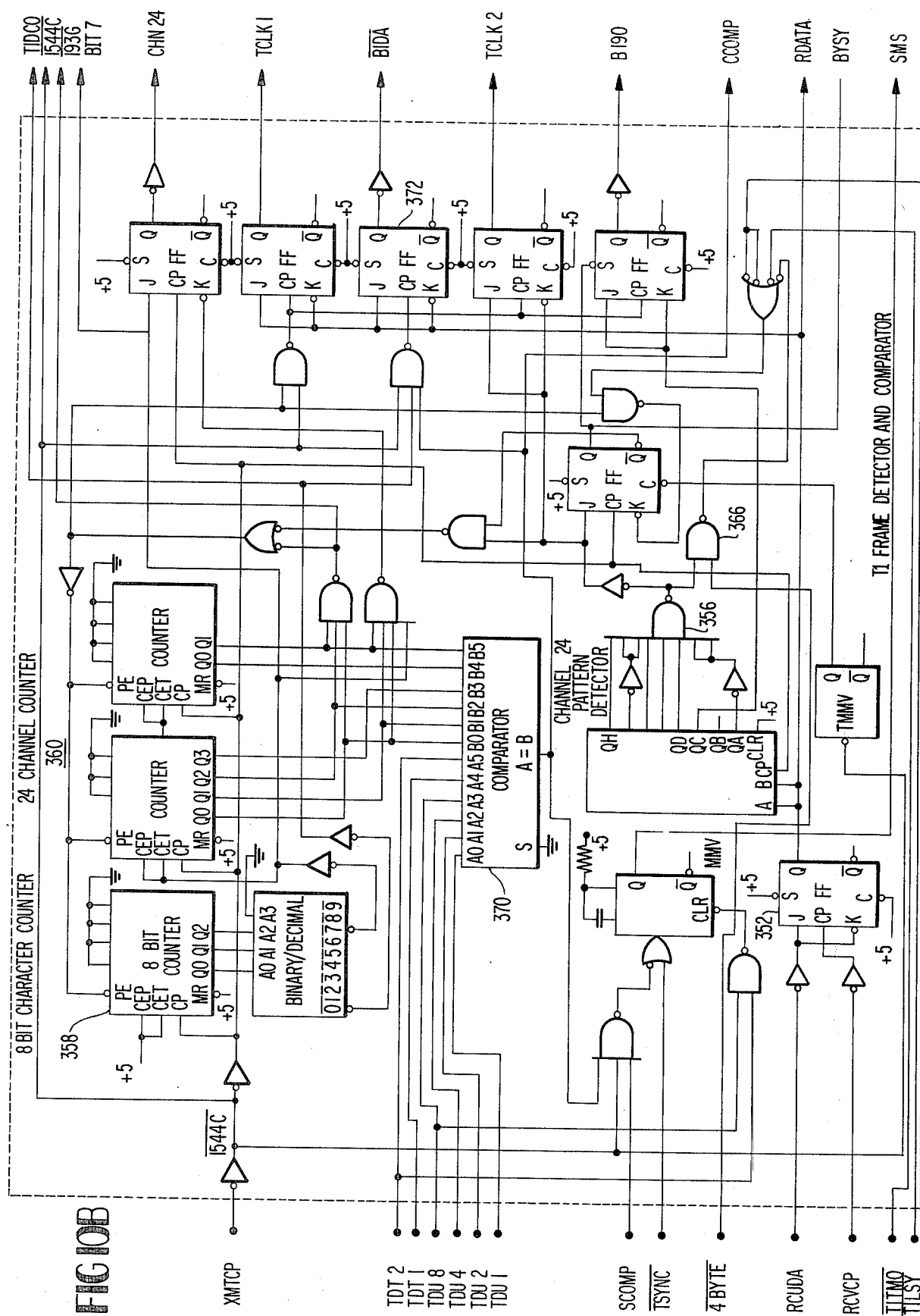
FIG. 10B is a schematic circuit diagram illustrating the T1 frame detector and comparator of FIG. 10A in greater detail.

The T1 and SRDM framing detectors and comparators 324 of FIG. 9A are illustrated in greater detail in FIGS. 10A - 10E to facilitate an understanding of the present invention. Referring now to FIG. 10A, the T1 and SRDM framing detectors and comparators include a T1 frame detector and comparator 344, an SRDM frame detector and comparator 346, a T1 framing pattern generator and detector 348 and near/far tri-state output buffers 350. The T1 frame detector and comparator 344 receives the multiplexed data signal and the timing data and detects the T1 framing pattern in the received data signal. As is illustrated in greater detail in FIG. 10B, the recovered timing signal RCVCP clocks the received data signal RCVDA through a flip-flop 352 and into a shift register 354. The output signals from the shift register 354 are decoded by an NAND gate 356 to locate the channel 24 pattern in the multiplexed data signal. When this pattern is detected, an eight bit character counter 358 and a counter 360 which is clocked by the decoded bit seven from the character counter 358 to thereby count the T1 channels are both reset to commence counting the T1 channels at what should be the initial channel in the multiplexed data stream. Each time the T1 frame detector and comparator receives one complete T1 frame (a major data frame) this same procedure occurs.

Figure 10C:
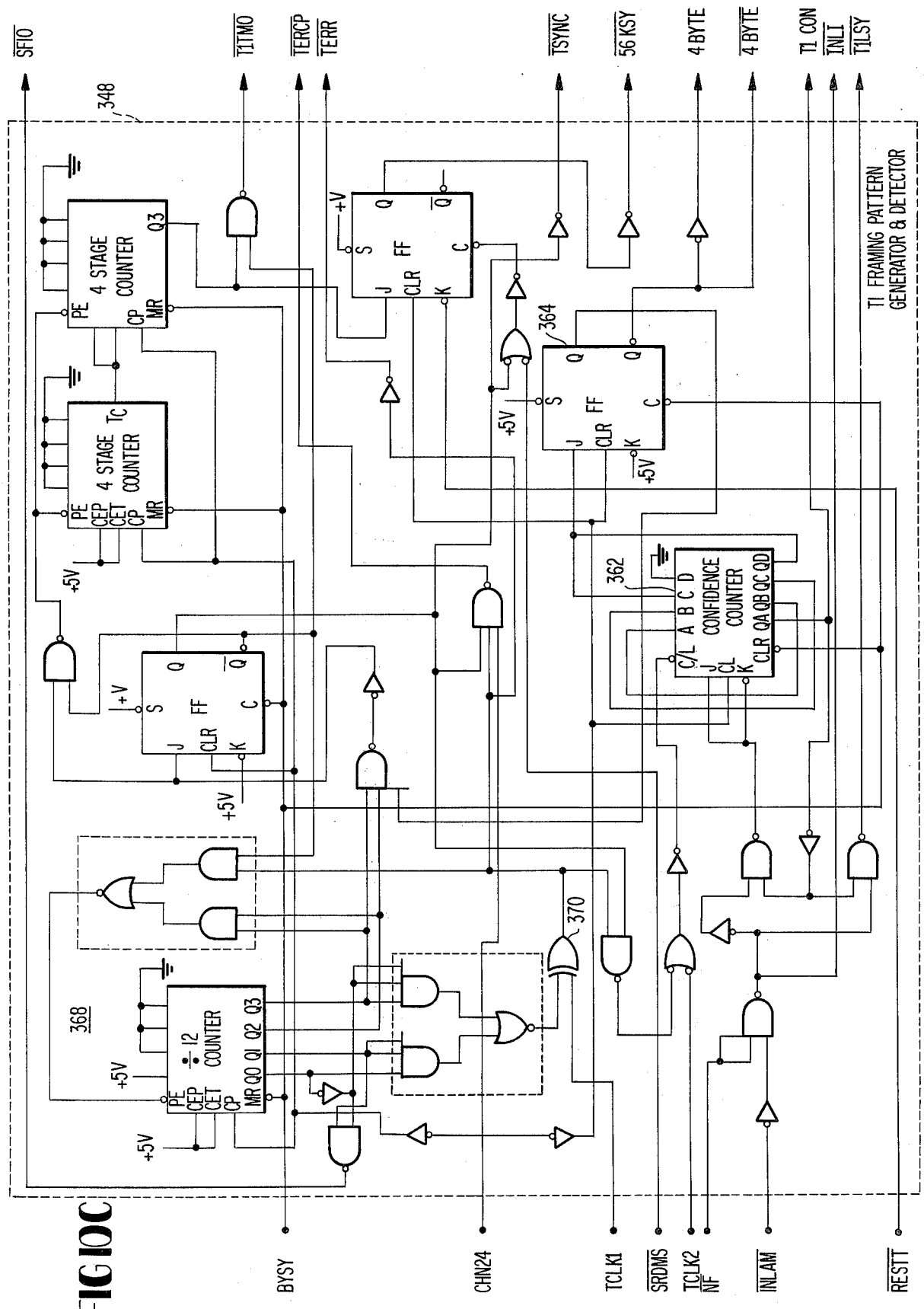
FIG. 10C is a schematic circuit diagram illustrating the T1 framing pattern generator and detector of FIG. 10A in greater detail.

A confidence counter 362 in the T1 framing pattern generator and detector 348 of FIGS. 10A and 10C is advanced one count each time the channel 24 signal is detected in the same place in the major data frame. The confidence counter 362 reaches a count of four and the $\overline{4BYTE}$ signal from the false or $\overline{Q}$ output terminal of a flip-flop 364 assumes a low signal level disabling a gate 366 in the T1 frame detector and comparator 344 of FIG. 10B.

In the system of the illustrated embodiment of the invention, there will be 12 framing bits in one major frame of T1 data. A divide by 12 counter and its associated logic circuits generally indicated at 368 in FIG. 10C generates the expected T1 framing pattern and continues to compare that framing pattern with the received framing pattern in the EXCLUSIVE-OR gate 370. As a result of this comparison, various framing pattern synchronization signals and T1 framing pattern error signals are developed by the T1 frame detector and comparator 344 operating in conjunction with the T1 framing pattern generator and detector 348. Moreover, $\overline{B1DA}$ signal representing the first bit of the designated T1 channel is generated by comparing the channel counter output signals with the T1 channel designating signals TDT1, TDT2, TDU1, TDU2, TDU4 and TDU8. This comparison is performed by a comparator 370 in the T1 frame detector and comparator 344 of FIG. 10B and the $\overline{B1DA}$ signal is supplied as an output signal from a flip-flop 372 in the T1 frame detector and comparator 344. The $\overline{B1DA}$ signal is then supplied to the SRDM frame detector and comparator 346 of FIG. 10D to locate the desired subscriber SRDM channel within the designated and located T1 channel.

With reference now to FIG. 10D, the $\overline{B1DA}$ signal is shifted into a shift register 374 and the output signals from the shift register 374 are decoded by an SRDM pattern detector generally indicated at 376. The sixth and seventh bits of the SRDM pattern from the shift register 374 contain channel rate information and are supplied to flip-flops 378 and 380 for storage and decoding. The contents of the flip-flops 378 and 380 are decoded by the NAND gates 382-385 to provide the rate signals SERCP, $\overline{9.6\ Rate}$, $\overline{4.8\ Rate}$, $\overline{2.4\ Rate}$. In addition, the output signals from the flip-flops 378 and 380 are supplied to a control logic circuit generally included at 386 which controls the resetting of an SRDM frame counter circuit generally indicated at 388. In this manner, the total count of SRDM framing signals indicating one complete SRDM frame can be varied in accordance with the rate of the customer data in the monitored data.

As with the T1 frame detector and comparator, the SRDM frame detector and comparator of FIG. 10D includes a comparator to locate the subscriber channel designated by the signals SRT1, SRT2, SRU1, SRU2, SRU4, and SRU8. The comparator is generally indicated at 390 in FIG. 10D and provides the SRDM compare signal SCOMP in response to a favorable comparison.

In addition, the SRDM frame detector and comparator includes a confidence counter 392 which counts SRDM framing signal errors and provides error output signals related thereto. Like the T1 confidence counter, the SRDM confidence counter forces the SRDM frame detector and comparator to continue to search for the proper SRDM frame if too many errors are present.

Figure 10E:
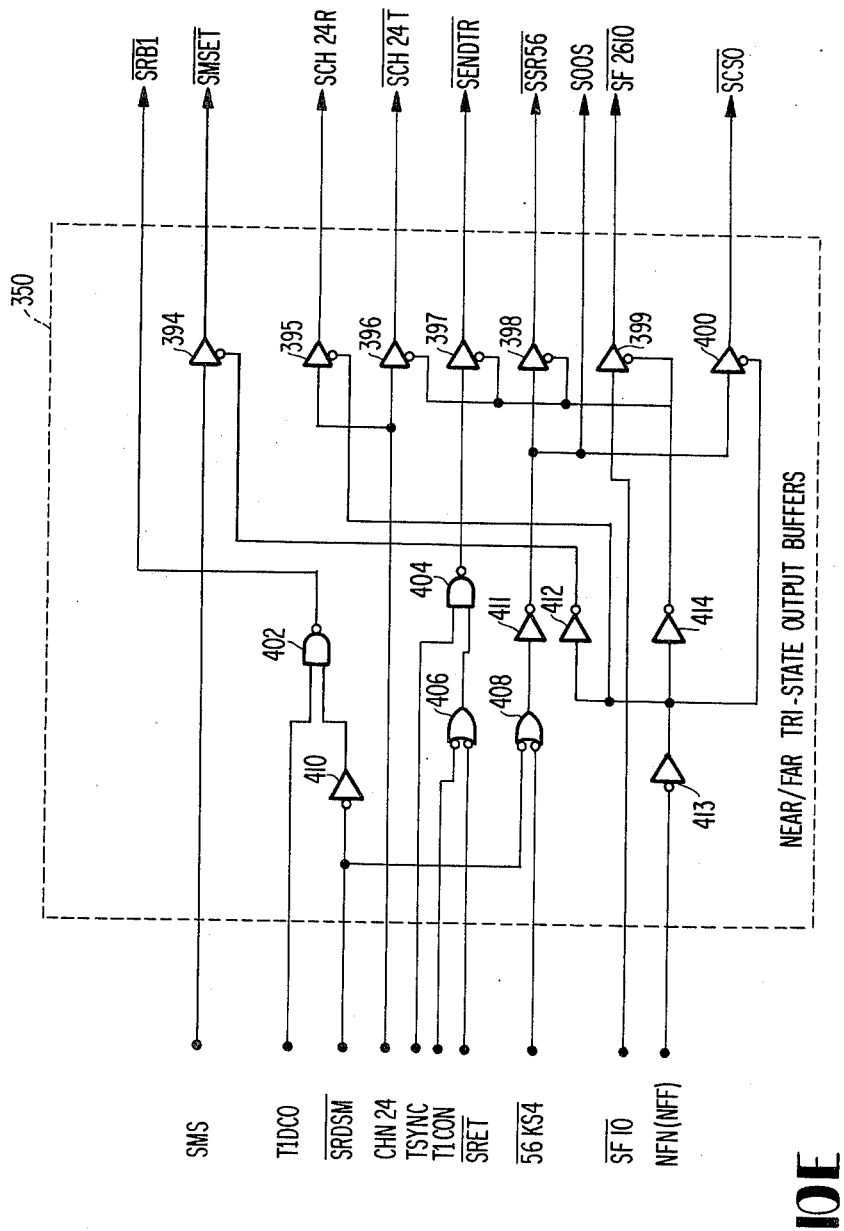
FIG. 10E is a schematic circuit diagram illustrating the Near/Far tri-state output buffer of FIG. 10A in greater detail.

The near/far tri-state output buffers 350 of FIG. 10A are illustrated in greater detail in FIG. 10E. The tri-state output buffers 350 are conventional circuits indicated at 394 through 400 in FIG. 10E. These circuits, once enabled, pass the high or low level signals applied thereto. However, when these circuits are inhibited (not enabled), the output lines are connected to a high impedence so that degradation of other signals on those output lines from other sources does not occur.

As can be seen in FIG. 10E, various signals from the T1 and SRDM framing detectors and comparators are supplied to the tri-state output buffer circuits 394-400 either directly or through various logic circuits such as the illustrated NAND gate 404, the NOR gates 406 and 408 (same as positive logic NAND gates) and the logic level inverter 411. In addition, the T1DCO and SRDMS signals are supplied to a NAND gate 402 to provide the $\overline{SRB1}$ signal directly from the circuit 350.

The near/far select signal NFN (the NFF signal is supplied to the far T1 and SRDM framing detectors and comparators) is supplied through an inverter 413 to the control input terminal of the tri-state output buffers 395 and 400. The NFN signal is also supplied through the inverter 413 and a second inverter 412 to the control terminal of the tri-state buffer 394. In addition, the NFN signal is supplied through inverters 413 and 414 to the control terminals of the tri-state buffers 396, 397, 398 and 399. Accordingly, the data from the T1 and SRDM framing detectors and comparators for the near side of the multiplexed data network is passed by the tri-state buffers 395 and 400 when the system is performing far monitoring or testing functions. The remaining data is passed by the tri-state buffers only when the system is in near data select mode for testing or monitoring purposes.

B. Data Decoder

The data decoder 326 of FIG. 9A is functionally illustrated in FIG. 11A and schematically illustrated in FIGS. 11B – 11C. As is illustrated in FIG. 11A, the data decoder includes a rate control circuit 416, conventional tri-state buffers 418, 419, 420, 421 and 422, a conventional shift register 424 which holds three bytes of subscriber data, a conventional digital comparator 426, a byte store and decode circuit 428 and a conventional set of latches and a serial output register indicated at 430.

The rate control circuit 416 generates subscriber transmit and receive gates G20T and G20R. As is shown in FIG. 11B, the subscriber rate signals $\overline{CR56}$, $\overline{CR96}$, $\overline{CR48}$ and is gated through NAND gates 432, 433 and 434, respectively, by the $\overline{MSMD}$ multipoint junction control signal. The rate signals are supplied to a counting circuit comprising a flip-flop 436 and a counter 438 to generate the G20R receive gate. The various synchronizing signals and comparison signals from the T1 and SDRM framing detectors and comparators 324 of FIG. 9A are supplied to a gating circuit including flip-flops 440 and 442 to produce the transmit gate G20T as well as various control and timing signals for use by the microprocessor. The EXDUD (external data signal) as well as the receive and transmit gates G20R and G20T are supplied through the tri-state buffers 418 under the control of the NFN (NFF) signal to supply these signals to the sequence control and data correlation circuits of FIGS. 9A and 9B. The channel clock signal CHCL for use by the microprocessor is gated through a tri-state buffer 419 under the control of the RODR signal from the microprocessor.

The receive data signal is shifted into a three byte shift register 424 which provides the first and third bytes of data to the comparison input terminals A and B of the comparator 426. When these signals are alike indicating that every other byte of data is identical, the A = B signal is supplied to the byte store and decode circuit of FIG. 11C. In addition, the first bit of the second byte of data (the signal B2QA) is supplied to the byte store and decode circuit together with the RCCO1 signal from the rate control circuit 416.

The byte store and decode circuit of FIG. 11A receives BYTE1 and when a comparison of the first and third bytes is favorable, the BYTE1 signal is clocked into a conventional latch circuit 442 as illustrated in FIG. 11C. The output signals from the latch circuit 442 are supplied to a conventional BCD2 decimal converting circuit 444 and the output signal from the BCD/decimal converting circuit 444 are applied to decode gates 446. The decode gates supply an integrity check signal IC as well as various other microprocessor data signals to the microprocessor for use in microprocessor control of the system.

The data decoder of FIG. 11A also includes a set of conventional latches and a serial output register 430 for multiplexing the decoded data signal and providing the multiplexed output signal $\overline{DDMX}$. The entire first byte of data (BYTE1) is also supplied through the tri-state buffer 422 under the control of the NFN (NFF) signal. Control of loading of the latches and serial output register with the BYTE1 and decoded byte signals BYTE1 and DBYT, respectively, is accomplished by a signal supplied to a latch load input terminal LL of the circuit 430. The output register is loaded in response to the signal applied to the RL input terminal and the data is clocked serially out of the register by the F2KCP signal.

C. Error Rate Circuit

The error rate circuit 328 of FIG. 9A is illustrated in greater detail in FIGS. 12A –12E.

Figure 12C:
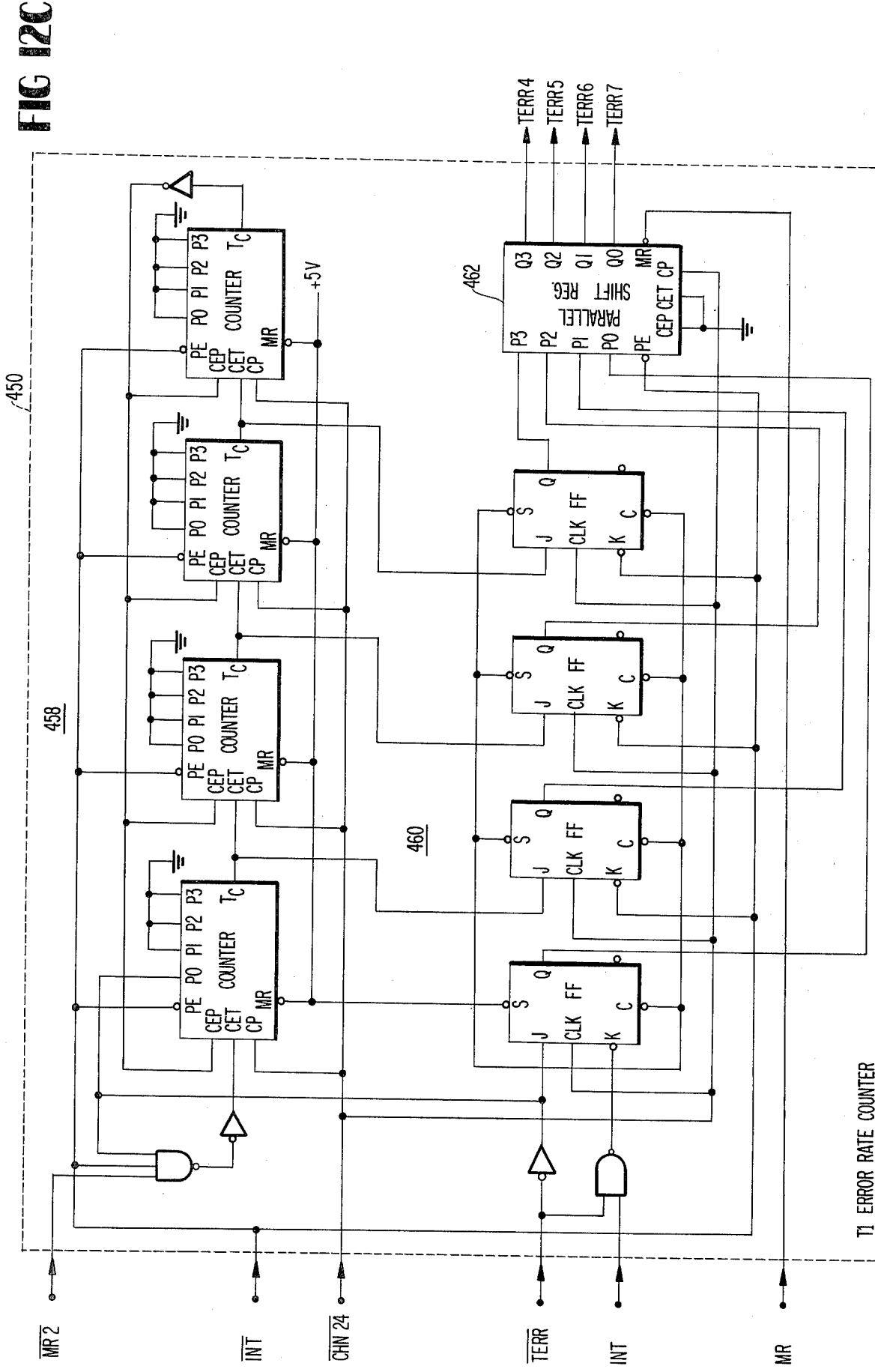
FIG. 12C is a schematic circuit diagram illustrating the T1 error rate counter of FIG. 12A in greater detail.

Referring now to FIGS. 12A –12E, a suitable time interval counter 448 such as the counter illustrated in FIG. 12B is provided in the error rate circuit 328 to determine the intervals over which the error signals are counted by a T1 error rate and an SRDM error rate counter 450 and 452, respectively. The counted error signals from the T1 error rate and SRDM error rate counters are provided to a sync error selector 454 and the TER and SER signals are provided as output signals from the sync error selector 454.

The time interval counter sets the time period over which sync errors are accumulated by the T1 error rate counter 450 and the SRDM error rate counter 452. As is shown in FIG. 12B, the time interval counter comprises a plurality of serial counters generally indicated at 456. Either the error hold signal $\overline{ERRHD}$ or the out of sync signal SOOS may generate a master reset signal MR to prevent the counter 456 from counting. The $\overline{TSD4}$, $\overline{TSD5}$ and $\overline{TSD6}$ signals determine the total time period of the counter 456 thereby determining the duration of the time interval from the beginning to the end of a counting cycle.

The time interval determined by the time interval counter 448 controls the accumulation times of the error rate counters 450 and 452. In referring to FIG. 12C, the error rate counters comprise a plurality of serially arranged counting circuits generally indicated at 458. The counters 458 are reset by the $\overline{INT}$ signals from the time interval counter so that the counters 458 count for a period determined by the length of the interval set by the time interval counter. The counters 458 are clocked by the $\overline{CHN24}$ signal and the total count is held by a series of flip-flops generally indicated at 460 at the end of the time interval. The output signals from the flip-flops 460 are provided to a parallel shift register 462 which in turn supplies the T1 error signals TERR4, TERR5, TERR6 and TERR7 to the sync error selector 454 of FIG. 12A.

The SRDM error rate counter 452 may be identical to the T1 error rate counter 450 of FIG. 12C. The SRDM error rate counter is illustrated in FIG. 12D but will not be described herein in detail because of its similarity to the T1 error rate counter.

The sync error selector 454 is illustrated in greater detail in FIG. 12E. Essentially, the sync error selector is a multiplexing circuit which selects the appropriate T1 error and SERR error lines for a particular error accumulation. The multiplexer supplies the appropriately selected error signals for application to the sync error data output circuit 330 of FIG. 9A as was previously described.

D. Sync and Error Data Output Circuit

Figure 13:
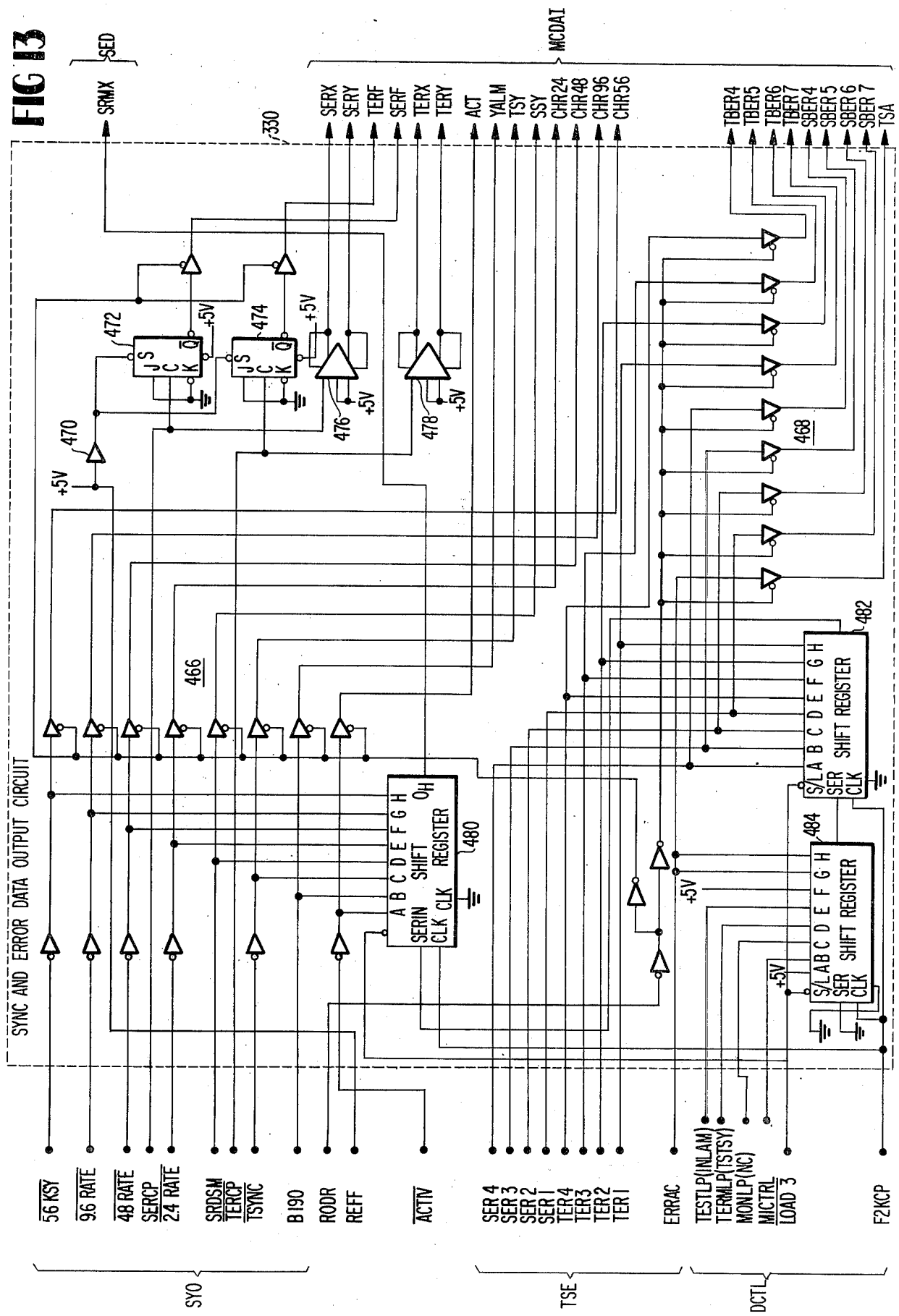
FIG. 13 is a sehematic circuit diagram illustrating the sync and error data output circuit of FIG. 9A in greater detail.

The sync and error data output circuit 330 of FIG. 9A is illustrated in detail in FIG. 13. As is shown in FIG. 13, the sync and error data output circuit receives the sync output signal SYO from the T1 and SRDM framing detectors and comparators 324 of FIG. 9A and outputs these signals to the microprocessor through conventional tri-state buffers generally indicated at 466 in FIG. 13. The T1 and SRDM error signals TSE from the error rate circuit 328 are also received by tri-state buffers generally indicated at 468 for application of these signals to the microprocessor. The application of the SYO and TSE signals to the microprocessor through the tri-state buffers is controlled by the RODR signal from the microprocessor. In addition, the microprocessor generates a reset signal REFF and supplies this reset signal through an inverter 470 to the set input terminals S of a pair of JK flip-flop 472 an 474. The JK flip-flops 472 and 474 receive the SRDM and T1 error clock signals SERCP and $\overline{\text{TERCP}}$, respectively, and they hold these signals until reset by the microprocessor signal REFF. The SERCP and $\overline{\text{TERCP}}$ signals are also supplied to respective amplifying circuits 476 and 478 which translate the applied signals from single line to two line signals for transmission to the control and monitoring panel over a twisted pair cable.

The data rate signals $\overline{\text{56KSY}}$, $\overline{\text{9.6Rate}}$, $\overline{\text{4.8Rate}}$, and $\overline{\text{4.2Rate}}$ are inverted and applied to a parallel and serial output shift register 480. The SRDMS signal and the inverted $\overline{\text{TSYNC}}$ and $\overline{\text{ACTIV}}$ signals, together with the B190 signal are also applied to the register 480. The F2KCP clock signal is applied to the clock input terminal of the shift register 480 to shift the data therein after it has been loaded by the $\overline{\text{LOAD3}}$ signal. The data in the shift register 480 is shifted out of the sync and error data output circuit as the SRMX signal to the sequence control and data correlation circuits 314 of FIG. 9B.

Similarly, the T1 and SRDM error signals TSE are applied to a parallel in/serial out shift register 482 clocked by the F2KCP signal and loaded by the $\overline{\text{LOAD3}}$ signal. Another shift register 484 receives the ERRAC signal and the MICTRL signal as well as, in the near sync error data output circuit, the TSTLP, TERMLP and MONLP signals. The far error data output circuit 330' also receives the ERRAC and MICTRL signals but receives the INLAM and TSTSY signals in place of the TSTLP, TERMLP and MONLP signals. The output signal from the serial output terminal of the shift register 482 is applied to the serial input terminal of the shift register 480 so that this data is also shifted out of the sync and error data output circuit as the SRMX signal.

E. Control Data Demux and Select Circuit

The control data demux and select circuit 338 of FIG. 9B is illustrated functionally in greater detail in FIG. 14. Referring now to FIG. 14, the control data demux and select circuit 338 essentially comprises a 56 bit serial N/parallel out shift register (i.e., the 48 bit register 486 in series with the 8 bit register 488), a 56 bit latch circuit consisting of a 48 bit latch 490 and an 8 bit latch 492 and a selector switch for selecting either the signals from the latch circuits 490 and 492 or a plurality of microprocessor control signals MSB1 - MSB4 and MNFC - MMSCL.

The data PANDA (X, Y) from the control and monitoring panel arrives at the control data demux and select circuit 338 in a serial, multiplexed form and is converted to a single line signal and applied to the data input terminal D of the register 486. The last bit of the register 486 is applied as the D input signal to the register 488. The F2KCPN signal is inverted and applied as the $\overline{\text{8CL}}$ signal to the clock input terminal of the registers 486 and 488 and the parallel output signals from the registers 486 and 488 are applied to the latches 490 and 492, respectively. The $\overline{\text{LDSRO}}$ load signal is applied to the clock input terminal CLK of each of the latches 490 and 492.

The output signals from the latches 490 and 492 are supplied to the A input terminals of the selector switches 494 and 496. The microprocessor signals are supplied to the B input terminals of the selector switches 494 and 496. The microprocessor and control signal MICTRL selects either the panel data or the microprocessor data for application as the $\overline{\text{NFE}}$ – $\overline{\text{MSCL}}$ signals from the control data demux and select circuit 338. The microprocessor and control signal also controls the selection of either the microprocessor multipoint junction signals MSB1 – MSB4 or the multipoint junction signals received from the control and monitor panel. The multipoint junction signals from the selector switch 496 are applied to a latch 498 and the branch clear signal $\overline{\text{BRCLR}}$ is applied as the trigger input signal to a monostable multivibrator 500 which in turn supplies the clear signal to the latch 498.

F. T1 Line - Subscriber Channel Latches and Comparators

Figure 15D:
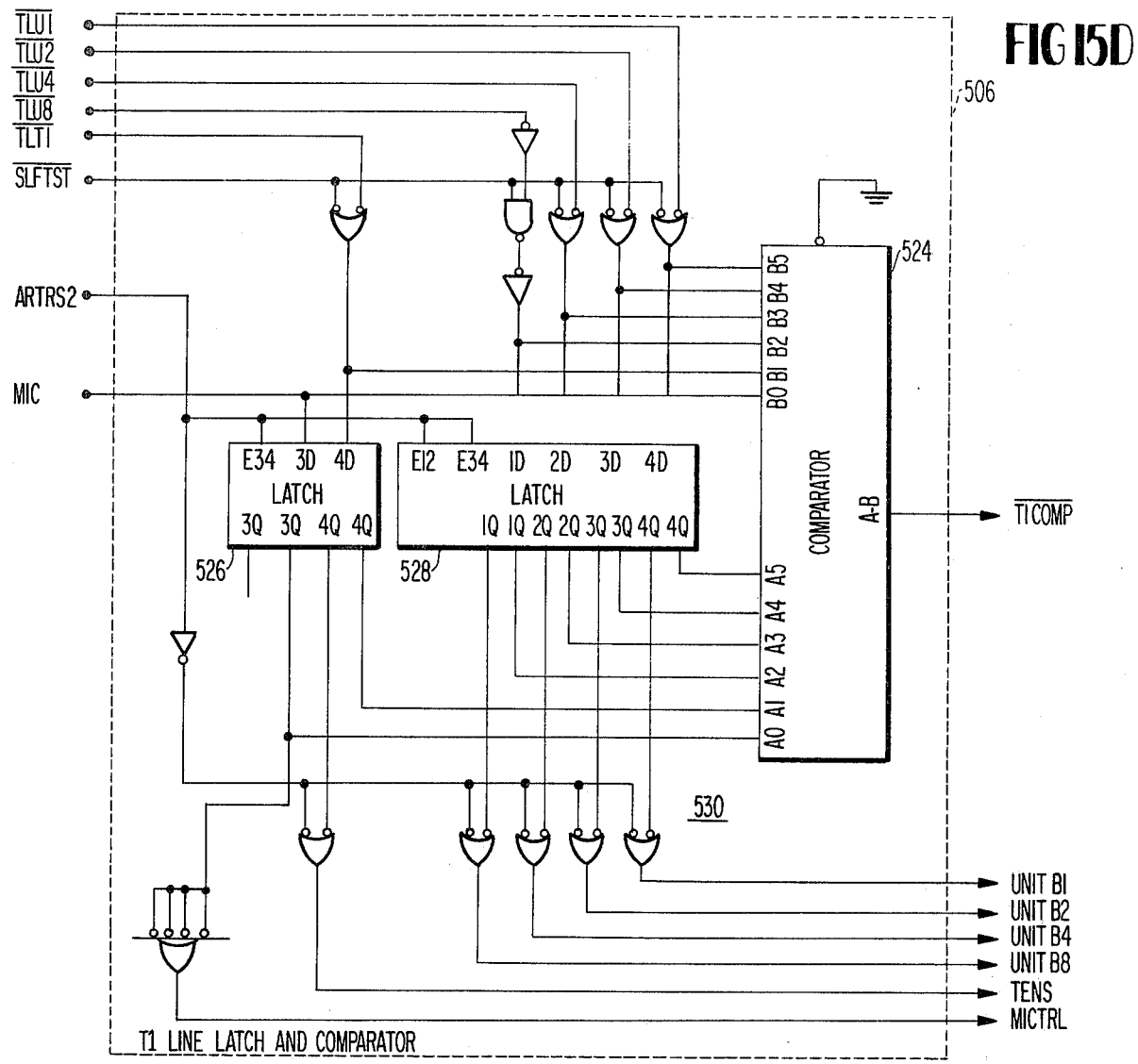
FIG. 15D is a schematic circuit diagram illustrating the T1 line latch and comparator of FIG. 15A in greater detail.

The T1 line - subscriber channel latches and comparator 340 of FIG. 9B is illustrated in greater detail in FIGS. 15A – 15E to facilitate an understanding of the invention. Referring now to FIG. 15A, the subscriber designate signals SUBDES from the control data demux and select circuit 338 of FIGS. 9B and 14 include T1 line designation signals and channel designation signals (i.e., T1 channel and SRDM channel designation signals). The T1 channel designation signals are supplied to a T1 channel latch and comparator 502 and the SRDM channel designate signals are supplied to an SRDM channel latch and comparator 504. The T1 line designation signals are supplied to a T1 line latch and comparator 506 and the control signals $\overline{\text{STN}}$, $\overline{\text{STF}}$ and $\overline{\text{NEFE}}$ are supplied to a near/far test selector 508. The $\overline{\text{ARTRS}}$ signal is supplied through an inverter to the T1 channel and SRDM channel latch and comparator circuits 502 and 504 as a latch enable signal. The $\overline{\text{ARTRS2}}$ signal is inverted and supplied to the T1 line latch and comparator 506 as a latch enable signal. The microprocessor and control signal MIC is supplied to the T1 line latch and comparator 506 and the channel select and unit select signals CHSEL and UTSEL are supplied from the respective comparators 502, 504 and 506. The near/far test selector 508 supplies the NFF and NFN signals as both the channel select signal CHSEL and the sequence control signal SQCTL. The microprocessor signal MICTRL is supplied from the T1 line latch and comparator 506 as one of the sequence control signals SQCTL and the self test signal $\overline{\text{SLFTST}}$ is supplied from the near/far test selector 508 to both the T1 line latch and comparator 506 and as an output signal from the T1 line - subscriber channel latches and comparator 340.

The channel latch and comparator circuits 502, 504 and 506 are essentially identical insofar as each contains a latching circuit and a comparator for comparing the data stored in the latching circuit with the data input signals to the latching circuit. Referring to FIG. 15B, for example, the T1 channel latch and comparator 502 receives the T1 channel designation signals $\overline{\text{TSTB1}}$, TSTB2 and TSUB1 - TSUB8 and supplies these signals both to the B input terminals of a conventional comparator 512 and to the data input terminals of conventional latching circuits 514 and 516 (e.g., quad and dual flip-flops, respectively). The ARTRS signal is supplied as the clocking or enter signal to the latches 514 and 516 to strobe the data at the data input terminals into the latches. The output signals from the latches 514 and 516 are supplied both to the A input terminal of the comparator 512 and as the TDT and TDU output signals.

The SRDM channel latch and comparator 504 of FIG. 15C is essentially identical to the T1 channel latch and comparator of FIG. 15B. The SRDM channel latch and comparator also includes a comparator 518 and latches 520 and 522. The ARTS signal is supplied as the enter or clock signal to the latches 520 and 522 and the SSTB1 and SSTB2 signals, together with the SSUB1-SSUB8 signals are supplied to the data input terminals of the latches 520 and 522 as well as to the B input terminals of the comparator 518. The output signals from the latches are supplied to the A input terminals of the comparator 518 and as the SRT and SRU output signals from the SRDM channel latch and comparator 504. The T1 line latch and comparator 506 also includes a comparator 524 and latches 526 and 528 as is illustrated in FIG. 15D. The designated T1 line signals TLU1-TLU8 and TLT1 are supplied to the latches 526 and 528 as well as to the B input terminals of the comparator 524. However, it should be noted that the self test SLFTST may replace these signals in self test mode of operation.

The ARTRS2 signal is supplied to the clock or enter input terminals of the latches 526 and 528 and is also inverted and supplied to one input terminal of each of a plurality of two input terminal NOR gates (same as positive logic NAND gates) generally indicated at 530. The microprocessor and control signal MIC is supplied from the microprocessor to one input terminal of the latch 526 and to a B input terminal of the comparator 524. The output signals from the latches 526 and 528 are supplied to the A input terminals of the comparator 524 and through the NOR gates 530 as the UNITB1 - UNITB8 and TENS signals. The MICTRL output signal from the latch 526 is supplied through one of the NOR gates 530 which is connected as an inverter as illustrated.

Each of the channel latch and comparator circuits 502, 504 and 506 also provides a comparator output signal CHCOMP1, CHCOMP2 and T1COMP, respectively. As is illustrated in FIG. 15A, the CHOOMP1 and CHOMP2 signals, together with a CHCOMP3 signal from the near/far test selector 508, are supplied to a three input terminal NOR gate 532 and through an inverter 534 as the CHCOMP signal. This signal is utilized by the sequence control circuit as is subsequently described.

Each of the latch and comparator circuits 502, 504 and 506 stores the designated line and subscriber channel input data in the latch circuits. The comparator compares the incoming data signals with those signals stored by the latches to provide the comparator output signals. If a change in the input data occurs, the comparators note the change and cause the sequence control circuit 332 of FIG. 9B to make an appropriate change in the mode of operation of the system if the change in data calls for such a change in operational mode.

Figure 15E:
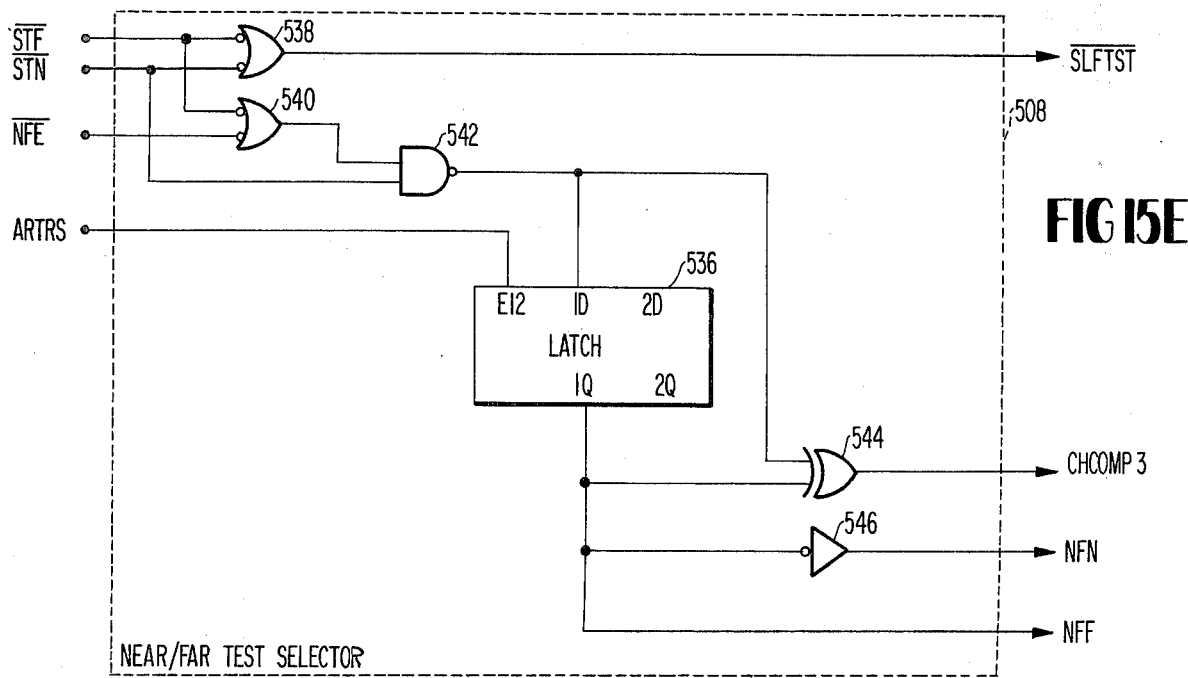
FIG. 15E is a schematic circuit diagram illustrating the near/far test selector of 15A in greater detail.

The near/far test selector 508 of FIG. 15A is illustrated in greater detail in FIG. 15E. The near/far test selector 508 includes a conventional latch 536 which is clocked or enabled by the ARTRS signal. The STF signal is applied to one input terminal of each of a pair of two input terminal NOR gates 538 and 540 (same as positive logic NAND gates) with the output signal from the NOR gate 538 being inverted and supplied as the self test signal SLFTST. The STN signal is applied to one input terminal of a two input terminal NAND gate 542 and the output signal from the NAND gate 542 is applied to the data input terminal 1D of the latch 536. The signal from the NAND gate 542 is also applied to one input terminal of an EXCLUSIVE-OR gate 544 which provides the output signal CHCOMP3. The NFE signal is applied to the other input terminal of the NOR gate 540 and the output signal from the NOR gate 540 is applied to the other input terminal of the NAND gate 542.

The output signal from the latch 536 is applied to the other input terminal of the EXCLUSIVE-OR gate 544, through an inverter 546 as the NFN signals and directly as the NFF output signal.

G. Sequence Control Circuit

The sequence control circuit 332 of FIG. 9B is illustrated in greater detail in FIGS. 16A - 16D to facilitate an understanding of the present embodiment of the invention.

Referring now to FIG. 16A, the sequence control circuit 332 includes a mode latch circuit 548, a test sequence control circuit 550 and a tri-state buffer 552. The control data signal CTLDTA from the control data demux and select circuit 338 of FIG. 9B is applied to the mode latch circuit 548 together with the T1COMP and CHCOMP sequence control signals. The NFF and NFN signals are supplied to a test sequence control circuit 550 and to the tri-state buffer 552. The sync data signals SYDTA are supplied to the test sequence control circuit 550 and the SENDTR signal and the sync data signal is supplied to the mode latch circuit 548.

Figure 16B:
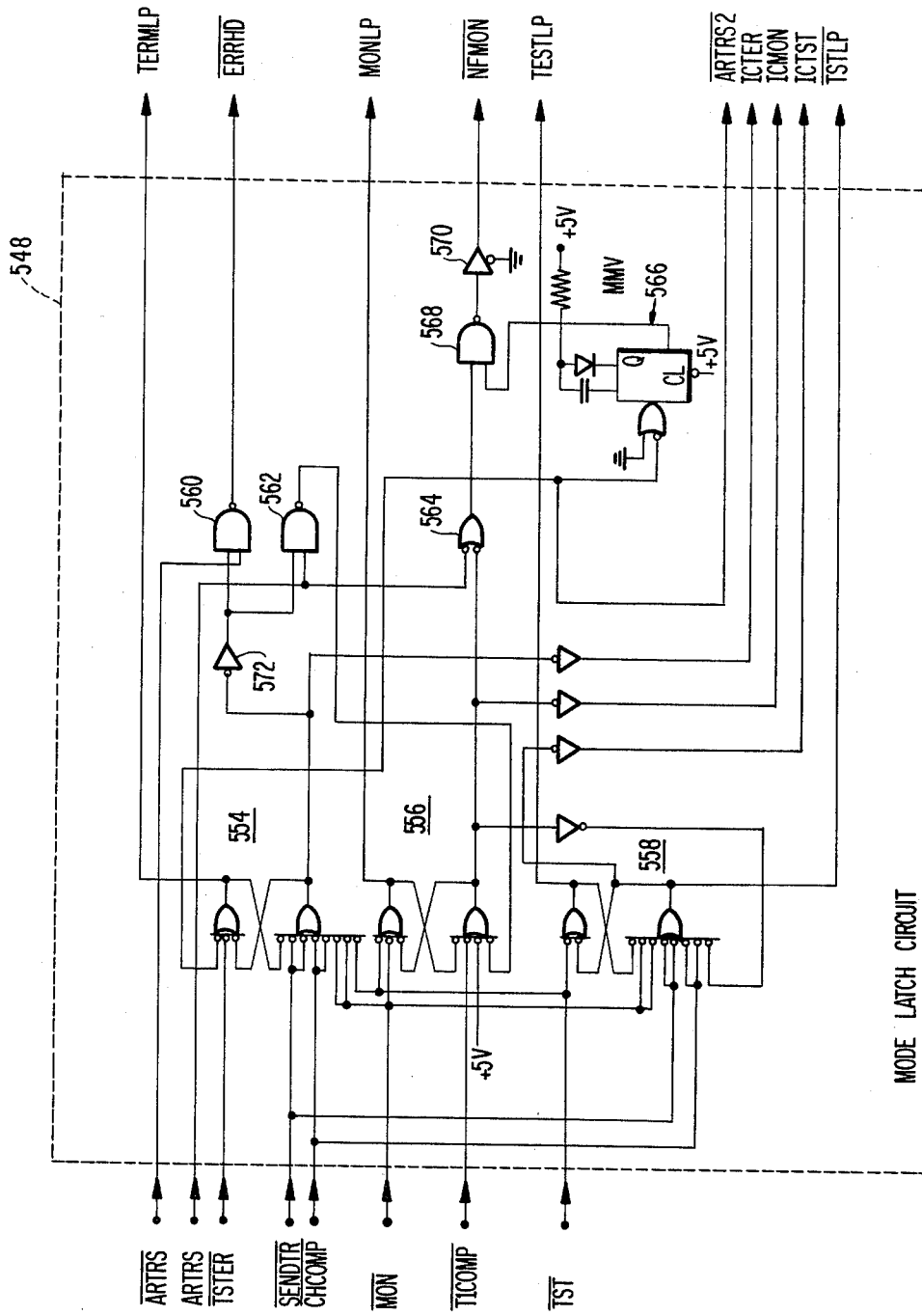
FIG. 16B is a schematic circuit diagram illustrating the mode latch circuit of FIG. 16B in greater detail.

The mode latch circuit 548 illustrated in greater detail in FIG. 16B receives the previously described input signals and generates a test signal TSTLP for application to the test sequence control circuit 550. As is illustrated in FIG. 16B, the mode latch circuit 548 comprises three flip-flops or latches 554, 556 and 558 which latch in the respective terminate, monitor and test modes. The TSTLP signal is provided from the false output terminal of the flip-flop 558 and the TESTLP signal is provided from the true output terminal thereof. The output signal from the false output terminal of the flip-flop 558 is also inverted and supplied as the ICTST signal to the microprocessor.

The ARTRS signal is supplied to one input terminal of a two input terminal NAND gate 560 and the output signal from the NAND gate 560 is provided as the error hold signal ERRHD. The ARTRS signal is supplied to one input terminal of a two input terminal NAND gate 562 and to one input terminal of a two input terminal NOR gate 564. The output signal from the false output terminal of the flip-flop 554 is inverted and applied to the other input terminal of each of the NAND gates 560 and 562 and the output signal from the NAND gate 562 is applied to the reset side of the flip-flop 556. The output signal from the false output terminal of the flip-flop 556 is inverted and applied to the reset side of the flip-flop 558, is inverted and provided as the ICMON signal and is applied to the second input terminal of the NOR gate 564. The output signal from the NOR gate 564 is applied to the trigger input terminal of a monostable multivibrator generally indicated at 566, to the set side of the flip-flop 554, as an output signal $\overline{ARTRS2}$, and to one input terminal of a two input terminal NAND gate 568. The output signal from the multivibrator 556 is applied to the other input terminal of the NAND gate 568 and the output signal from the NAND gate 568 is applied through a tri-state buffer 570 as the $\overline{NFMON}$ signal.

The output signal from the false output terminal of the flip-flop 554 is applied to one input terminal of the NAND gate 560 through an inverter 572 and is also inverted and provided as the ICTER microprocessor integrity check signal.

It can be seen from the illustrated circuit in FIG. 16B that the mode flip-flops 554, 556 and 558 are interlocked in various manners so that the system cannot be in two different modes simultaneously. The monostable multivibrator 566 assures that mode changes do not occur instantaneously.

The test sequence control circuit 550 of FIG. 16A is illustrated in greater detail in FIG. 16C. The test sequence control circuit supplies the TIP microprocessor signal as an output signal MCI and supplies the ARTRS signal to the tri-state buffer 552, to the mode latch circuit 548 and through an inverter to the mode latch circuit 548. The inverted ARTRS signal ($\overline{ARTRS}$) is supplied as an output signal from the sequence control circuit 332.

The test sequence control circuit also generates the INLAM and $\overline{INLAM}$ signals which are supplied as output signals from the sequence control circuit. The $\overline{INLAM}$ signal is also supplied to the tri-state buffer 552. The insert data signals $\overline{NINV}$, $\overline{FINV}$, $\overline{NINSC}$ and $\overline{FINSC}$ are provided as output signals from the test sequence control circuit 550 and the $\overline{MS10}$ signal is supplied to the tri-state buffer 552 from the test sequence control circuit 550. The test sequence control circuit 550 generates the output signals described herein with conventional logic circuits arranged as is illustrated in FIG. 16C. These output signals control the sequence of operation of various functions performed by the system.

Figure 16D:
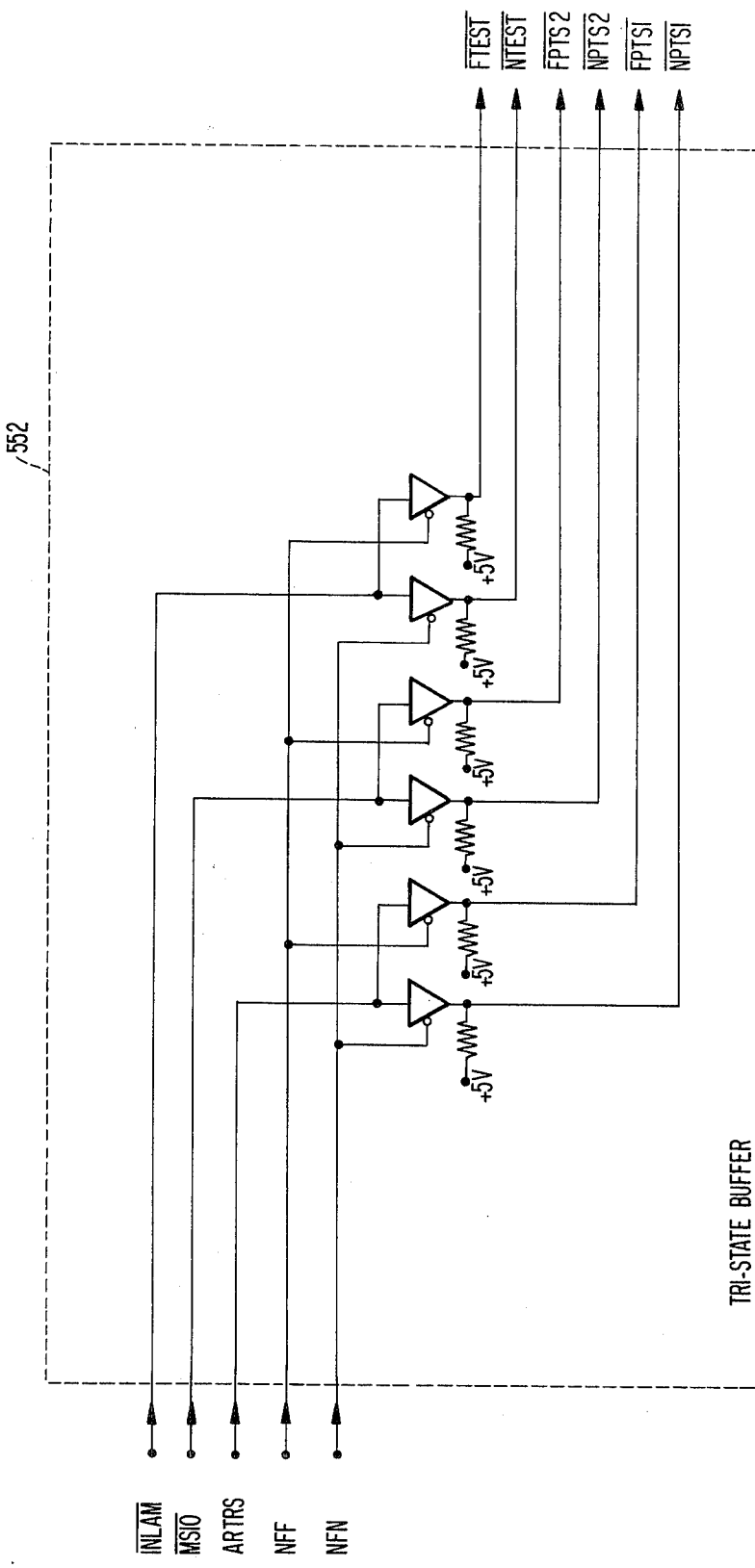
FIG. 16D is a schematic circuit diagram illustrating the tristate buffer of FIG. 16B in greater detail.

The tri-state buffers 552 are convention tri-state buffers such as those previously described and are controlled in response to the near and far signals NFN and NFF. As is illustrated in FIG. 16D, the near signal NFN gates the ARTRS, $\overline{MS10}$ and $\overline{INLAM}$ signals through the tri-state buffers as the respective near signals $\overline{NPTS1}$, $\overline{NPTS2}$ and $\overline{NTEST}$. The far signal NFF similarly gates these signals through as the far signals of the same names.

H. MJU and Panel Display Data Control Circuit

Figure 17B:
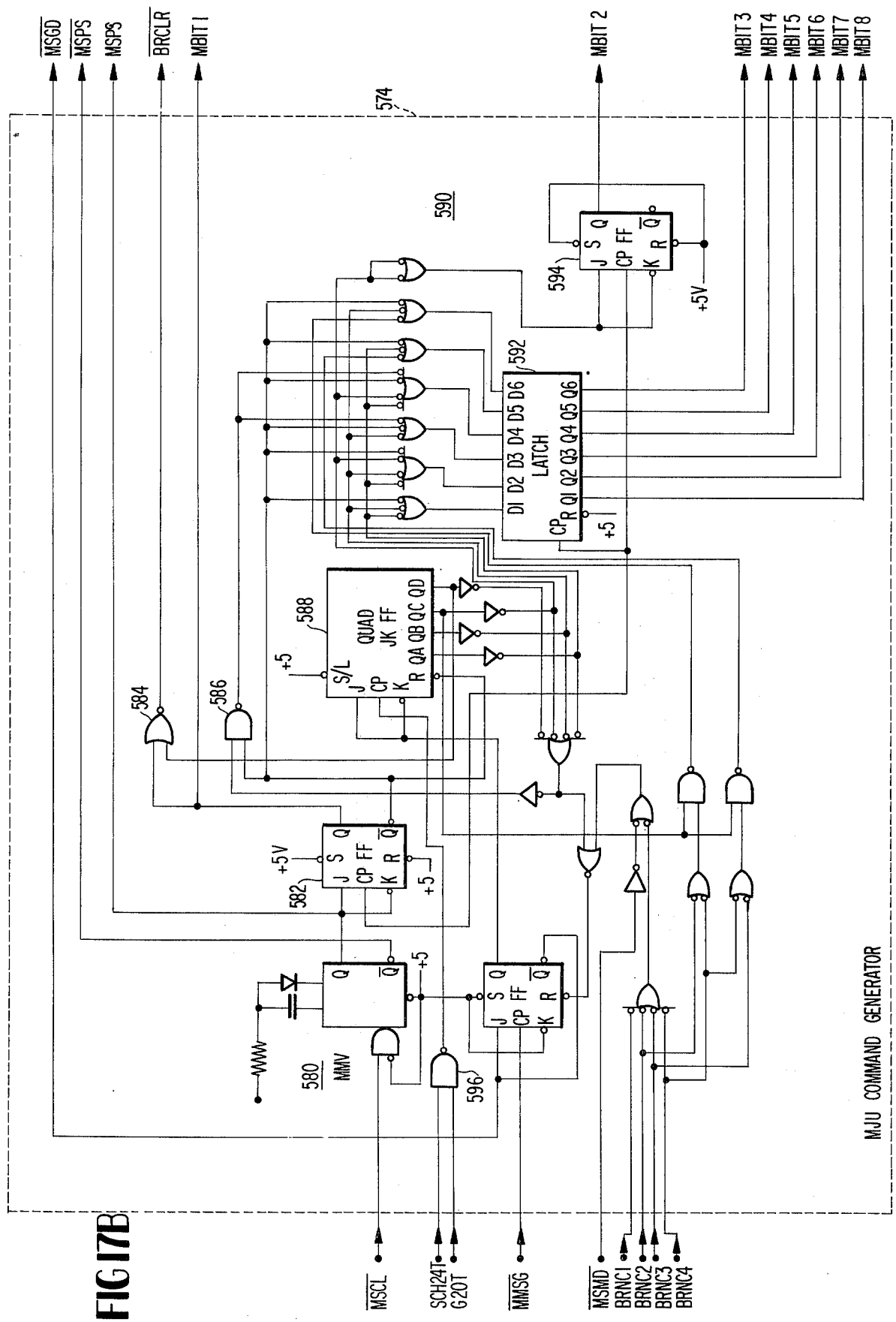
FIG. 17B is a schematic circuit diagram illustrating the MJU command generator of FIG. 17A in greater detail.

The MJU and panel display data control circuit of FIG. 9B includes an MJU command generator 574, and MJU message decode circuit 576 and a panel display data output circuit 578 as is illustrated in FIGS. 17A - 17D. Referring now to FIG. 17A and B, the control data signals CTLDTB from the control data demux and select circuit 338 of FIG. 9B are provided to the MJU command generator 574 together with the SCH24T and G20T signals. The $\overline{MSCL}$ signal is applied to a conventional monostable multivibrator generally indicated at 580 and the signal from the false output terminal $\overline{Q}$ of the multivibrator 580 is supplied as the multipoint signaling pulse $\overline{MSPS}$ from the MJU command generator.

The signal from the true output terminal Q of the multivibrator 580 is applied to a JK flip-flop 582 having its true output terminal Q connected both to one input terminal of a two input terminal NOR gate 584 and as the MB1T1 output signal of the MJU command generator. The output signal from the false output terminal of the flip-flop 582 is applied to one input terminal of a two input terminal NAND gate 586, to the reset input terminal R of a convention quad JK flip-flop 588 and to a series of NOR gates generally indicated at 590 which generate the MBIT multijunction bit signals. The output signals from the NOR gates 590 are supplied to the data input terminals of a conventional latch 592 and to a JK flip-flop 594 as illustrated. The latch output signals and the flip-flop output signal include the MB12–MBIT8 signals.

The clock signal for the flip-flop 582, the quad JK flip-flop 588, the latch 592 and the flip-flop 594 is provided from a NAND gate 596. The NAND gate 596 receives the SCH24T and G20T signals to produce the clock signal.

The other signals utilized to produce the multipoint junction data bits and control signals include the $\overline{MSSG}$ signal, the $\overline{MSMD}$ signal and the branch signals BRNC1–BRNC4. These signals are supplied to conventional logic circuits as illustrated to produce the desired signals.

The multijunction message decode circuit 576 generates the old and new multipoint junction and branch signals OLD and NEW as well as the microprocessor signals $\overline{MPMJ1}$ and $\overline{MPMJ2}$ as is illustrated in FIG. 17C. The multipoint junction data signals are stored in conventional latch circuits as illustrated with the latest data stored in a latch circuit 598 and the oldest data stored in a latch circuit 600. The signals from the latch circuit 598 are applied to a parallel N, serial out shift register 602 and the signals from the latch circuit 600 are supplied to a parallel N, serial out shift register 604. In this manner, the new and old data NEW and OLD may be shifted serially out of the MJU message decode circuit 576 to the panel display data output circuit 578 for transmission to the control and monitoring panel. The data output signals from the latches 598 and 600 are also supplied as illustrated to the microprocessor for use when the microprocessor is in control of the system.

The old and new data from the MJU message decode circuit 576 of FIG. 17C is supplied serially to the panel display data output circuit 578 together with the serially supplied data signals $\overline{DDMXN}$, $\overline{SRMXN}$, $\overline{DDMXF}$ and $\overline{SRMXF}$. These signals are supplied through associated NOR gates 606 and 608 as illustrated to respect flip-flops 610 and 612. The output signals from the flip-flops 610 and 612 are applied to conventional line driving amplifiers 614 and 616 which convert the multiplexed data signals to a signal compatible with transmission over a two wire twisted pair cable.

The panel display output circuit 568 also generates a plurality of timing and register load signals as illustrated. The 8 kilohertz ST8KCP signal generated by the clock pulse generator 342 of FIG. 9B is supplied to decade counters 618 and 620 where the clock signal is appropriately divided and/or decoded to provide the $\overline{LOAD0}$–$\overline{LOAD6}$ and $\overline{LSDRO}$ signals from a conventional BCD/decimal converter 622. One of the output signals from the counter 618 is also utilized to clock the flip-flops 610 and 612 and to generate the F2KCPN and F2KCPF signals. This same signal from the counter 618 is also translated to a two wire type signal by the amplifier 624 and is transmitted to the control and monitoring panel for demultiplexing purposes. Similarly, the $\overline{\text{LOAD0}}$ signal is applied to a translating amplifier circuit 626 for transmission over a two wire network as the MXLDX and MXLDY signals for demultiplexing purposes.

I. Data Output and Correlator Circuits

The data output and correlator circuits 336 of FIG. 9B are illustrated in greater detail in FIGS. 18A – 18F. As will be appreciated from FIGS. 18A – 18F, the data output and correlator circuits 336 produce a pseudo-random code for insertion into the designated subscriber channel for test purposes. The data output and correlator circuits 336 also provide for pseudo-random correlation, correlation of inserted data, detection of and selection of loopback code conditions, and correlation of the error signals for transmission to the control and monitoring panel.

Figure 18B:
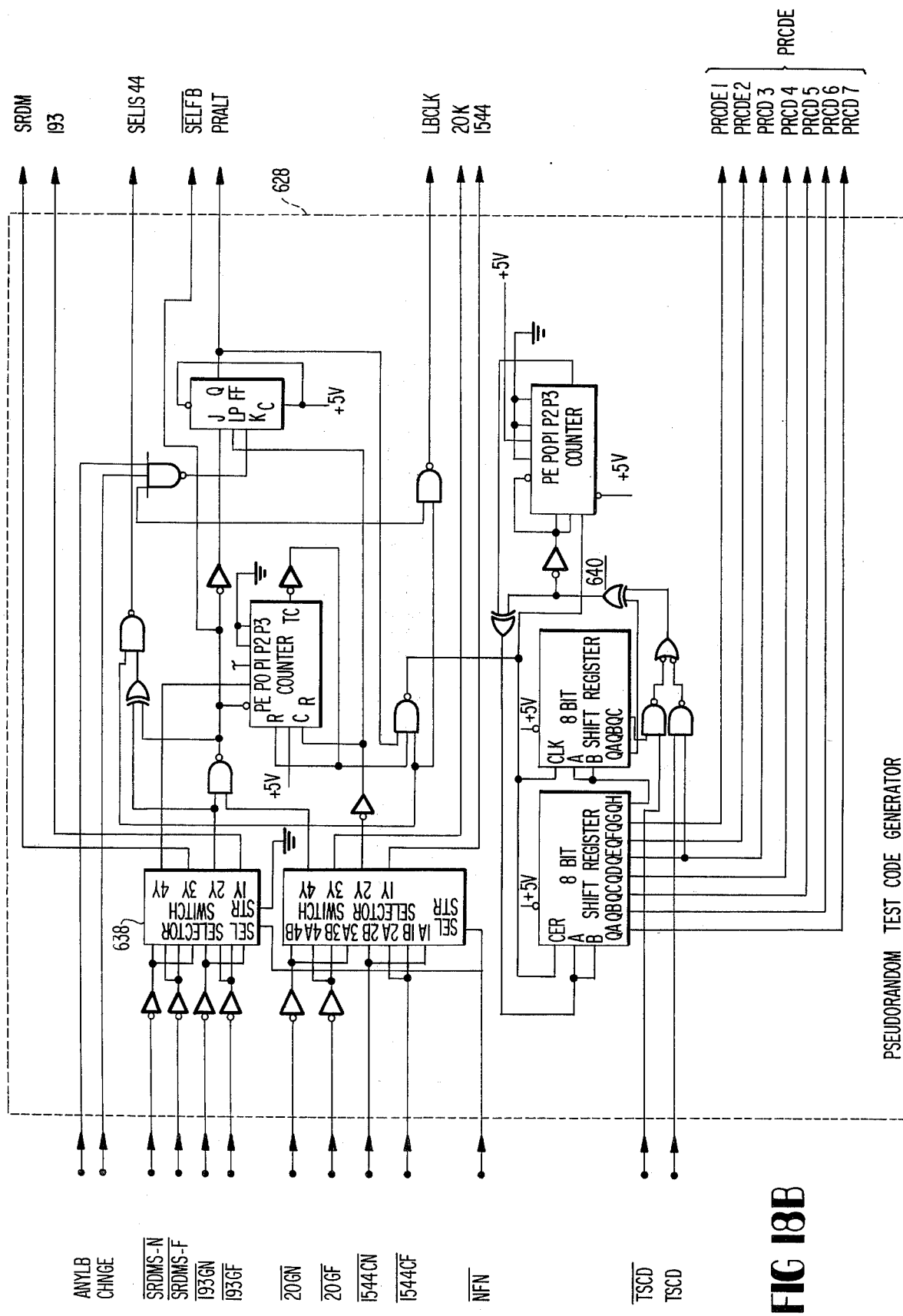
FIG. 18B is a schematic circuit diagram illustrating the pseudorandom test code generator of FIG. 18A in greater detail.

Referring now to FIG. 18A, the data output and correlator circuits 336 include a pseudo-ramdom test code generator 628, a loop-back change detector 630, a code selector and transmitter 632, a slow rate clock generator 634 and a data correlator 636. As is illustrated in FIGS. 18A and 18B, the pseudo-random test code generator receives the synchronizing data signal SYDTA from the T1 and SRDM framing detectors and comparators 324 of FIG. 9A as well as the $\overline{\text{20G}}$ signal from the data decoder 326 of FIG. 9A. The near/far select signal $\overline{\text{NFN}}$ is applied to a conventional selector switch circuit 638 to select either the near or far signals from the incoming $\overline{\text{SRDMS}}$ and $\overline{\text{193G}}$ signals. The selected ones of the signals are supplied as output signals SRDM, 193, 20G and 1544 for application to the slow rate clock generator 634 of FIG. 18B. The output signals from the selector switch 638 are also applied to suitable conventional logic circuits to generate the SEL1544, $\overline{\text{SELFB}}$, PRALT and LBCLK signals.

The test codes signals TSCD and $\overline{\text{TSCD}}$ received from the control data demux and select circuit 338 indicate to the pseudo-ramdom test code generator which test code is to be transmitted. The signals are applied to a conventional pseudo-random code generator generally indicated at 640 to generate the test code PRCDE commanded by the test code signals TSCD and $\overline{\text{TSCD}}$.

Figure 18C:
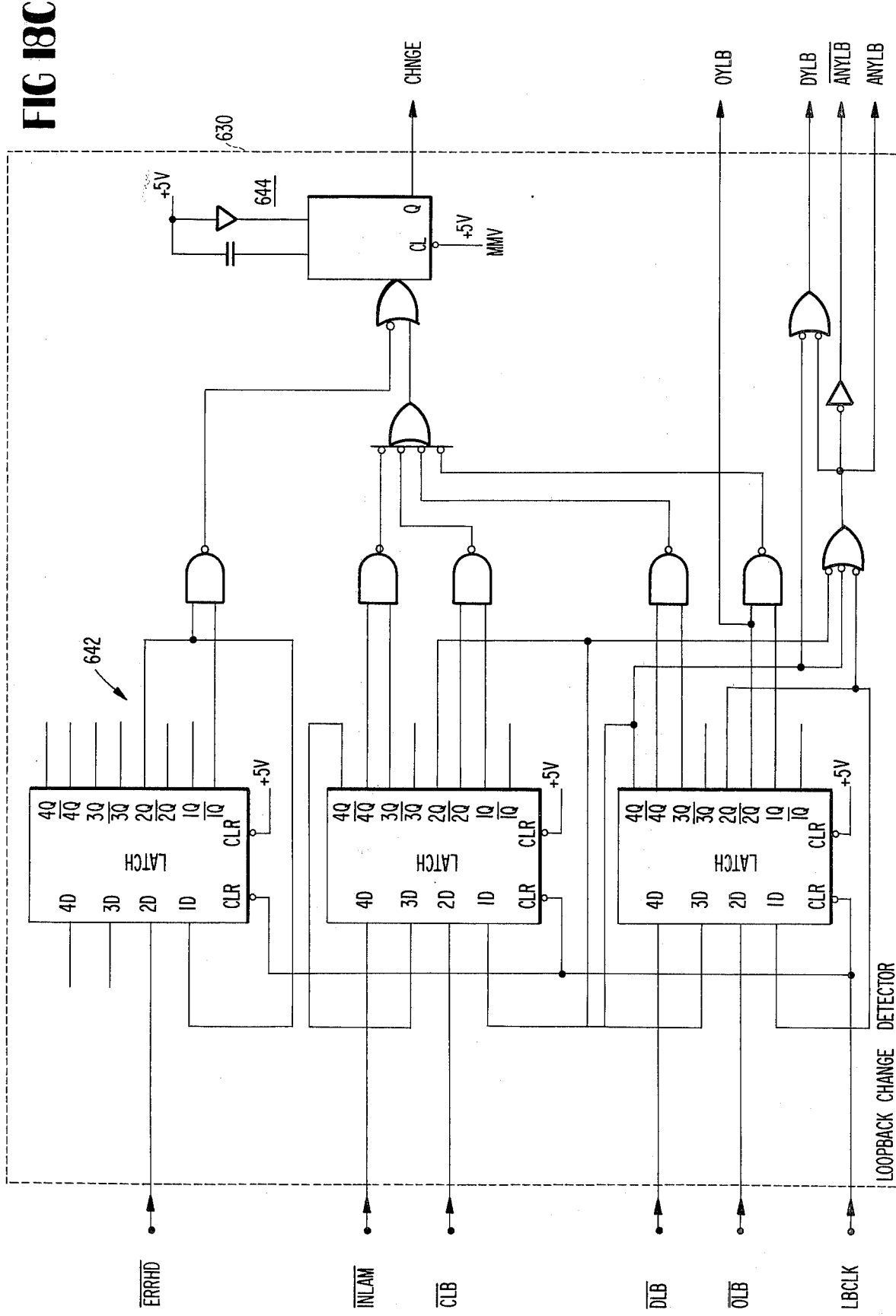
FIG. 18C is a schematic circuit diagram illustrating the loopback change detector of FIG. 18A in greater detail.
Figure 13D:
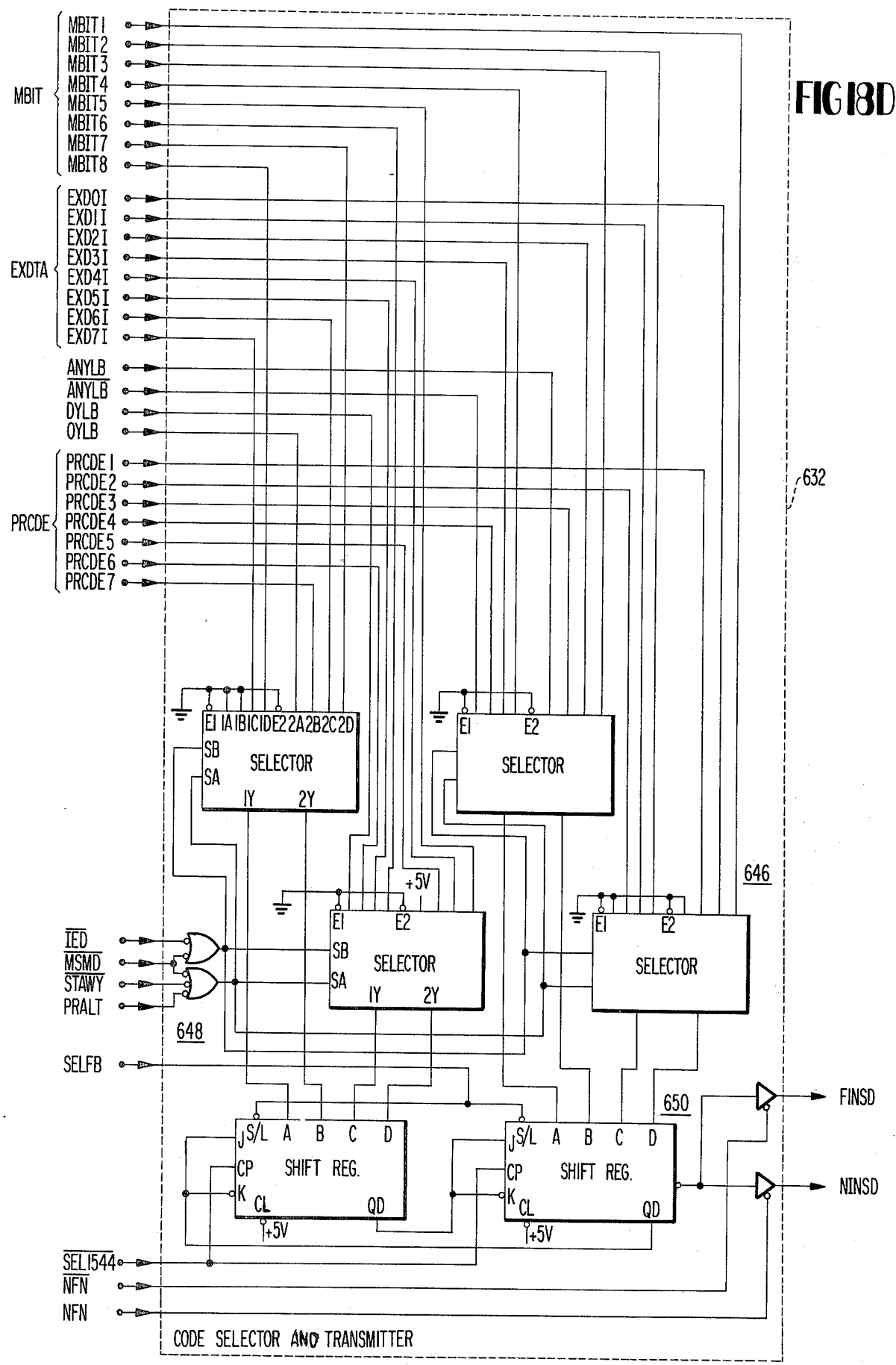

The loopback change detector detects changes in loopback codes and provides a pulse of a predetermined duration as the CHNGE signal. In addition, the loopback codes are stored for use in generating appropriate loopback codes and transmitting these codes. As is illustrated in FIG. 18C, the loopback code command signals $\overline{\text{CLB}}$, $\overline{\text{DLB}}$ and $\overline{\text{OLB}}$ are supplied to conventional latch circuits generally indicated at 642. The loopback clock signal LBCLK enters these loopback code signals together with the $\overline{\text{INLAM}}$ and $\overline{\text{ERRHD}}$ signals into the latch circuit 642. The logic gates detect changes between the past and present patterns of any of the input signals and, if a change is detected, a conventional monostable multivibrator 644 is triggered to generate the change signal CHNGE. This signal is applied to the pseudo-random test code generator 628 of FIGS. 18A and 18B so that the detection of a change causes the most recent loopback code to be generated continuously for a one second interval. This action insures that when a loopback code selection change is made or when going into the test mode, a continuous one second loopback code will be inserted into the data stream and transmitted.

The code selector and transmitter 632 of FIGS. 18A and 18D receives the various codes such as the multipoint junction code MBIT, external data, and the pseudo-random code PRCDE and selects the appropriate code for insertion into the designated subscriber channel. In this connection, a plurality of conventional selector switches 646 are provided in the code selector and transmitter 632. Selection gates 648 select between the applied code signals on the basis of the $\overline{\text{IED}}$, $\overline{\text{MSMD}}$, $\overline{\text{STAWY}}$ and PRALT signals. The self test signal SELFB is also utilized for selection purposes. The selected code is entered into conventional parallel N, serial out shift register 650 for transmission as the insert data signals FINSD, NINSD in response to the near/far select signals and the clock signal $\overline{\text{SEL1544}}$.

Figure 18E:
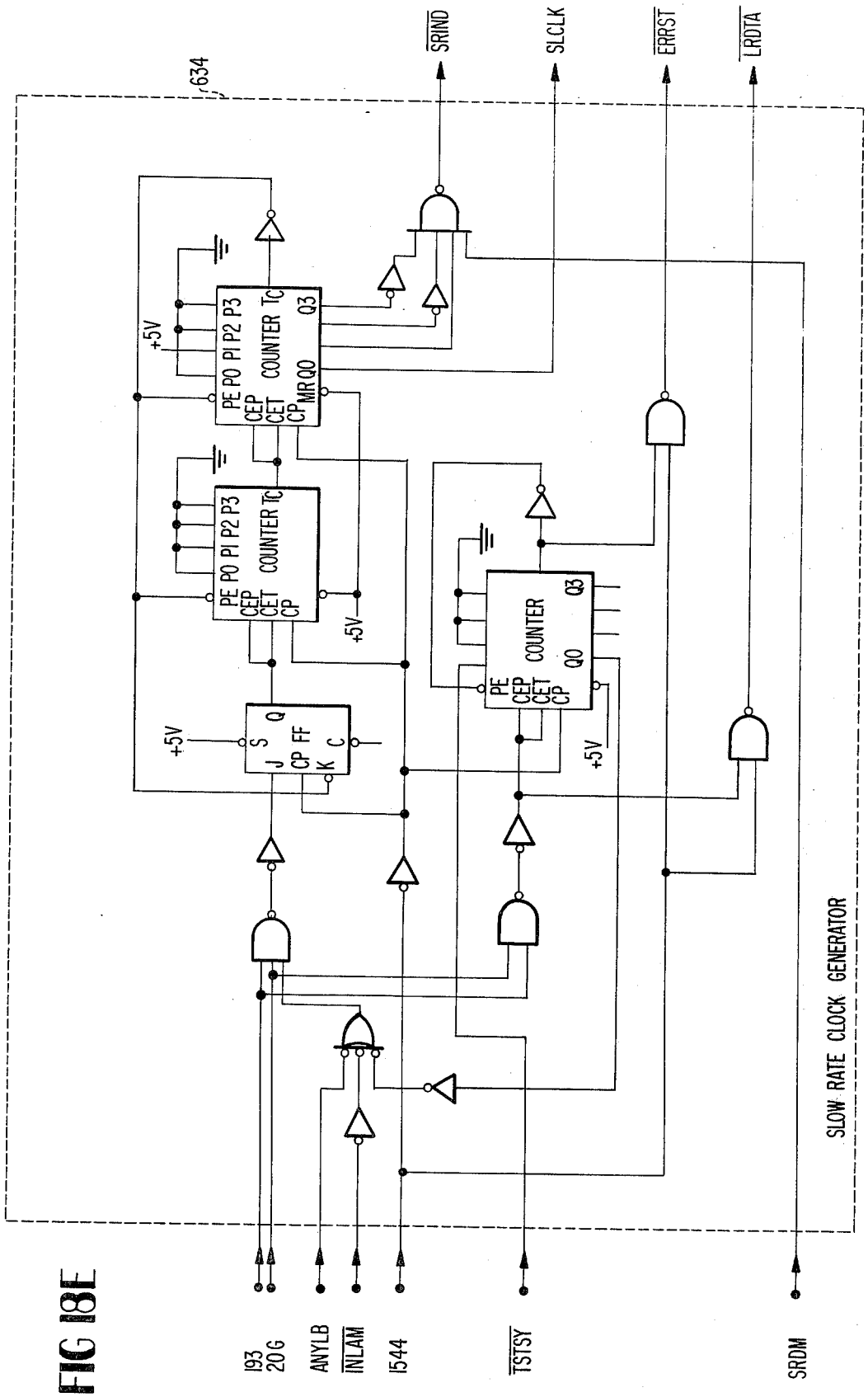
FIG. 18E is a schematic circuit diagram illustrating the slow rate clock generator of FIG. 18A in greater detail.

As is illustrated in FIG. 18E, the slow rate clock generator receives various timing signals and generates a slow rate clock signal for use by the data correlator 636 in operating the pseudo-random comparison circuits. Use of the slow rate clock signal in the pseudo-random comparison circuits of the data correlator 636 allows the errors found in the received data to be transmitted to the control and monitoring panel at a slow rate. As is shown in FIG. 18E, the slow rate clock generator comprises a plurality of conventional logic circuits which generate a slow rate clock signal in sychronism with the other gating and clock signals utilized in the system. The resultant slow clock signal SLCLK and the sychronized load signal $\overline{\text{LRDTA}}$ are provided to the data correlator 636 of FIG. 18F.

Figure 18F:
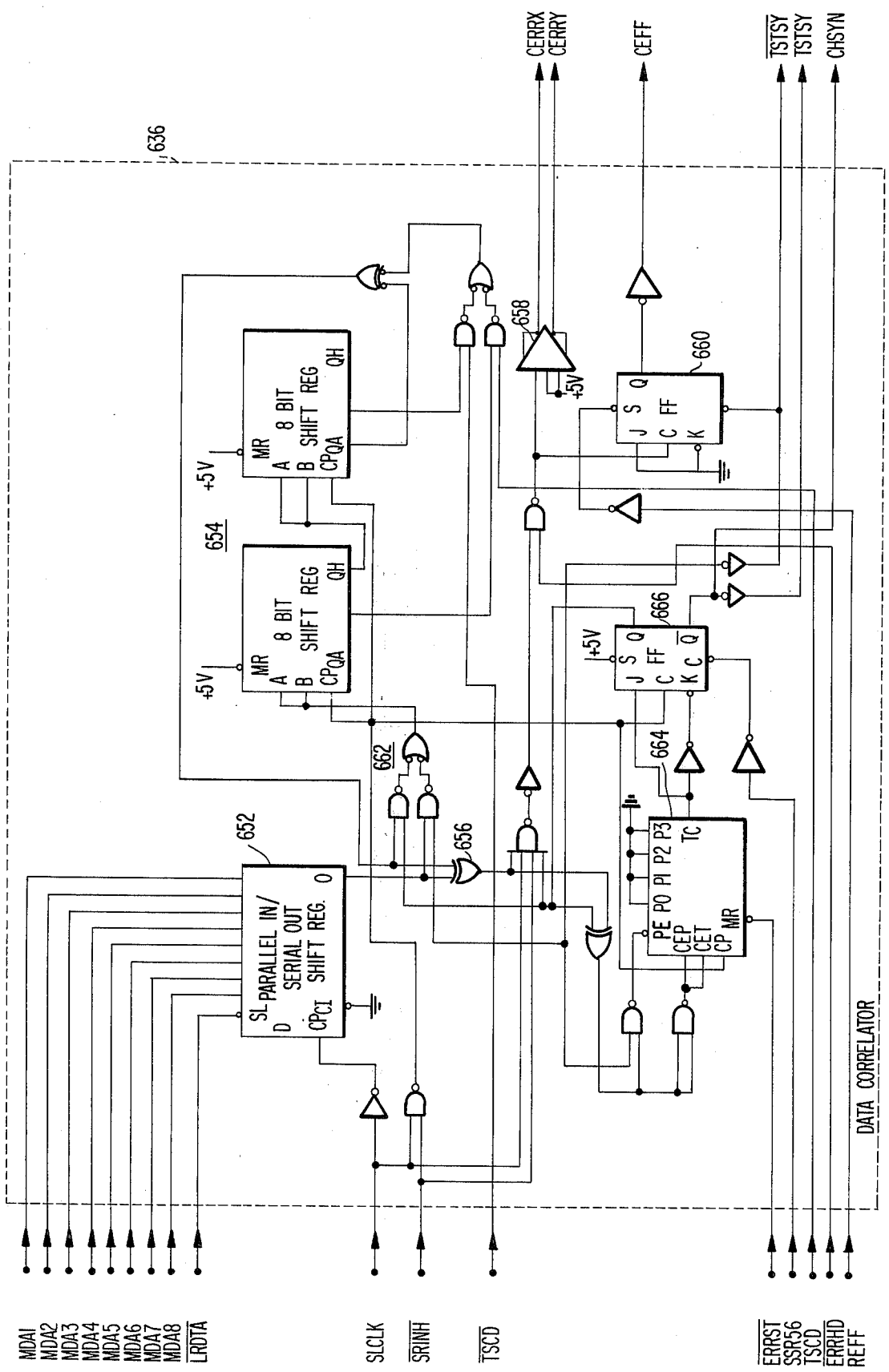
FIG. 18F is a schematic circuit diagram illustrating the data correlator of FIG. 18A in greater detail.

The LRDTA signal loads the data returned on the subscriber channel (the MDA signal) into a parallel N serial out shift register 652 in the data correlator 636 as illustrated in FIG. 18F. This data is clocked out of the register 642 by the slow clock signal SLCLK while, at the same time, a pseudo-random code generator 654 identical to that in the code generator circuit 628 generates the pseudo-random code designated by the $\overline{\text{TSCD}}$ signals at the slow clock rate. The received data and the pseudo-random codes are thus compared by an EXCLUSIVE-OR gate 656 at the slow clock rate and the error signals, if any, are supplied to a suitable amplifier 658 for transmission to the control and monitoring panel on a two wire twisted pair cable as the CERRX, $\overline{\text{CERRX}}$ signal. Each error is storaged by a JK flip-flop 660 for transmission to the microprocessor as the CEFF signal. The microprocessor reset signal REFF resets the flip-flops 660 after each error is sampled by the microprocessor.

In order to sychronize the locally generated pseudo-random pattern to the received data, the pseudo-random code generator must first be initialized. This is accomplished by a logic circuit 662 which first shifts the received data into the shift registers 654 which make up the pseudo-random code generator. This shifting continues until a total of 12 no zero comparisons in a row are detected by the EXCLUSIVE-OR gate 656 so that the counter 664 reaches a count of 12 sets the flip-flop 666.

The present invention may be embodied in other specific forms without departing from the spirit or essential characteristics thereof. The presently disclosed embodiment is therefore to be considered in all respects as illustrative and not restictive, the scope of the invention being indicated by the appended claims rather than by the foregoing description, and all changes which come within the meaning and range of equivalency of the claims are therefore intended to be embraced therein.

What is claimed is:

1. In a multiplexed data transmission system receiving data from a plurality of data channels and time division multiplexing the received data for transmission over a transmission path as a multiplexed data stream containing a predetermined pattern of framing signals together with the data from the plurality of data channels positioned in time at predetermined data channel locations relative to the pattern of framing signals, a system for accessing data of a desired data channel comprising:

line access means connected in series with the transmission path for accessing the multiplexed data stream without disturbing the transmission of the multiplexed data stream along the transmission path;

means responsive to the multiplexed data stream from said line access means for detecting the framing signals in the multiplexed data stream;

means for generating a control signal designating one of the plurality of data channels as the desired data channel;

means receiving said multiplexed data stream and, responsive to said control signal and to the detected framing signals, for locating and providing access to the designated one of the plurality of data channels in the multiplexed data stream without disturbing the transmission of the multiplexed data stream over the transmission path.

2. The system of claim 1 wherein data is received from a second plurality of data channels and is time division multiplexed to form a second multiplexed data stream for transmission over a second transmission path, the second data stream containing the predetermined pattern of framing signals and the data from the second plurality of data channels at predetermined data channel locations relative to the pattern of framing signals in the second multiplexed data stream, the system including:

second line access means in series with the second transmission path for accessing the second multiplexed data stream without disturbing the transmission of the second multiplexed data stream; and, means for selectively connecting one of said two line access means to said detecting means and to said locating and access providing means.

3. The system of claim 1 wherein said line access means includes input and output terminals and comprises:

circuit means connected between siad input and output terminals in series with the transmission path for the multiplexed data stream for presenting an impedance to the passage of the multiplexed data stream to thereby develop, at said intput terminals, voltage signal levels corresponding to data signal levels in the multiplexed data stream; and, switching means for selectively applying said voltage signal levels to said detecting means and to said locating and access providing means.

4. The system of claim 1 including:

means for generating a framing pattern corresponding to an expected pattern of framing signals in the multiplexed data stream; and means responsive to detected framing signals in the multiplexed data stream for detecting errors in the pattern of framing signals in the multiplexed data stream.

5. The system of claim 4 including:

means for establishing a predetermined time interval; and, means for counting the errors in the pattern of framing signals detected by said error detecting means during the established time interval to thereby provide an error rate of the pattern of framing signals in the multiplexed data stream.

6. The system of claim 1 wherein said access means includes means for selectively opening the transmission path, the system further including:

means responsive to said locating means for removing the data from the designated one of the data channels in the multiplexed data stream and inserting different data in the designated one of the data channels without disturbing the transmission of the remaining data channels of the multiplexed data stream.

7. The system of claim 1 including means responsive to said locating means for monitoring data in the designated one of the subscriber channels.

8. A method for accessing data of a desired data channel in a multiplexed data stream transmitted over a predetermined transmission path and containing a predetermined pattern of framing signals and data from a plurality of data channels at predetermined data channel locations relative to the pattern of framing signals in the multiplexed data stream, the method comprising the steps of:

providing a line access module in series with the transmission path for the multiplexed data stream;

developing in the line access module, a data signal identical in data content to the data content of the multiplexed data stream without disturbing the transmission of the multiplexed data stream through the line access module;

detecting the framing signals in the developed data signal;

generating a control signal designating one of the plurality of data channels as the desired data channel;

receiving the developed data signal and locating the designated one of the plurality of data channels in the developed data signal in response to the control signal and to the detected framing signals without disturbing the transmissionof the multiplexed data stream through the line access module;

selectively opening the transmission path through the line access module and rerouting the multiplexed data stream around the line access module from a receiving side to a transmitting side thereof and through a gating cirucit connected in parallel with the line access module; and, selectively controlling the gating means to remove the data in the desired, located data channel without disturbing transmission of the remaining data channels in the multiplexed data stream.

9. The method of claim 8 wherein there is transmitted, over a second transmission path, a second multiplexed data stream containing the predetermined pattern of framing signals and data from a second plurality of data channels at predetermined data channel locations relative to the pattern of framing signals in the second multiplexed data stream, the method including the steps of:

providing a second line access module in series with the second transmission path;

developing, in the second line access module, a second data signal identical in data content to the data content of the second multiplexed data stream without disturbing the transmission of the second multiplexed data stream through the second line access module; and, selecting one of said two data signals for detecting framing signals and locating the designated subscriber channel therein, and for rerouting the one of the two multiplexed data streams corresponding to the selected one of the two data signals throughout the gating circuit for removal of the desired data channel.

10. Apparatus for testing a desired channel of a plural channel time division multiplexed data transmission system in which a plurality of channels containing data are multiplexed to form a multiplexed data stream which is transmitted over a multiplexed data transmission path, the apparatus comprising:

gating circuit means having a multiplexed data input terminal, a multiplexed data output terminal and a control terminal, the gating means being responsive to a gating signal applied to the control terminal to selectively block passage to the multiplexed data output terminal of a signal applied to the multiplexed data input terminal;

line access means having receiving and transmitting terminals connected in series with the multiplexed data transmission path to open the transmission path between the receiving and transmitting terminals and route the data stream from the receiving terminals to the input terminal of said gating circuit means, the multiplexed data output terminal of the gating circuit means being connected to the transmitting terminals of the line access means;

means for generating a control signal designating one of the plurality of channels as the desired channel;

means for detecting the framing signals in the multiplexed data stream;

means responsive to the control signal and the detected framing signals for generating a gating signal specifying the location of the desired channel in the multiplexed data stream;

means for applying said gating signal to the control terminal of said gating circuit means to block passage of the data in the desired channel from the multiplexed data input terminal to the multiplexed data output terminal of the gating circuit mean, whereby transmission of the desired channel can be selectively blocked without disturbing transmission of the remainder of the data stream.

11. The apparatus of claim 10 wherein said gating circuit means includes an insert data input terminal and means for selectively inserting a data signal in the desired channel when passage of the data signal in the desired channel of the multiplexed data stream is blocked.

12. The apparatus of claim 11 wherein said inserted data signal comprises a control code that actuates a device in the multiplexed data transmission system remote from the line access means to form a closed loop path in the transmission system between said line access means and said device, said inserted data also including a predetermined signal inserted in the desired channel for transmission of said closed loop path.

13. The apparatus of claim 12 wherein said line access means includes impedance matching means for terminating the multiplexed data transmission path in an impedance matched with the transmission path impedance when the line access means opens the transmission path.

14. The apparatus of claim 13 further including means for selectively monitoring predetermined channels of the multiplexed data stream containing predetermined signal patterns, and means for determining a bit error rate of the multiplexed data stream in response to the predetermined signal pattern.

15. The apparatus of claim 10 wherein said line access means includes impedance matching means for terminating the multiplexed data transmission path in an impedance matched with the transmission path impedance when the line access means opens the transmission path.

16. The apparatus of claim 10 further including means for selectively monitoring predetermined channels of the multiplexed data stream containing predetermined signal patterns, and means for determining a bit error rate of the multiplexed data stream in response to the predetermined signal pattern.

17. In a time division multiplex signal transmission system for transmitting, over a signal transmission path, a multiplexed signal stream containing a predetermined pattern of framing signals interleaved with information bearing signals from a plurality of sources to thereby form a plurality of time multiplexed signal channels, a system for selectively blocking transmission of the signals in a desired one of the plurality of signal channels comprising:

means for generating a control signal designating one of the plurality of signal channels as the desired one of the channels;

means connected to the signal transmission path for detecting the framing signals in the multiplexed data stream;

control circuit means responsive to the control signal and the detected framing signals for generating a gating signal specifying the location of the desired one of the plurality of signal channels in the multiplexed signal stream;

gating circuit means connected in the signal transmission path and having a multiplexed data input terminal connected to receive the multiplexed signal stream from the signal transmission path, a multiplexed data output terminal connected to transmit signals passed by the gating circuit means onto the signal transmission path, and a control input terminal connected to receive the gating signal from the control circuit means, the gating circuit means selectively passing and blocking the passage of the multiplexed signal stream from the multiplexed signal input terminal to the multiplexed signal output terminal in response to the gating signal from the control circuit means, whereby passage of the signal in the desired one of the plurality of signal channels is selectively blocked.

18. The system of claim 17 wherein said gating circuit means includes an insert signal input terminal and means for selectively inserting a desired signal in the desired one of the plurality of signal channels that is blocked.

19. The system of claim 17 wherein said gating circuit means includes means for selectively opening the multiplexed signal transmission path and diverting the signal stream to said multiplexed signal input terminal.

20. The system of claim 19 wherein said selective opening means includes impedance matching means for terminating the multiplexed signal path with an impedance matched to the signal transmission path when the signal path is opened.

* * * * *